(12) United States Patent
Reed et al.

(10) Patent No.: US 6,389,406 B1
(45) Date of Patent: May 14, 2002

(54) SEMIOTIC DECISION MAKING SYSTEM FOR RESPONDING TO NATURAL LANGUAGE QUERIES AND COMPONENTS THEREOF

(75) Inventors: Frederick W. Reed, Honey Brook; Duane J. McCrory, Malvern, both of PA (US); John C. Waller, Plainfield, CT (US); Charles Austin Parker, Exton, PA (US); Eugene David Pendergraft, deceased, late of Jasper, AZ (US); by Priscilla Wallace, executive, Chicago, IL (US)

(73) Assignees: Unisys Corporation, Blue Bell, PA (US); Autognomics Corporation, Norwich, CT (US)

( * ) Notice: Subject to any disclaimer, the term of this patent is extended or adjusted under 35 U.S.C. 154(b) by 0 days.

(21) Appl. No.: 09/469,833

(22) Filed: Dec. 22, 1999

Related U.S. Application Data

(63) Continuation of application No. 09/364,192, filed on Jul. 30, 1997, now Pat. No. 6,278,987.

(51) Int. Cl.[7] .............................................. G06F 17/00

(52) U.S. Cl. ......................................... 706/46; 706/45

(58) Field of Search ..................................... 706/45, 46

(56) References Cited

U.S. PATENT DOCUMENTS

| | | | | |
|---|---|---|---|---|
| 4,286,330 A | * | 8/1981 | Isaacson | 712/223 |
| 4,910,691 A | * | 3/1990 | Sheirik | 706/45 |
| 5,715,371 A | * | 2/1998 | Ahmad et al. | 706/46 |
| 5,845,272 A | * | 12/1998 | Morjarig et al. | 706/45 |
| 5,987,445 A | * | 11/1999 | Rao et al. | 706/46 |

OTHER PUBLICATIONS

Eugene Pendergraft, "Artificial Intelligence Realized By Multi–Enclave Self–Organization", Pragmatic Logic Corporation, Jul. 1989.

E.D. Pendergraft, "Linguistic Information Processing Study and Dynamic Adaptive Data Base Management Study", Linguistics Research Center, University of Texas at Austin, Nov. 1968.

Microsoft Press Computer Dictionary: Third Edition 165, 1997.*

Merriam–Webster's Collegiate Dictionary: Tenth Edition 757, 1064, 1208, 1997.*

Kantardzic et al, "Software Environment for Real–Time Expert Systems Including Crise State Prediction", IEEE proceedings of Euromicro '90 workshop, Jun. 1990.*

Doraiswami et al, "A Real–Time Expert Control Status Monitor Using Linear Predictive Coding Algorithms" IEEE proceedings of the 30th Conference on Decision and Control, Dec. 1991.*

Castillo et al, "An Intelligent System fo Discovering Mathematical Model for Financial Time Series Prediction" IEEE proceedings of Frontiers of Computer Technology, Aug. 1994.*

* cited by examiner

*Primary Examiner*—George B. Davis
(74) *Attorney, Agent, or Firm*—Volpe and Koenig, P.C.

(57) ABSTRACT

A semiotic decision making system operates to respond, for example, to natural language queries. The system operates independent of the type of symbolic elements in which queries are cast. A training corpus of information in the form of sequential sets of a selected type of element is input to the system and processed by a semiotic processing module to create a knowledge database based upon the lineal relationship of elements within the training corpus. The knowledge database is then used to make decisions relating to queries input in the same type of elements. Accordingly, inputting a French training corpus results in a knowledge base useful in answering French questions. Multiple semiotic processing modules may be used to enhance performance.

16 Claims, 29 Drawing Sheets

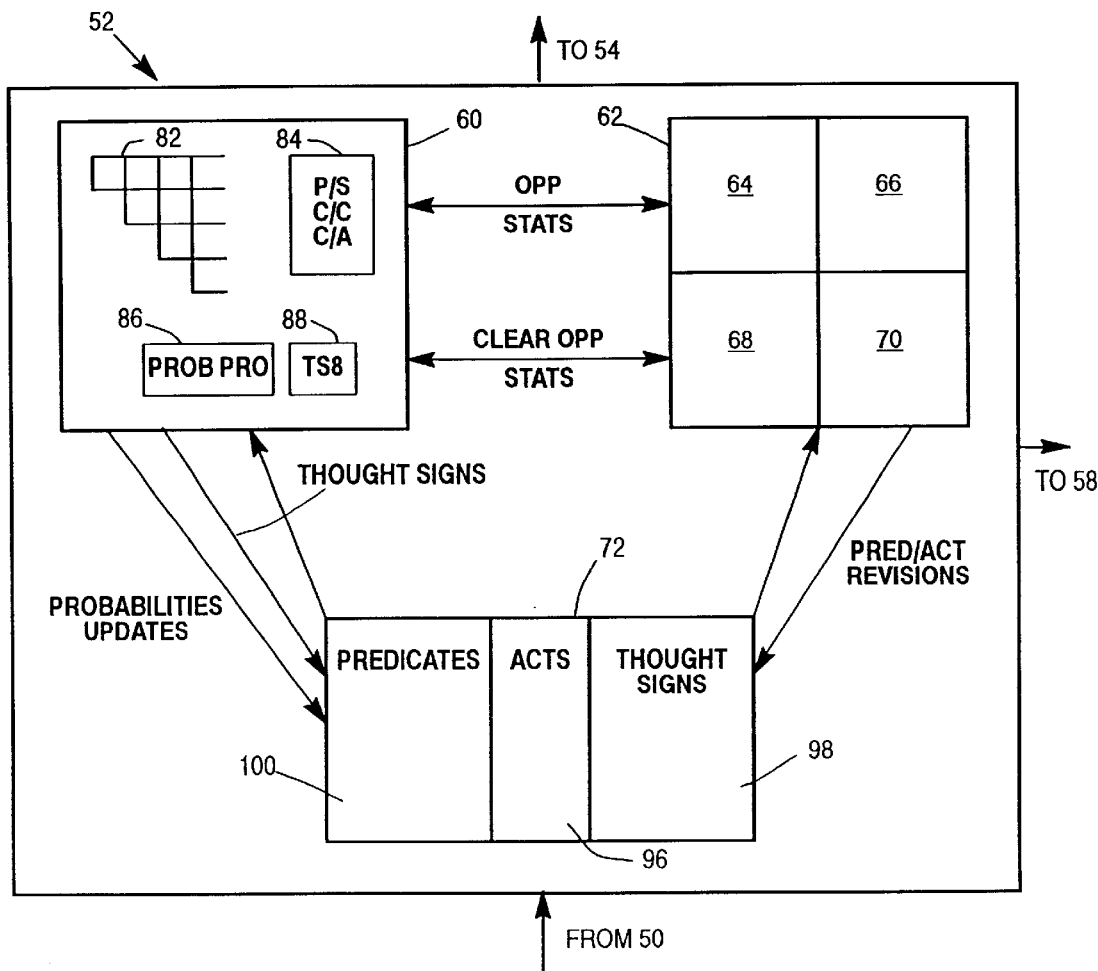

*Figure 2*

| PREDICATES: | ACTS: |
|---|---|
| POINTERS TO CLASS OF ACTS<br>PROBABILITY<br>GOODNESS<br>CONVERGENCE/FLUCTUATION<br>TYPE OF CREATION<br>ITERATION OF CREATION<br>POINTERS TO ASCASE ACTS<br>POINTERS TO ASRESULT ACTS<br>POINTERS TO P/S AND C/C OPP STATS | POINTER TO CLASS PREDICATE<br>POINTER TO PREDICATE CASE<br>POINTER TO PREDICATE RESULT<br>PROBABILITY – NORMALIZED IN CLASS<br>GOODNESS<br>POINTER TO THOUGHT SIGNS WHICH CONTAIN ACT |
| THOUGHT SIGNS:<br>POINTER TO ACT<br>DENOTATION OF ACT IN TERMS OF ELEMENTAL ACTS | |

*Figure 3*

| PREDICATE RECORDS | | CORRESPONDING ACT RECORDS | | | | THOUGHT SIGN RECORDS |
|---|---|---|---|---|---|---|
| PREDICATES (P) | PROBABILITY (p) | ACT (A) | CASE PREDICATE (CP) | RESULT PREDICATE (RP) | PROBABILITY (p) | |
| P1 | 1 | A1~v | 0 | 0 | 1 | |
| P2 | 1 | A2~e | 0 | 0 | 1 | |
| P3 | 1 | A3~a | 0 | 0 | 1 | |
| P4 | 1 | A4~l | 0 | 0 | 1 | |
| P5 | 0.3 | A51<br>A52<br>A53 | P1<br>...<br>... | P2<br>...<br>... | 0.3<br>0.3<br>0.4 | |
| P6 | 0.8 | A61<br>A62 | P3<br>... | P4<br>... | 0.9<br>0.1 | |
| P7 | 0.06 | A71<br>A72<br>A73 | ...<br>P5<br>... | ...<br>P3<br>... | 0.2<br>0.2<br>0.6 | |
| P8 | 0.3 | A81 | P5<br>... | P6<br>... | 1 | ((ve)(al)) |
| P9 | 0.006 | A91<br>A92 | P7<br>... | P4<br>... | 0.1<br>0.9 | (((ve)a)l))<br>... |

*Figure 4d*

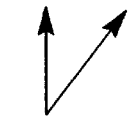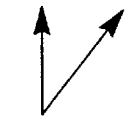
Figure 6a

Figure 6c

| | 46 | 10 | 39 | 53 | 17 | 40 | 60 | 24 | 41 | 67 | 31 | 42 | 68 | 38 | 74 |
|---|---|---|---|---|---|---|---|---|---|---|---|---|---|---|---|
| 46 | 1.000 | 0.669 | 0.669 | | 0.597 | 0.597 | 0.511 | | | | | | | | |
| 10 | 0.669 | 1.000 | 0.712 | 0.610 | | | | | | | | | | | |
| 39 | 0.669 | 0.712 | 1.000 | 0.610 | | | | | | | | | | | |
| 53 | | 0.610 | 0.610 | 1.000 | 0.610 | 0.610 | | 0.582 | 0.582 | 0.472 | | | | | |
| 17 | 0.597 | | | 0.610 | 1.000 | 0.712 | 0.619 | | | | | | | | |
| 40 | 0.597 | | | 0.610 | 0.712 | 1.000 | 0.619 | | | | | | | | |
| 60 | 0.511 | | | | 0.619 | 0.619 | 1.000 | 0.619 | 0.619 | | 0.552 | 0.552 | | | 0.650 |
| 24 | | | | 0.582 | | | 0.619 | 1.000 | 0.712 | 0.603 | | | | | |
| 41 | | | | 0.582 | | | 0.619 | 0.712 | 1.000 | 0.603 | | | | | |
| 67 | | | | 0.472 | | | | 0.603 | 0.603 | 1.000 | 0.603 | 0.603 | | | |
| 31 | | | | | | | 0.552 | | | 0.603 | 1.000 | 0.712 | | | 0.841 |
| 42 | | | | | | | 0.552 | | | 0.603 | 0.712 | 1.000 | | | 0.841 |
| 68 | | | | | | | | | | | | | 1.000 | | |
| 38 | | | | | | | | | | | | | | 1.000 | |
| 74 | | | | | | | 0.650 | | | | 0.841 | 0.841 | | | 1.000 |

| | 46 | 10 | 39 | 53 | 17 | 40 | 60 | 24 | 41 | 67 | 31 | 42 | 68 | 38 | 74 |
|---|---|---|---|---|---|---|---|---|---|---|---|---|---|---|---|
| 46 | 1.000 | | | | | | | | | | | | | | |
| 10 | 0.669 | 1.000 | | | | | | | | | | | | | |
| 39 | 0.669 | 0.712 | 1.000 | | | | | | | | | | | | |
| 53 | | 0.610 | 0.610 | 1.000 | | | | | | | | | | | |
| 17 | | | | 0.610 | 1.000 | 0.597 | | | | | | | | | |
| 40 | | | | 0.610 | | 1.000 | 0.597 | | | | | | | | |
| 60 | | | | | | 0.712 | 0.619 | | | | | | | | |
| | | | | | | | 1.000 | | | | | | | | |
| 24 | | | | | | | 0.619 | 1.000 | 0.582 | | | | | | |
| 41 | | | | | 0.582 | | 0.619 | 0.712 | 1.000 | 0.582 | | | | | |
| 67 | | | | | | | | | 0.619 | 1.000 | | | | | |
| 31 | | | | | | | 0.511 | | | 0.603 | 1.000 | 0.552 | | | |
| 42 | | | | | | | | | | | 0.603 | 1.000 | | | |
| 68 | | | | | | | | | | | | 0.712 | 1.000 | | |
| 38 | | | | | | | | | | | | | | 1.000 | |
| 74 | | | | | | | | | | | 0.650 | | | 0.841 | 0.841 | 1.000 |

*Figure 6d*

| CLUMP PAIRS | CANDIDATES FOR ADDITION TO CLUMPS | SUCCESSFUL CANDIDATES | PROCESSED CLUMPS | REJECTED OR ACCEPTED | ACCEPTED CLUMPS | AFTER SIMILARITY COMBINING |
|---|---|---|---|---|---|---|
| 46,10 | 39,53 | 39 | 46,10,39 | ACCEPTED | 46,10,39 | 46,10,39,53 |
| 46,39 | 10,53 | 10 | 46,39,10 | REJECTED | 10,39,53 | 53,17,40,60 |
| 10,39 | 53 | 53 | 10,39,53 | ACCEPTED | 53,17,40 | 60,24,41 |
| 10,53 | 39,17,40 | 39 | 10,53,39 | REJECTED | 17,40,60 | 60,74 |
| 39,53 | 17,40 | | 39,53 | REJECTED | 60,24,41 | 24,41,67 |
| 53,17 | 40,60 | 40 | 53,17,40 | ACCEPTED | 60,74 | 67,31,42,74 |
| 53,40 | 17,60 | 17 | 53,40,17 | REJECTED | 24,41,67 | 68 |
| 17,40 | 17,60 | 60 | 17,40,60 | ACCEPTED | 67,31,42 | 38 |
| 17,60 | 40,24,41,74 | 40 | 17,60,40 | REJECTED | 31,42,74 | |
| 40,60 | 24,41,74 | | 40,60 | REJECTED | 68 | |
| 60,24 | 41,74,67 | 41 | 60,24,41 | ACCEPTED | 38 | |
| 60,41 | 74,24,67 | 24 | 60,41,24 | REJECTED | | |
| 60,74 | 31,24 | | 60,74 | ACCEPTED | | |
| 24,41 | 67 | 67 | 24,41,67 | ACCEPTED | | |
| 24,67 | 41,31,42 | 41 | 24,67,41 | REJECTED | | |
| 41,67 | 31,42 | | 41,67 | REJECTED | | |
| 67,31 | 42,74 | 42 | 67,31,42 | ACCEPTED | | |
| 67,42 | 31,74 | 31 | 67,42,31 | REJECTED | | |
| 31,42 | 74 | 74 | 31,42,74 | ACCEPTED | | |
| 31,74 | 42 | 42 | 31,74,42 | REJECTED | | |
| 42,74 | | | 42,74 | REJECTED | | |
| 68 | | | 68 | ACCEPTED | | |
| 38 | | | 38 | ACCEPTED | | |
| 74 | | | 74 | REJECTED | | |

*Figure 6e*

| CLUMP PAIRS | CLUMP PAIR NUMBER |
|---|---|
| 46,10 | 1 |
| 46,39 | 2 |
| 10,39 | 3 |
| 10,53 | 4 |
| 39,53 | 5 |
| 53,17 | 6 |
| 53,40 | 7 |
| 17,40 | 8 |
| 17,60 | 9 |
| 40,60 | 10 |
| 60,24 | 11 |
| 60,41 | 12 |
| 60,74 | 13 |
| 24,41 | 14 |
| 24,67 | 15 |
| 41,67 | 16 |
| 67,31 | 17 |
| 67,42 | 18 |
| 31,42 | 19 |
| 31,74 | 20 |
| 42,74 | 21 |
| 68 | 22 |
| 38 | 23 |
| 74 | 24 |

*Figure 6f*

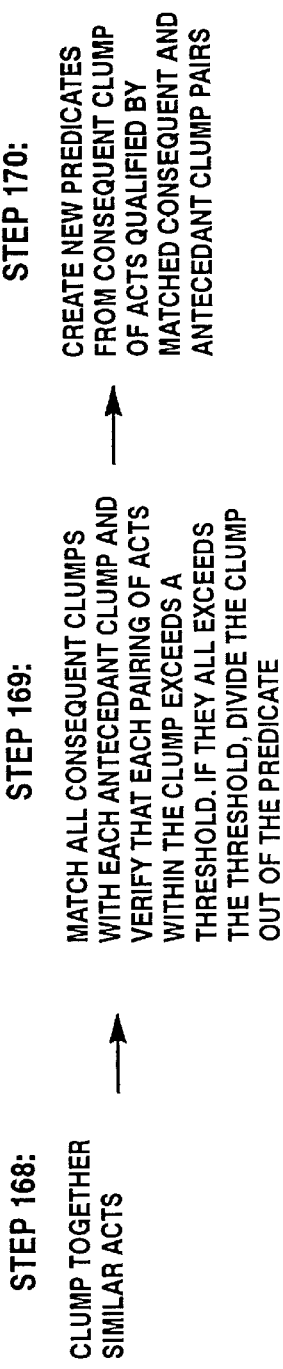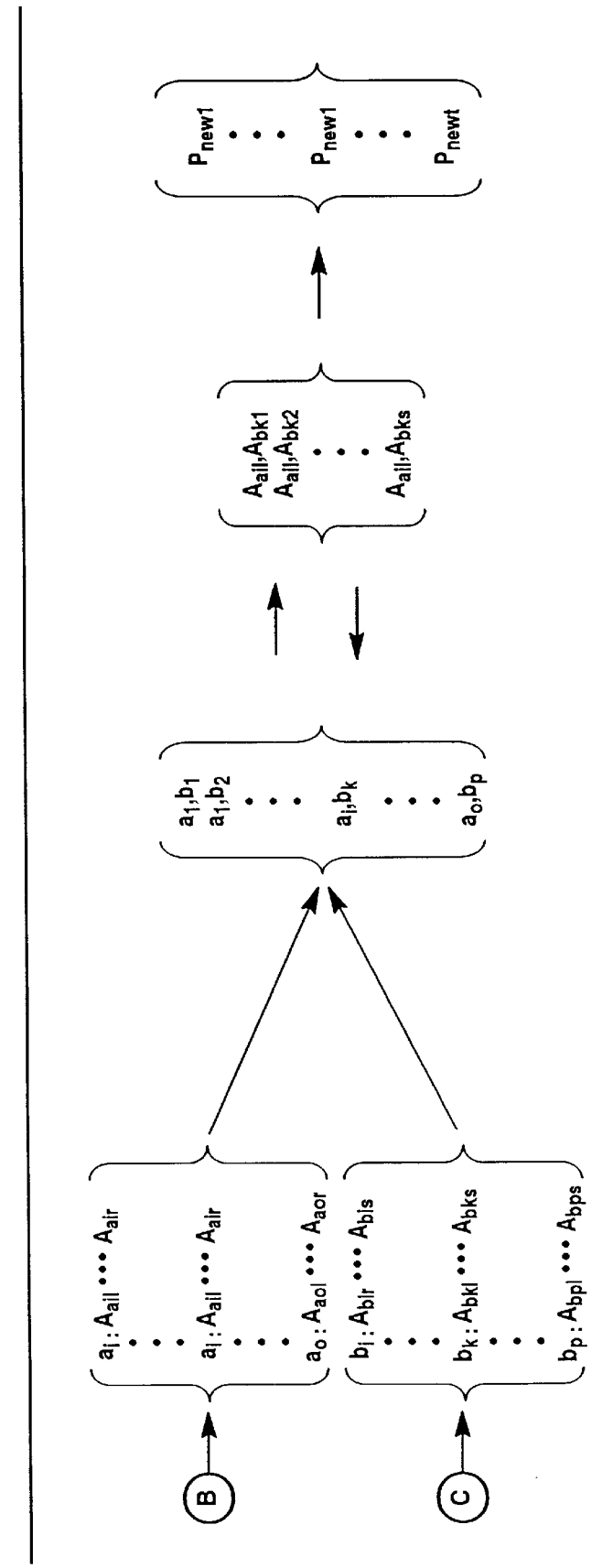
Figure 8b

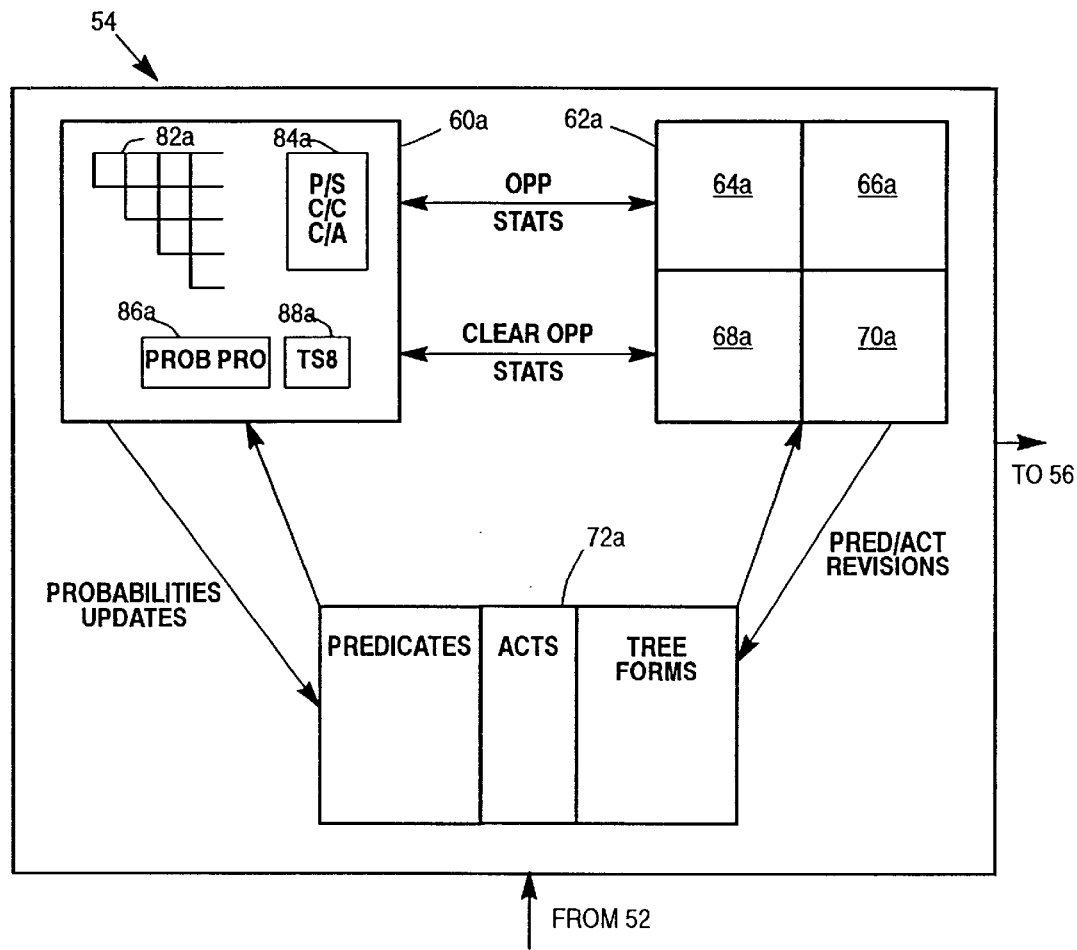
*Figure 9*
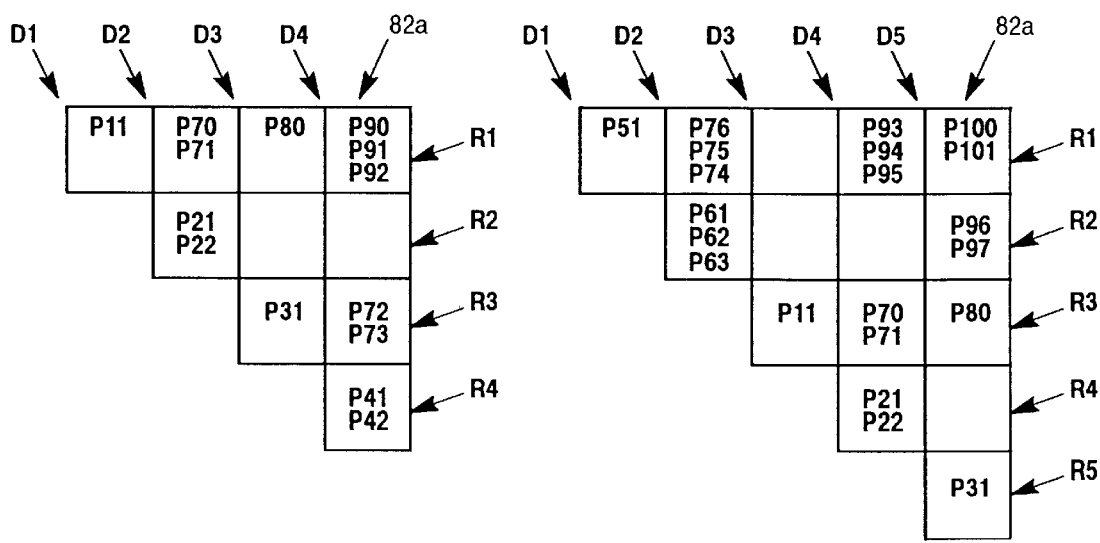
*Figure 11a*   *Figure 11b*

| SECOND ORDER SET INITIATION #1 | | | | | |
|---|---|---|---|---|---|
| SET ELEMENTS | DO | YOU | HAVE | VEAL | |
| MORPHOLOGICAL THOUGHT SIGNS | (DO) | ((YO)U) | (Y(OU)) | ((HA)(VE)) | ((VE)(AL)) | (((VE)A)L) |
| ELEMENTAL TAXEMIC PREDICATES | A11 | A21 | A22 | A31 | A41 | A42 |

*Figure 10a*

| SECOND ORDER SET INITIATION #2 | | | | | |
|---|---|---|---|---|---|
| SET ELEMENTS | WHAT | SALAD | | DO | YOU | HAVE |
| MORPHOLOGICAL THOUGHT SIGNS | ((WH)(AT)) | (((SA)L)(AD)) | ((SA)((LA)D)) | ((SA)L(AD)) | (DO) | ((YO)U) | (Y(OU)) | ((HA)(VE)) |
| ELEMENTAL TAXEMIC PREDICATES | A51 | A61 | A62 | A63 | A11 | A21 | A22 | A31 |

*Figure 10b*

| PREDICATE RECORDS | | CORRESPONDING ACT RECORDS | | | |
|---|---|---|---|---|---|
| P | p | A | CP | RP | p |
| P11 | 1 | A11 | 0 | 0 | 1 |
| P21 | 0.8 | A21 | 0 | 0 | 1 |
| P22 | 0.6 | A22 | 0 | 0 | 1 |
| P31 | 1 | A31 | 0 | 0 | 1 |
| P41 | 0.9 | A41 | 0 | 0 | 1 |
| P42 | 0.3 | A42 | 0 | 0 | 1 |
| P51 | 1 | A51 | 0 | 0 | 1 |
| P61 | 0.2 | A61 | 0 | 0 | 1 |
| P62 | 0.3 | A62 | 0 | 0 | 1 |
| P63 | 0.8 | A63 | 0 | 0 | 1 |
| P70 | 0.5 | A701 | P11 | P21 | 0.5 |
| | | A702 | ... | ... | 0.5 |
| P71 | 0.6 | A711 | P11 | P22 | 1 |
| P72 | 0.8 | A721 | P31 | P41 | 0.4 |
| | | A722 | ... | ... | 0.3 |
| | | A723 | ... | ... | 0.3 |
| P73 | 0.3 | A731 | ... | ... | 0.2 |
| | | A732 | P31 | P42 | 0.8 |
| P74 | 0.5 | A741 | P51 | P61 | 0.5 |
| | | A742 | ... | ... | 0.5 |
| P75 | 0.8 | A751 | P51 | P62 | 1 |
| P76 | 0.3 | A761 | ... | ... | 0.2 |
| | | A762 | P51 | P63 | 0.3 |
| | | A763 | ... | ... | 0.5 |
| P80 | 0.8 | A800 | P70 | P31 | 0.4 |
| | | A801 | P71 | P31 | 0.6 |

| PREDICATE RECORDS | | CORRESPONDING ACT RECORDS | | | |
|---|---|---|---|---|---|
| P | p | A | CP | RP | p |
| P90 | 0.6 | A901 | ... | ... | 0.1 |
| | | A902 | P80 | P41 | 0.7 |
| | | A903 | ... | ... | 0.2 |
| P91 | 0.5 | A911 | P70 | P72 | 0.3 |
| | | A912 | ... | ... | 0.7 |
| P92 | 0.6 | A921 | P71 | P73 | 0.5 |
| | | A922 | P71 | P72 | 0.5 |
| P93 | 0.3 | A931 | P76 | P70 | 0.8 |
| | | A932 | ... | ... | 0.1 |
| | | A933 | ... | ... | 0.1 |
| P94 | 0.2 | A941 | ... | ... | 0.5 |
| | | A942 | P75 | P70 | 0.5 |
| P95 | 0.4 | A951 | ... | ... | 0.2 |
| | | A952 | P74 | P71 | 0.3 |
| | | A953 | ... | ... | 0.5 |
| P96 | 0.2 | A961 | ... | ... | 0.4 |
| | | A962 | P76 | P71 | 0.2 |
| | | A963 | P61 | P80 | 0.4 |
| P97 | 0.1 | A971 | P63 | P80 | 0.3 |
| | | A972 | ... | ... | 0.7 |
| P100 | 0.6 | A100 | P75 | P80 | 0.5 |
| | | A110 | ... | ... | 0.5 |
| P101 | 0.4 | A101 | ... | ... | 0.6 |
| | | A111 | P51 | P96 | 0.4 |
| P102 | 0.3 | A120 | P96 | P31 | 0.2 |
| | | A121 | ... | ... | 0.8 |

*Figure 12a*

| CELL STRUCTURE | BOX ID | D1/R1 | D1/R2 | D2/R1 | D1/R3 | D1/R4 | D2/R3 | D4/R1 | D1/R5 | D3/R3 | D4/R2 | D5/R1 |
|---|---|---|---|---|---|---|---|---|---|---|---|---|
| | PREDICATE | P51 | P61 | P76 | P11 | P21 | P70 | P93 | P31 | P80 | P96 | P100 |
| | ACT(s) | A51 | A61 | A762 | A11 | A21 | A701 | A931 | A31 | A800,A801 | A963 | A100 |
| | RANK | - | - | 3 | - | - | 2 | 3 | - | 1 | 1 | 1 |
| | PREDICATE | | P62 | P75 | | P22 | P71 | P94 | | | P97 | P101 |
| | ACT(s) | | A62 | A751 | | A22 | A711 | A942 | | | A971 | A111 |
| | RANK | | - | 1 | | - | 1 | 1 | | | 2 | 2 |
| | PREDICATE | | P63 | P74 | | | | P95 | | | | |
| | ACT(s) | | A63 | A741 | | | | A952 | | | | |
| | RANK | | - | 2 | | | | 2 | | | | |
| | PREDICATE | | | | | | | P96 | | | | |
| | ACT(s) | | | | | | | A962 | | | | |
| | RANK | | | | | | | 4 | | | | |

CELL RECORDS – ANALYSIS SPACE OF FIGURE 11b

*Figure 12b*

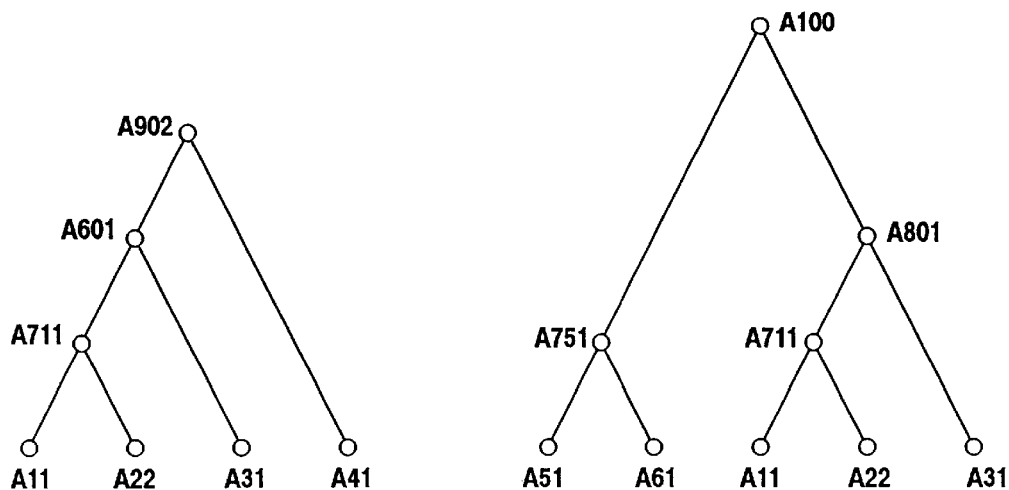
*Figure 13a*  *Figure 13b*
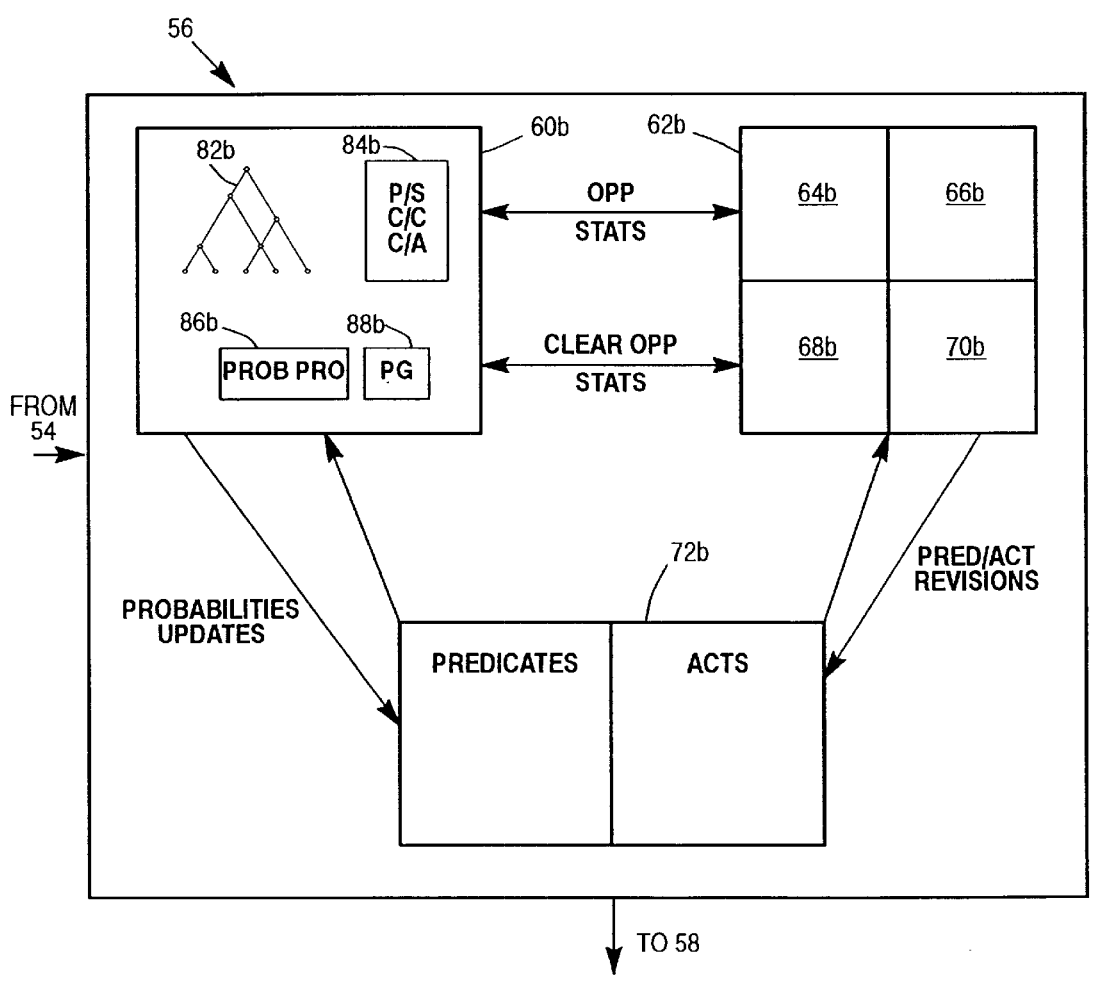
*Figure 14*

| SECOND ORDER SUBSET | TRIADIC TAXEMIC ELEMENTAL ACT INITIATION | | | | | | |
|---|---|---|---|---|---|---|---|
| | DO YOU HAVE VEAL? | DO YOU HAVE | DO YOU | DO | YOU | HAVE | VEAL |
| SUCCESSFUL DYADIC TAXEMIC ACTS | A901 | A801 | A711 | A11 | A22 | A31 | A41 |
| TRIADIC TAXEMIC ELEMENTAL ACTS | A1 | A2 | A3 | A4 | A5 | A6 | A7 |

*Figure 15a*

| SECOND ORDER SUBSET | TRIADIC TAXEMIC ELEMENTAL ACT INITIATION | | | | | | | | |
|---|---|---|---|---|---|---|---|---|---|
| | WHAT SALAD DO YOU HAVE? | WHAT SALAD | WHAT | SALAD | DO YOU HAVE | DO YOU | DO | YOU | HAVE |
| SUCCESSFUL DYADIC TAXEMIC ACTS | A100 | A751 | A51 | A61 | A801 | A711 | A11 | A22 | A31 |
| TRIADIC TAXEMIC ELEMENTAL ACTS | A8 | A9 | A10 | A11 | A2 | A3 | A4 | A5 | A6 |

*Figure 15b*

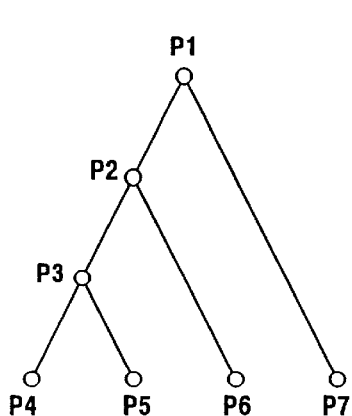
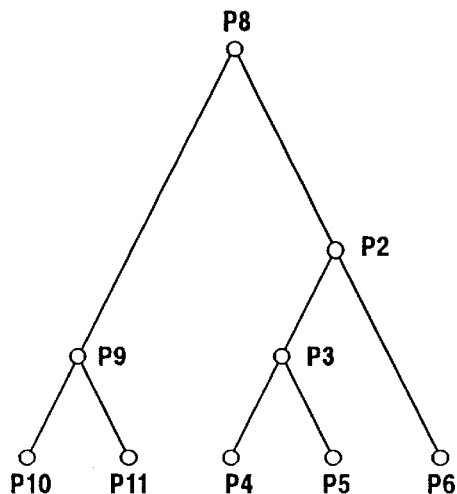
*Fig.16a*  *Fig.16b*
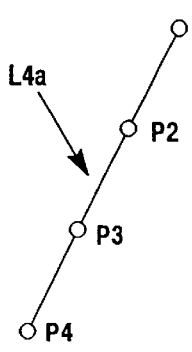
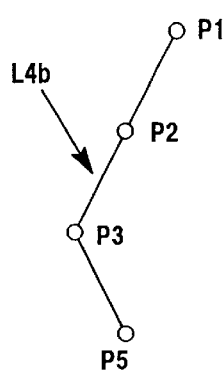
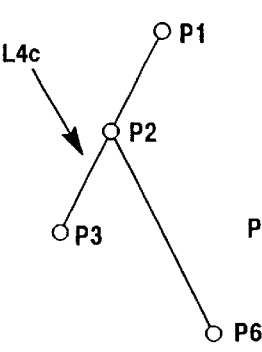
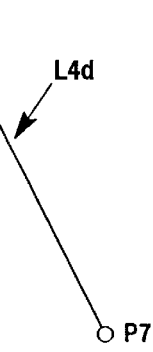
*Fig.17a*  *Fig.17b*  *Fig.17c*  *Fig.17d*
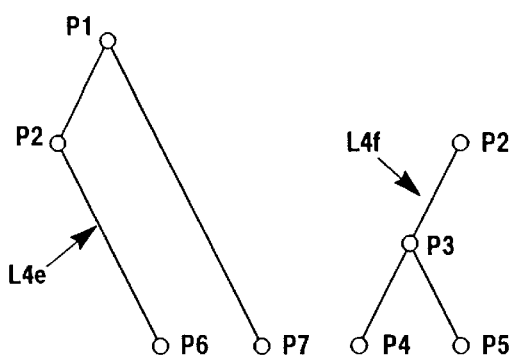
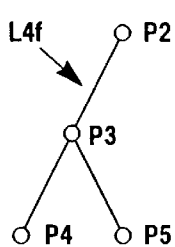
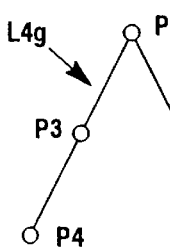
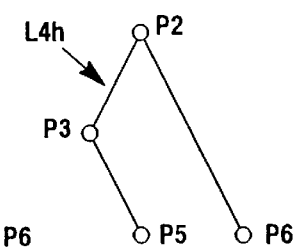
*Fig.17e*  *Fig.17f*  *Fig.17g*  *Fig.17h*

Figure 18a

| PREDICATE RECORDS | | CORRESPONDING ACT RECORDS | | | | |
|---|---|---|---|---|---|---|
| P | p | A | CP | RP | d | p |
| P1 | 1 | A1 | 0 | 0 | ... | 1 |
| P2 | 0.8 | A2 | 0 | 0 | ... | 1 |
| P3 | 0.6 | A3 | 0 | 0 | ... | 1 |
| P4 | 1 | A4 | 0 | 0 | ... | 1 |
| P5 | 0.9 | A5 | 0 | 0 | ... | 1 |
| P6 | 0.3 | A6 | 0 | 0 | ... | 1 |
| P7 | 1 | A7 | 0 | 0 | ... | 1 |
| P21 | 0.3 | A210 | P1 | P2 | L | 0.5 |
| | | A211 | ... | ... | ... | 0.5 |
| P22 | 0.8 | A220 | P1 | P7 | R | 0.7 |
| | | A221 | ... | ... | ... | 0.3 |
| P23 | 0.5 | A230 | P2 | P6 | R | 0.4 |
| | | A231 | ... | ... | ... | 0.6 |
| P24 | 0.6 | A240 | P2 | P3 | L | 0.3 |
| | | A241 | ... | ... | ... | 0.7 |
| P25 | 0.8 | A250 | P3 | P4 | L | 0.4 |
| | | A251 | ... | ... | ... | 0.7 |
| P26 | 0.3 | A260 | P3 | P5 | R | 0.2 |
| | | A261 | ... | ... | ... | 0.8 |
| P31 | 0.5 | A310 | P22 | P2 | L | 0.3 |
| | | A311 | ... | ... | ... | 0.5 |
| | | A312 | ... | ... | ... | 0.2 |
| P32 | 0.8 | A320 | P2 | P25 | L | 0.2 |
| | | A321 | ... | ... | ... | 0.8 |
| P33 | 0.3 | A330 | P2 | P26 | L | 0.4 |
| | | A331 | ... | ... | ... | 0.6 |

| PREDICATE RECORDS | | CORRESPONDING ACT RECORDS | | | | |
|---|---|---|---|---|---|---|
| P | p | A | CP | RP | d | p |
| P34 | 0.6 | A340 | P25 | P5 | R | 0.5 |
| | | A341 | ... | ... | ... | 0.5 |
| P35 | 0.6 | A350 | P26 | P4 | L | 0.6 |
| | | A351 | ... | ... | ... | 0.4 |
| P41 | 0.5 | A410 | P31 | P3 | L | 0.1 |
| | | A411 | ... | ... | ... | 0.9 |
| P42 | 0.6 | A420 | P2 | P34 | L | 0.3 |
| | | A421 | ... | ... | ... | 0.7 |
| P43 | 0.3 | A430 | P2 | P35 | L | 0.3 |
| | | A431 | ... | ... | ... | 0.7 |
| P51 | 0.2 | A510 | P23 | P34 | L | 0.8 |
| | | A511 | ... | ... | ... | 0.2 |
| P52 | 0.4 | A520 | P23 | P35 | L | 0.4 |
| | | A521 | ... | ... | ... | 0.1 |
| | | A522 | ... | ... | ... | 0.5 |
| P61 | 0.2 | A610 | P1 | P52 | L | 0.2 |
| | | A611 | ... | ... | ... | 0.4 |
| | | A612 | ... | ... | ... | 0.4 |
| P62 | 0.1 | A620 | P22 | P42 | L | 0.1 |
| | | A621 | ... | ... | ... | 0.9 |
| P71 | 0.6 | A710 | P22 | P51 | L | 0.5 |
| | | A711 | ... | ... | ... | 0.5 |
| P72 | 0.4 | A720 | P61 | P7 | R | 0.5 |
| | | A721 | ... | ... | ... | 0.5 |
| P73 | 0.3 | A730 | P62 | P6 | R | 0.5 |
| | | A731 | ... | ... | ... | 0.5 |

*Figure 19a*

| CELL STRUCTURE | L2a | L2c | L2e | L3d | L2f | L3e | L3g | L4f | L2d | L5g | L6a | L2b | L3c | L4e | L6b | L7 |
|---|---|---|---|---|---|---|---|---|---|---|---|---|---|---|---|---|
| BOX ID |  |  |  |  |  |  |  |  |  |  |  |  |  |  |  |  |
| PREDICATE | P21 | P23 | P25 | P32 | P26 | P33 | P34 | P42 | P24 | P51 | P61 | P22 | P31 | P41 | P62 | P71 |
| ACT(s) | A210 | A230 | A250 | A320 | A260 | A330 | A340 | A420 | A240 | A510 | P610 | A220 | A310 | A410 | A620 | A710 |
| RANK | 1 | 1 | 1 | 1 | 1 | 1 | 1 | 1 | 1 | 1 | 1 | 1 | 1 | 1 | 1 | 1 |
| PREDICATE |  |  |  |  |  |  | P35 | P43 |  | P52 |  |  |  |  |  | P72 |
| ACT(s) |  |  |  |  |  |  | A350 | A430 |  | A520 |  |  |  |  |  | A720 |
| RANK |  |  |  |  |  |  | 2 | 2 |  | 2 |  |  |  |  |  | 3 |
| PREDICATE |  |  |  |  |  |  |  |  |  |  |  |  |  |  |  | P73 |
| ACT(s) |  |  |  |  |  |  |  |  |  |  |  |  |  |  |  | A730 |
| RANK |  |  |  |  |  |  |  |  |  |  |  |  |  |  |  | 2 |

CELL RECORDS – ANALYSIS SPACE OF FIGURE 18b

*Figure 19b*

| TOKEN 'INSTALLATION' | | |
|---|---|---|
| RESPONSE 1 | OCCURRENCE 7 | PROBABILITY 0.467 |
| RESPONSE 2 | OCCURRENCE 1 | PROBABILITY 0.067 |
| RESPONSE 7 | OCCURRENCE 1 | PROBABILITY 0.067 |
| RESPONSE 8 | OCCURRENCE 1 | PROBABILITY 0.067 |
| RESPONSE 9 | OCCURRENCE 4 | PROBABILITY 0.267 |
| RESPONSE 10 | OCCURRENCE 1 | PROBABILITY 0.067 |

| RESPONSE CATEGORY | FREQUENCY OF OCCURENCE | PROBABILITY OF OCCURENCE |
|---|---|---|
| 1 | 228 | 0.125 |
| 2 | 68 | 0.064 |
| 3 | 145 | 0.137 |
| 4 | 173 | 0.163 |
| 5 | 112 | 0.105 |
| 6 | 85 | 0.080 |
| 7 | 75 | 0.071 |
| 8 | 127 | 0.120 |
| 9 | 37 | 0.035 |
| 10 | 12 | 0.011 |

*Figure 23*

| | | RESPONSE CATEGORY | | | | | | | | | |
|---|---|---|---|---|---|---|---|---|---|---|---|
| | TOKEN | 1 | 2 | 3 | 4 | 5 | 6 | 7 | 8 | 9 | 10 |
| Q U E R Y | INSTALL | 0.307 | | 0.044 | 0.202 | 0.035 | | 0.088 | 0.219 | 0.070 | 0.035 |
| | NEW | 0.298 | 0.036 | 0.179 | 0.048 | 0.095 | 0.036 | 0.083 | 0.119 | 0.071 | 0.036 |
| | PC | 0.610 | 0.048 | 0.105 | 0.029 | 0.114 | | 0.019 | 0.038 | 0.038 | |
| | LAN | 0.169 | 0.305 | 0.017 | 0.068 | 0.373 | | 0.017 | 0.017 | 0.034 | |
| | CONNECTION | 0.188 | | 0.125 | | 0.563 | | 0.063 | 0.063 | | |
| | ETC | 0.200 | | 0.200 | | | | | 0.400 | 0.200 | |
| | SUM | 1.324 | 0.357 | 0.329 | 0.304 | 1.095 | 0.004 | 0.195 | 0.749 | 0.389 | 0.039 |

*Figure 24*

SEMIOTIC DECISION MAKING SYSTEM FOR RESPONDING TO NATURAL LANGUAGE QUERIES AND COMPONENTS THEREOF

CROSS REFERENCES TO RELATED APPLICATIONS

This patent is a continuation of Application Ser. No. 09/364,192, filed Jul. 30, 1997, U.S. Pat. No. 6,278,987.

BACKGROUND OF THE INVENTION

1. Field of the Invention

The invention generally relates to a method and system for making decisions based on a statistical interpretation of sign or symbol relationships. In particular, the invention relates to a method and system for making decisions based on a recursive statistical interpretation of linguistic sign and symbol relationships.

2. Description of the Prior Art

There have been a variety of approaches taken in developing devices which can interpret linguistic information. One known approach is to create a model of language by defining rules of grammar that are used by the system. In such systems, concepts such as nouns and verbs must be codified in software or by some other means for the system to have understanding of the human language. One advantage of such a system is that the knowledge of the designers is provided through code to the system. However, such systems are limited by the models used to create them.

Another approach is to allow a device itself to interpret the data. The device learns on its own the fundamentals of grammar or symbol relationships. This approach effectively eliminates designer-based limitations. However, such systems have been computationally complex. All of the possibilities of grammar or permissible symbol relationships create an ever exponentiating explosion of computations.

An object of the current invention is to provide an automated system and method for making decisions which are independent of the constraints of any specific language or other system of symbolic representation. A further object is to provide such a system which does not require unreasonably long computational time or unreasonably large memory requirements.

SUMMARY OF THE INVENTION

The autognome (gnome) is a device for statistically analyzing the relationships between signs or symbols, preferably on two levels, to make decisions. The signs the gnome is analyzing in the preferred embodiment are alphanumeric characters which form text. The analyzed text can be from a variety of sources, i.e. scanned in documents or from voice recognition devices. The gnome can be used to make decisions in virtually any context. Examples include responding to queries concerning menu items for a cafe and responding to e-mail inquiries.

A preferred autognomic decision making system includes a sensing module, a dyadic morphologic module, a dyadic taxemic module, a triadic taxemic module and a pseudo deduction module. The sensor component receives sets of training and query data in a prespecified format, identifies elemental symbols and defines delimiters, of preferably two orders, in the sensed data. First order delimiters define first order sets of sequential elemental symbols and second order delimiters define second order sets of sequential first order sets.

The dyadic morphologic component receives the sequential elemental symbols identified by the sensor component and evaluates the sequential relationship of elemental symbols and sets of elemental symbols within first order sets. For training data, the morphologic component identifies a most statistically significant set of subsets of each first order set of elemental symbols as a token associated with that first order set. For query data, the morphologic component identifies the most statistically significant set or sets of subsets of each first order set of elemental symbols which corresponds to training generated tokens and identifies such corresponding tokens as tokens associated with that first order set of query data.

The dyadic taxemic component receives representations of the sequential first order sets of elemental symbols and evaluates the sequential relationship of first order sets and subsets of sequential first order sets within each second order set. The dyadic taxemic component identifies a most statistically significant tree of subsets of each second order set which includes all the elements of the second order set as well as each subtree included within the most statistically significant tree. In some instances, a single tree is not identified with respect to a particular second order set so that two or possibly more most statistically significant trees which have no common element of the second order set, but collectively include all of the elements of the second order set, are identified as well as their subtrees.

The triadic taxemic component receives the most statistically significant trees corresponding to each second order set identified by the dyadic taxemic module and evaluates the sequential relationship of the subtree elements of each tree. For each second order set, the triadic taxemic component identifies one or more most statistically significant groupings of subtree elements called percepts as tokens with respect to the corresponding second order set.

The dyadic and triadic modules may all be variations of a single generalized semiotic processing module. In operation, the gnome can call the generalized semiotic module and provide instructions and parameters for the generalized semiotic module to operate as a dyadic or triadic, morphologic or taxemic module. This enables the configuration of the gnome of the present invention to be readily altered dependent upon the specified application in which it is used.

In the preferred embodiment, a pseudo deduction module receives identified tokens, preferably from both the dyadic morphologic module and the triadic taxemic module, and stock answers or response categories associated with respective sets of training data. The pseudo deduction module associates each stock answer or response category with the tokens generated from the evaluation of one or more respective sets of training data associated with that answer or category. The pseudo deduction module then evaluates tokens generated from a set of sensed query data and identifies a statistically most significant stock answer or response category associated with the generated query data tokens.

In the preferred embodiment, the prespecified data is in a linguistic form where the sensor component identifies linguistic symbols as elemental symbols, spaces and punctuation as first order delimiters and selected sentence punctuation, i.e. periods, question marks, and exclamation points, as second order delimiters. As such, first order sets are generally words and second order sets are generally sentences or sentence phrases. The sensor also preferably identifies artificial delimiters based on a selected maximum word or sentence length.

In operation, the gnome first analyzes a training corpus, i.e. training data associated with a set of response categories, in a training mode. During training mode the gnome creates a knowledge data base in the dyadic and triadic modules. The gnome is then switched to a performance mode to receive inquiries. In response to a query, the gnome selects a statistically most appropriate response out of the set of response categories based upon the knowledge data generated during training. A response can then be provided containing a selected stock answer, routing or combination thereof which is mapped to the selected response category. However, in the preferred embodiment, if the most statistically appropriate response category does not meet a pre-specified criteria, a response indicating that the gnome is unable to provide a satisfactory answer is provided to the inquirer.

As will be apparent to those skilled in the art, one of the major advantages of the gnome's analysis technique is that it is equally applicable to languages other than English, for example French, German, etc., to symbol based languages such as Chinese and Japanese, and to non-language symbolic environments.

BRIEF DESCRIPTION OF THE DRAWINGS

FIG. 2 is an illustration of the semiotic processes used in the dyadic morphologic module of the system of FIG. 1a.

FIG. 3 is an illustration of knowledge space record formats for the dyadic morphologic module illustrated in FIG. 2.

FIGS. 6a and 6b are illustrated flow diagrams of abductive generalization.

FIGS. 6c and 6d are illustrations of an example connection matrix.

FIG. 6e is a table illustrating the clumping process as applied to FIG. 6d.

FIG. 6f is a table showing the clump pair number assigned to each clump pair in FIG. 6e for use in multiprocessing.

FIGS. 8a and 8b are illustrated flow diagrams of abductive distinction.

FIG. 9 is an illustration of the semiotic processes used in the dyadic taxemic module of the system of FIG. 1a.

FIGS. 10a and 10b are illustrative tables showing the assignment of elemental dyadic taxemic predicates.

FIGS 11a and 11b are representations of completed analysis spaces of the dyadic taxemic induction submodule of FIG. 9.

FIG. 12a is a listing of portions of pertinent data records with respect to the predicates which complete the analysis spaces illustrated in FIGS. 11a and 11 b.

FIG. 12b is a representation of cell records of the analysis space illustrated in FIG. 11b.

FIGS. 13a and 13b are representative successful act tree forms corresponding to the completed dyadic taxemic analysis spaces of FIGS. 11a and 11b respectively.

FIG. 14 is an illustration of the semiotic processes used in the triadic taxemic module of the system of FIG. 1a.

FIGS. 15a and 15b are graphic illustrations of the assignment of triadic taxemic elemental acts in the triadic taxemic module illustrated in FIG. 14 from the dyadic taxemic tree forms illustrated in FIGS. 13a and 13b.

FIGS. 16a and 16b are illustrations of tree structures which form the basis for two different analysis spaces of the induction submodule of the triadic taxemic module illustrated in FIG. 14.

FIGS. 17a, 17 b, 17c, 17d, 17e, 17f, 17g, and 17h are illustrations of four-node subtrees of the triadic taxemic tree structure illustrated in FIG. 16a.

FIGS. 18a and 18b are illustrations of the triadic taxemic analysis space of the triadic taxemic induction submodule illustrated in FIG. 14 having boxes L4a–L4h corresponding to the four-node subtrees of FIGS. 17a–17h.

FIG. 19a is a listing of portions of pertinent data records with respect to the predicates which complete the triadic taxemic analysis space illustrated in FIG. 18b.

FIG. 19b is a representation of cell records of the analysis space illustrated in FIG. 18b.

FIG. 21 is a block diagram of the pseudo-deduction module of the system of FIG. 1a.

FIG. 22 is a table of token frequencies and probabilities of occurrence for a specific token.

FIG. 23 is a table of response frequencies and probabilities of occurrence of response categories.

FIG. 24 is a table of scores for response categories in relation to an example query.

FIG. 25 is a flow diagram of the procedure utilized in performance mode of the system of FIG. 1a.

DESCRIPTION OF A PREFERRED EMBODIMENT

Figure 1A:
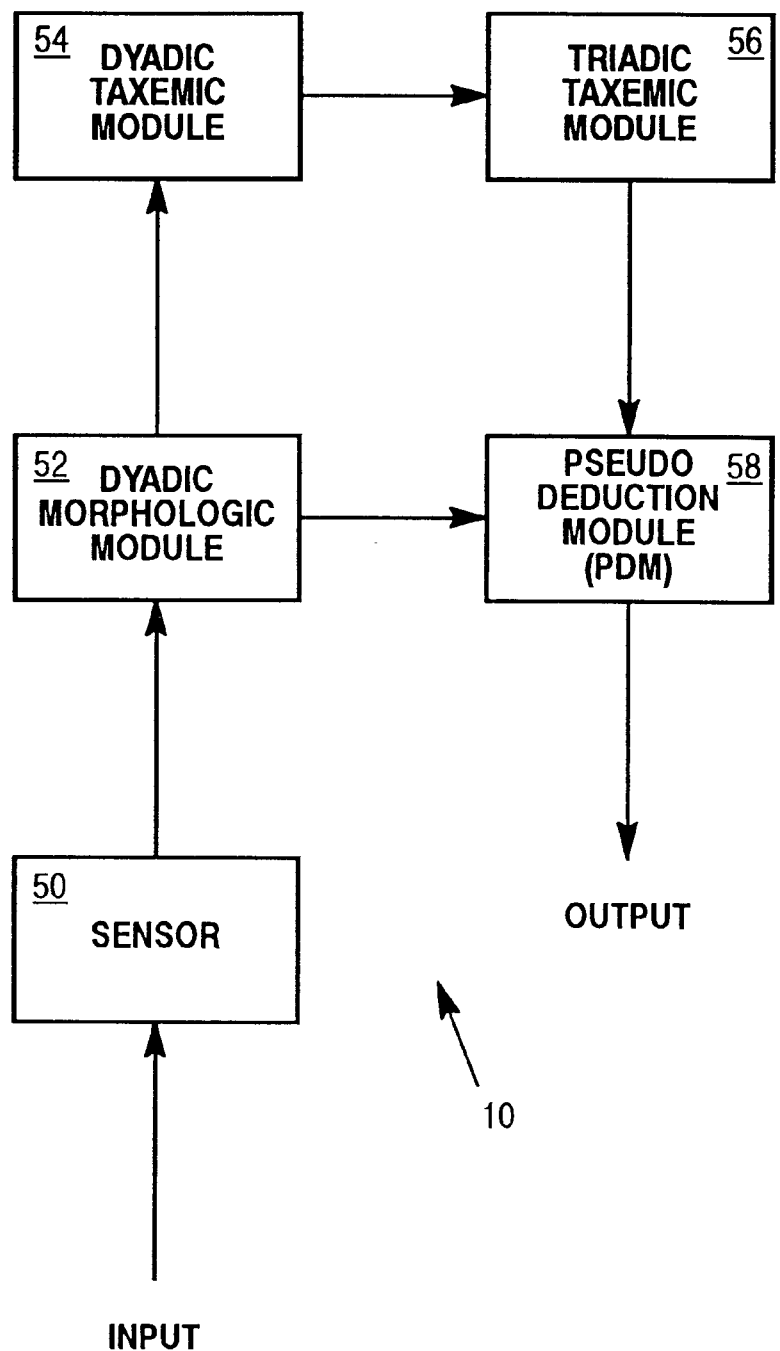
FIG. 1a is a block diagram of a preferred autognome system made in accordance with the teachings of the invention.

FIG. 1a shows the five major components of a gnome 10 of a presently preferred embodiment. The gnome 10 has a sensing module 50, a dyadic morphologic module 52, a dyadic taxemic module 54, a triadic taxemic module 56 and a pseudo deduction module 58. The dyadic and triadic modules 52, 54, 56 all utilize semiotic processing and are also referred to as semiotic modules.

The sensor 50 acts as the interface between the other components in the gnome and the training and query data which it senses. The sensor 50 is configured to receive data in a prespecified format and identifies elemental symbols to be analyzed and, preferably, identifies or creates two orders of delimiters. The first order delimiters identify first order sets of sequential elemental symbols; the second order delimiters identify second order sets of sequential first order sets.

In the preferred embodiment, text is sensed by the sensor 50. Alpha-numeric characters are identified as elemental symbols. Spaces and punctuation are identified as first order delimiters. End of sentence punctuation symbols, such as periods, question marks and exclamation points, are identified as second order delimiters. If the sensor 50 encounters an unknown symbol, the unknown symbol is identified as a new elemental symbol. Accordingly, first order sets in a preferred embodiment include letter sequences forming words. However, any sequence of letters and/or numbers may be viewed as a first order set. Second order sets are generally word sequences forming phrases and/or sentences.

Where there are no natural delimiters in the sensed data, the sensor 50 can create artificial delimiters to divide the data into sequential sets of symbols and sets of artificially delimited symbol sets. For example, graphic scanning data can be represented by a sequential series of binary symbols. The sequential data can be artificially grouped into sets of a given size within a preferred range of 2 to 40, preferably sets of 20, sequential symbols for morphologic analysis. The sensor 50 can also be configured to artificially delimit sequential sets of artificially delimited sets. Preferably second order sets having from 2 to 30 sequential first order set elements, preferably 20, can be artificially delimited for dyadic taxemic analysis.

In the preferred embodiment, the sensor 50 effectively creates artificial first and second order delimiters to define a maximum word length and a maximum phrase/sentence length, respectively. Both the preferred word and phrase/sentence length is 20. For example the first 20 letters of any word having more than 20 letters is treated as a first order set. The remaining letters are treated as a subsequent first order set. Defining such limits assists in maintaining the processing time and memory requirements to reasonable limits. Preferably, the maximum word length parameter does not exceed 40 letters and the maximum phrase/sentence length does not exceed 30 words. The maximum sentence length is less, since triadic analysis, requires 2n−1 levels of analysis for an n element second order set, in contrast to the n levels of analysis required of n element sets in dyadic analysis.

The dyadic morphologic module 52 analyzes the sequential relationships between elemental symbols and subsets of elemental symbols contained in first order sets of such symbols. In the preferred embodiment, the dyadic morphologic module 52 analyzes the sequential relationships between ordered pairs of letters and order pair analysis subsets of sequential letters in words which include letter/letter, subset/letter, letter/subset, and subset/subset ordered pairs. Through recursive analysis of such relationships for each word which constitutes data in a training corpus, statistically significant sets of ordered pair subsets of each first order set of elemental symbols are identified as a thought sign.

Thought signs for statistically significant sets of subsets of entire first order sets are called free thought signs and include each first order set element as well as a nested set of ordered pair subsets. To reduce processing time, a maximum number of thought signs to be created for each first order set is selected, preferably six, for training mode. Additionally, in training mode, thought signs are preferably only created if each associated predicate exceeds a convergence threshold. Preferably, the convergence threshold is set at 0.5. As explained in detail below, if less than six statistically significant sets of subsets have corresponding predicates exceeding the threshold, less than six thought signs are created. However, if no statistically significant set of subsets has a predicate which meets the threshold, a thought sign for the set associated with the predicate having the highest probability is created.

In performance mode, thought signs created during training mode which most closely correspond to the statistically significant sets of subsets which represent a complete analysis of each first order set of query data are utilized. Preferably, only one most significant thought sign is used. This most significant thought sign represents the complete analysis of the predicate having the highest probability and meeting the convergence criteria. If none meet the convergence criteria, the thought sign for the set of subsets with the predicate having the highest probability is used.

The term bound thought sign is used to identify each of a pair of subsets of the free thought sign. For example, in analyzing the word "picture" the dyadic morphologic module 52 may identify one or more thought signs associated with all the letters p, i, c, t, u, r, and e which each progressively contains an analysis of ordered pairs of single or multiple sequential letter analyses in essentially a nested relationship. A free thought sign is developed such that it is defined by a highest nested ordered pair of subset analyses where the first analysis contains an analysis of the first element of the first order set and the second analysis contains an analysis of the last element of the first order set. The thought signs for such first and second analyses are bound thought signs.

For example, a highest nested subset pair of one free thought sign for "picture" may include an ordered pair subset analysis of the letters p and i paired with an ordered pair subset analysis of the letters c, t, u, r, and e. A highest subset pair of a different free thought sign for "picture" may include an ordered pair subset analysis of the letters p, i, c, and t paired with an ordered pair subset analysis of the letters u, r, and e. Each such highest ordered pair subset analysis of free thought signs is identified as a bound thought sign.

For single letter words such as "a", the free thought sign analysis only includes a single element corresponding to the letter "a" so there are no bound thought signs associated with the word "a". A two letter word such as "to" has a free thought sign corresponding to the set including an ordered pair representing "t" followed by "o", an element corresponding to "f", and an element corresponding to "o" so that it has bound thought signs represented by one set containing the element corresponding to "t" and another set containing the element corresponding to "o".

A three letter word such as "the" may have a free thought sign corresponding to the set consisting of an ordered pair representing "t" followed an ordered pair representing an analysis of "he", an element corresponding to "t", an ordered pair representing "h" followed by "e", an element corresponding to "h", and an element corresponding to "e". One corresponding bound thought sign is represented by a set containing the element corresponding to "t". The other corresponding bound thought sign is represented by a set containing the ordered pair representing "h" followed by "e", the element corresponding to "h", and the element corresponding to "e". In that example the pair of elements corresponding to the elements "h" and "e" are in the nested ordered pair of analyses of the subset analysis of "he".

In the preferred embodiment, the dyadic morphologic module identifies the most significant free thought sign and associated bound thought signs for each word as "tokens" which are passed to the pseudo deduction module 58 for further analysis. Tokens are advantageously used by the pseudo deduction module to identify a statistical association of the first order sets with an associated response category. The dyadic morphologic module also preferably passes all free thought signs to the dyadic taxemic module for processing as second order set elements.

At a minimum, at least one thought sign representation of each word, i.e. first order set, is passed from the dyadic morphologic module 52 to the dyadic taxemic module 54. Where only a single thought sign is passed for each word, the result is equivalent to the sensor module 50 directly passing first order set sequences to the dyadic taxemic module 54.

In cases where multiple thought signs are passed to the dyadic taxemic module, the dyadic taxemic module will identify one corresponding elemental predicate as successful at the end of dyadic taxemic processing. The morphologic thought sign corresponding to the successful taxemic elemental predicate is then identified as the morphologic token which is passed to the pseudo deduction module 58.

The dyadic taxemic module 54 analyzes the sequential relationships between first order symbol sets and subsets of first order sets contained in second order sets of sequential first order sets. In the preferred embodiment, the dyadic taxemic module 54 analyzes the sequential relationships between words and subsets of sequential words in sentences where each word may have as many as six possible representations as passed up from the morphologic module.

Through recursive analysis of such relationships within each of the sentences which constitute data in a training corpus, a most statistically significant set of subsets of each second order set of first order symbol sets is identified in a tree form defined by various levels of significant subset ordered pairings in essentially a nested relationship. The most statistically significant tree form associated with each sentence is passed to the triadic taxemic module 56 for further analysis. The tree form is represented at the lowest level by terminal nodes, each representing a successive word of a sentence which constitutes a second order set. Higher level nodes represent ordered pairs of lower level nodes of either the same or different level. A single highest level node represents an analysis of the entire sentence. For a sentence having n words, 2n−1 nodes are contained in any tree form which represents a complete analysis of the entire sentence being analyzed. Accordingly, imposing a maximum sentence length controls the processing time required for both the dyadic and triadic taxemic modules 54, 56.

The triadic taxemic module 56 analyzes the ordered relationships of nodes in the tree forms identified by the dyadic taxemic module 54. The triadic taxemic component identifies statistically significant groupings of nodes and ordered node subsets including node/node, subset/node, node/subset, and subset/subset combinations through a recursive analysis. The triadic taxemic component 56 identifies a most statistically significant grouping of nodes and ordered subsets. Using the groupings, percepts are generated. The percepts are passed to the pseudo deduction module 58 as tokens for further analysis.

The pseudo deduction module preferably receives tokens from the dyadic morphologic module 52 and the triadic taxemic module 58 along with stock answers associated with respective sets of training data. The pseudo deduction module 58 associates each stock answer with the tokens generated from the evaluation of one or more respective sets of training data associated with that answer. When switched to performance mode, the pseudo deduction module evaluates tokens generated from the analysis of sensed query data and identifies a statistically most significant stock answer associated with the tokens that have been associated with the query data.

While it is presently preferred to utilize tokens sent by both the dyadic morphologic and triadic taxemic components for both training and performance modes, the gnome can function by utilizing tokens generated only by the dyadic morphologic module 52 or the triadic taxemic module 58. Moreover, tokens may also be sent by the dyadic taxemic module based on second order thought signs created in a manner corresponding to the generation of tokens based on thought signs by the dyadic morphologic module. The pseudo deduction module 58 can utilize the tokens generated by any single semiotic module 52, 54, 56 or any combination of those modules 52, 54, 56 for training or performance. Preferably, however, only one type of taxemic tokens are used. While the use of a pseudo deduction module is presently preferred to utilize the generated tokens to make decisions, the tokens themselves are suitable for use for other decision making purposes or processes. For example, tokens generated from an English language training corpus can be correlated with tokens generated from a corresponding French language corpus for use in a translation program application.

The dyadic morphologic 52, dyadic taxemic 54 and triadic taxemic 56 modules use two semiotic processes to analyze data in conjunction with a knowledge base 72. These two processes are called induction 60 and abduction 62.

In induction 60, the gnome analyzes sequential relationships of ordered pairs of set elements and recursively formed ordered pairs of elements and ordered pairs. Induction 60 uses the data stored in the knowledge base 72 for its analysis. Induction 60 tracks various relational statistics for use by abduction 62 and tracks usage of knowledge base data statistics which it uses to adjust the probability statistics of the ordered pair data within the knowledge base 72.

In abduction 62, the gnome modifies the data records stored in the knowledge base 72 based on the statistics tracked by the inductive process and probabilities associated with the knowledge base data. Abductions are only performed in training mode.

In performance mode, the gnome relies upon data in the knowledge base 72 which was generated and modified during training. Query data can be used to update data in the knowledge base 72. For example, query data and generated answers can be reviewed for accuracy. If the answer for a query was correct, it is considered valid. If the answer was incorrect or no answer provided by the gnome, a valid answer for the query is determined and supplied. The query data and valid answers would then be inputted into the sensor 50 for inductive and abductive analyses under training mode.

The abduction process contains four sub-processes: generalization 64, identification 66, distinction 68 and elimination 70. In generalization 64, the gnome adds elements to the knowledge base 72. In identification 66, the gnome combines elements in the knowledge base 72. In distinction 68, the gnome divides elements in the knowledge base 72. In is elimination 70, the gnome removes elements in the knowledge base 72.

Figure 1B:
FIGS 1b, c, 1d and 1e are block diagrams of alternative configurations of an autognome system made in accordance with the teachings of the present invention.
Figure 1C:
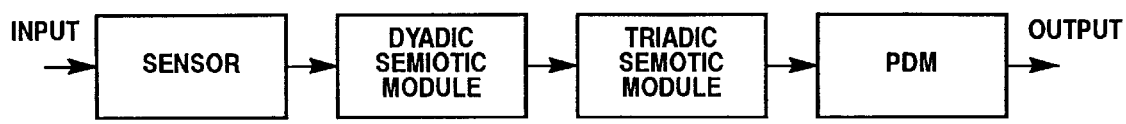
Figure 1D:
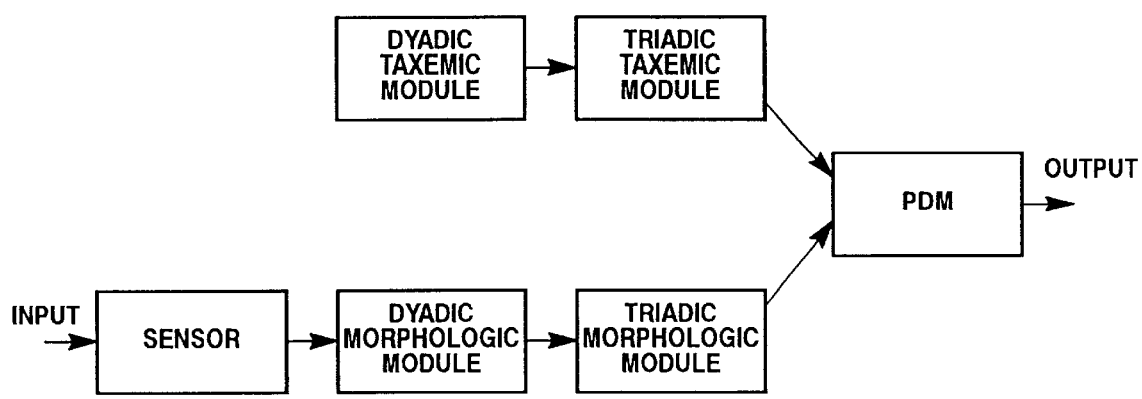

As illustrated in FIGS. 1*b*–*d*, a variety of alternate configurations for the gnome are easily implemented in accordance with the teachings of the present invention. Since each semiotic processing step consumes both time and memory, in some applications it may be desired to use a single dyadic semiotic module as illustrated in FIG. 1*b*. The determination to use such a configuration can be made through first processing a training corpus and then testing in performance mode, as explained in detail below, to ascertain whether acceptable results are being achieved with the single semiotic module.

The configuration as illustrated in FIG. 1*c*, where a single dyadic and single triadic module are employed, may also be desired as a result of testing. The gnome as configured in FIG. 1c may also be advantageously utilized, for example, in a scanning application where it is difficult to ascertain any natural occurrence of both first and second order sets. In the example configurations illustrated in FIGS. 1b and 1c, the sensor will only identify or create first order delimiters since only first order sets of sequential elements are analyzed.

The configuration illustrated in FIG. 1d includes the addition of processing with a triadic morphological module, which in some instances may prove to produce more reliable answers. However, there is a trade off in whether an improvement in reliability is offset by the additional processing time and memory requirements needed for the additional semiotic module. In the configuration illustrated in FIG. 1d, dyadic morphologic thought signs serve as tree forms for triadic morphologic processing.

Figure 1E:
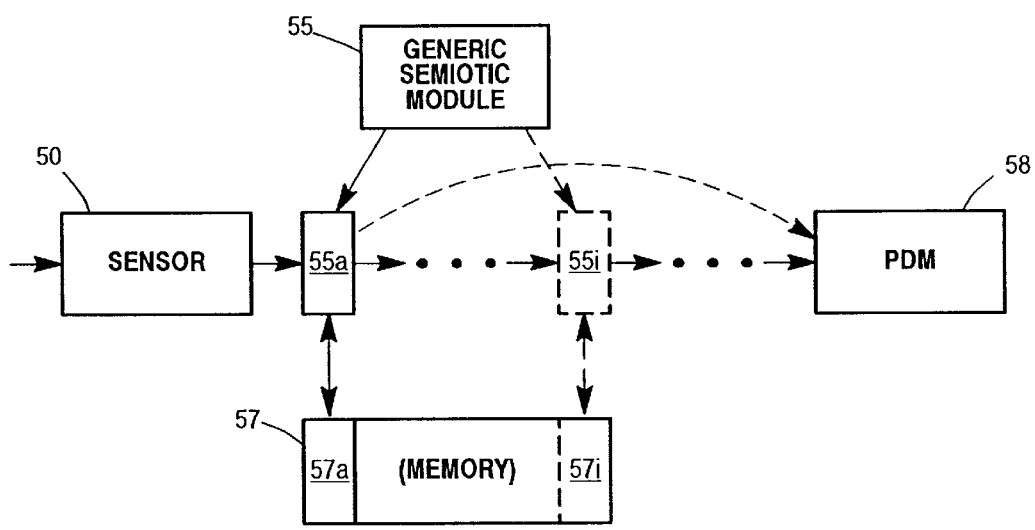

The semiotic processing modules of the present invention function in essentially the same manner with variations in the source of input, type of output(s), operating parameters and some minor differences in data structure, particularly between dyadic and triadic processing. As illustrated in FIG. 1e, this enables the use of a single generic semiotic processing module 55 which is called to perform the function of each of one or more various semiotic processing steps 55a–55i in the configuration of the system selected. This feature enables the user to make a run time selection of the configuration to be utilized.

In a run time configurable system, following the sensing of the input data, the generic semiotic module 55 is invoked i times, each time with a different set of parameters and commands which define for each module 55a–55i, its input, whether it functions as a dyadic or triadic module, and the type of output, i.e. whether to output to a subsequent semiotic module or the PDM 58 or both. In the preferred run time configurable system illustrated in FIG. 1d, each time the generic semiotic module 55 is invoked, a memory allocation 57a–57i is made in a common memory 57. The memory allocations 57a–57i are used for the knowledge base records and other data stored in conjunction with each of the semiotic processings 55a–55i.

The knowledge base stores data representations of analyses of sets of lineally-related elements. Knowledge base data representations include predicate records and elemental and non-elemental act records. Predicate records are associated with a class of one or more act records such that each act record is associated with only one class of act records. Elemental act records represent individual set elements of the predefined sets and define single act classes of corresponding elemental predicate records. Non-elemental act records represent a sequence of a case predicate record followed by a result predicate record, such that all act records are recursively defined as representations of one or more sets of lineally-related elements. Predicate record represent analyses of the sets of lineally-related elements represented by each act record in the class of act records with which they are associated.

For a dyadic semiotic processing module, the lineal relationship of set elements is sequential. In the dyadic knowledge base, each non-elemental dyadic act record represents a sequence of set elements which is a subset of a predefined set within a training corpus and which constitutes a sequence of set elements represented by its associated case predicate record directly followed by a sequence of set elements represented by its associated result predicate.

For a triadic semiotic processing module, the lineal relationship of set elements is such that each element represents a node of a multi-node tree form of the predefined sets having a single highest level node and a plurality n of lowest level nodes where each lowest level node is associated with a single higher level node and where each node which is not a lowest level node is associated with exactly two lower level nodes whereby the total number of nodes N is equal to 2n−1. In the triadic knowledge base, each non-elemental triadic act record is associated with a case predicate record which represents a first subtree of set elements and a result predicate represents a second subtree of set elements having a highest level second subtree element which highest level second subtree element is directly lineally associated with a higher level first subtree element. Thus, the triadic non-elemental act records represent a subtree of a tree form of a predefined set in a training corpus which includes all of the first and second subtree elements.

With reference to FIG. 2, the relationship between the induction process 60, abduction process 62 and knowledge base 72 is represented in the context of the dyadic morphologic module 52 of the gnome. Both the induction process 60 and abduction process 62 utilize and modify the data in the knowledge base 72.

As illustrated in FIG. 3, the knowledge base 72 of the dyadic morphologic module 52 preferably includes three types of related data records: predicates, acts and thought signs. Each predicate is associated with one or more acts which are collectively called a "class" of acts of the respective predicate. Preferably each predicate contains a pointer to each act in the class of acts of the particular predicate. Each act represents an ordered pair of two predicates, the first predicate being referred to as the "case" and the second predicate referred to as the "result." Although two different acts may have the same case and result predicates, each act is uniquely identified for use in a single predicate class. Preferably, the acts contain pointers to the predicate in which it is a class member, its case predicate and its result predicate. Additionally, each predicate also preferably contains a pointer to each act in which it is used as a case, AsCase, and to each act in which it is used as a result, AsResult. Each predicate record also contains pointers to P/S and C/C operational statistics, explained below, in which they are used.

Elemental acts correspond to elements of first order sets and do not have either a corresponding case or result predicate. For convenience, elemental act case and result pointers point to 0 or a null set. Each elemental act forms the entire class for a corresponding elemental predicate. Elemental predicates are utilized by induction to initiate an inductive analysis of a first order set.

Thought sign records are tree denotational representations of the formation of acts from elemental acts. When a thought sign is created for an act, the thought sign includes a pointer to its corresponding act record and that act record along with all constituent acts used to create the thought sign are provided with a pointer to the thought sign. For the example illustrated in FIG. 4d, a thought sign for the word "veal" corresponding to an act A81 of a predicate P8 would be denoted by A81(A51(A1A2)A61(A3A4)) where A1 is an elemental act corresponding to the letter "v", i.e. A1~v, A2 is an elemental act corresponding to the letter "e", A3 is an elemental act corresponding to the letter "a", and A4 is an elemental act corresponding to the letter "1". Note that act A81 has a case predicate P5 and a result predicate P6. P5 contains an act A51 which has a case predicate of elemental predicate P1 and result predicate of elemental predicate P2 which correspond to elemental acts A1 and A2 respectively. P6 contains an act A61 which has a case predicate of elemental predicate P3 and result predicate of elemental predicate P4 which correspond to elemental acts A3 and A4 respectively. For convenience in morphologic analysis, the elemental act names can be replaced with the corresponding elemental symbols in a thought sign and the non-elemental acts can be inferred from the parentheses so A81(A51 (A1A2)A61(A3A4)) is stored as ((ve)(al)). Note that act A91 of predicate P9 also corresponds to a complete ordered pair analysis of the word veal. A thought sign for A91 in accordance with the example illustrated in FIG. 4d would be denoted as (((ve)a)l) which is equivalent to A91 (A72(A51 (A1A2)A3)A4).

Both ((ve)(al)) and (((ve)a)l) represent free thought signs of the word "veal" corresponding to the respective constituent act sets {A81,A51,A1,A2,A61,A3,A4} and {A91,A71, A51,A1,A2,A3,A4}. The bound thought signs for ((ve)(al)) are (ve) and (al) which correspond to the respective act sets {A51,A1,A2} and {A61,A3,A4}. The bound thought signs for (((ve)a)l) are ((ve)a) and (l) which correspond to the respective act sets {A71,A51,A1,A2,A3} and {A4}.

The predicates and acts are each identified with two types of statistical data relating to their occurrence called probability and goodness. The probability of acts are normalized with respect to all acts within the same class so that the sum of all of the probabilities of the individual acts within each class of acts equals one. Predicates are also identified with a statistic called convergence and a related statistic called fluctuation which is an indicator of the stability of the predicate's probability. These statistics are generally referred to as "probability statistics"; "probability" is one type of "probability statistics."

Predicate data records also preferably contain other information useful in debugging the gnome. This information includes "type" and "iteration" of creation, i.e. how and when the predicate was created.

Predicates and acts are created during training. Initially, each time a new elemental symbol is passed from the sensor 50 to the dyadic morphologic module 52 an elemental predicate and a corresponding act are created. The probability of the elemental predicate when formed is initially set to 0.5 and the probability of the elemental act when formed is initially set to 1 since it is in a single act class. The goodness of both the elemental act and the elemental predicate are initially set at 0.5. The convergence of the elemental predicate is initialized to a selectable parameter having a value slightly less than 1 preferably to 0.999. For an elemental predicate, its type of creation is noted as "sensing" and its iteration is assigned a number corresponding to the number of inductive analyses which have been conducted prior to its creation.

After elemental predicates and acts are defined in the dyadic morphologic knowledge base 72 for all elements of a first order set, the dyadic morphologic module initiates an induction. The induction process 60 is comprised of four primary components, analysis space processing 82, operational statistics gathering and storing 84, probability statistics gathering, storing and processing 86 and thought sign generation 88. The analysis space 82 processing attempts to determine statistically most significant sequences of symbols by analyzing ordered pair relationship between predicates corresponding to each elemental symbol and sequential symbol subset of each first order set. The analysis space 82 systematically identifies predicates which contain acts corresponding to the sequence of elemental symbols or subsets of sequential elemental symbols of each first order set. For a word having n letters, the analysis space examines all possible combinations of acts which analyze two sequential letters in the word, of acts which analyze three sequential letters of the word and so on so that it analyzes the entire n letter sequence of letters in the word and all subsequences.

This analytical process can be represented by rows of diagonally aligned boxes wherein the elemental predicates for each letter in the n letter word are placed in a diagonal of n boxes. An analysis of elemental predicates representing two letter sequential subsets is performed in a diagonal of n−1 boxes, a next adjacent diagonal of n−2 boxes represents the analysis of elemental predicates representing three letter subsets and so forth until a single box represents the analysis of the entire sequence of n elemental predicates corresponding to the word being analyzed. The predicates identified and retrieved for use in a particular box of the analysis space 82 represent an analysis associated with all the elemental predicates which are to the left, below or both left and below of the particular analysis space box. For example, the first box in the third diagonal row of the analysis space is associated with the sequence of the first three elemental predicates in the sequence of elemental predicates; the second box in the third diagonal row is associated with the second, third and fourth elemental predicates being analyzed.

In the initial inductive analysis, before any abductive processing, the only predicates in the knowledge base 72 are the elemental predicates and corresponding elemental acts. Accordingly, there are no predicates which explain any of the boxes in the analysis space except for the first diagonal row D1 of elemental predicates which correspond to the letters of the word being analyzed.

Figure 4A:
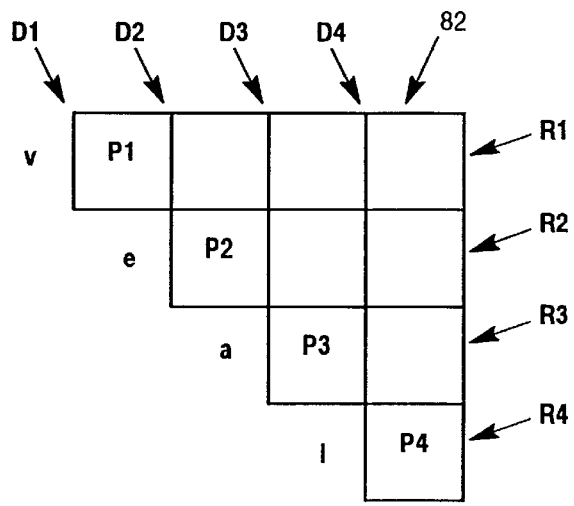
FIGS. 4a, b and 4c are representations of a dyadic morphologic analysis space.
Figure 4B:
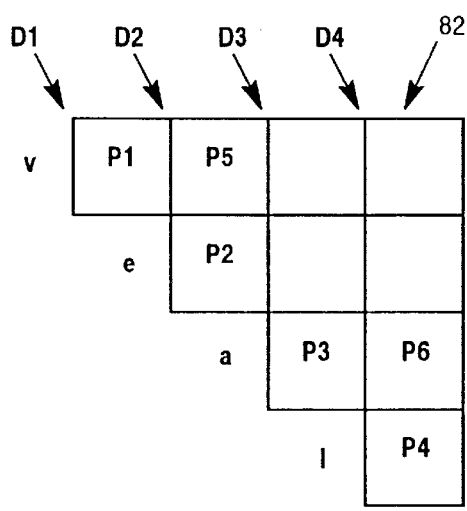
FIG. 4d is a listing of portions of pertinent data records with respect to the predicates identified in the dyadic morphologic analysis spaces illustrated in FIGS. 4a–c.
Figure 4C:
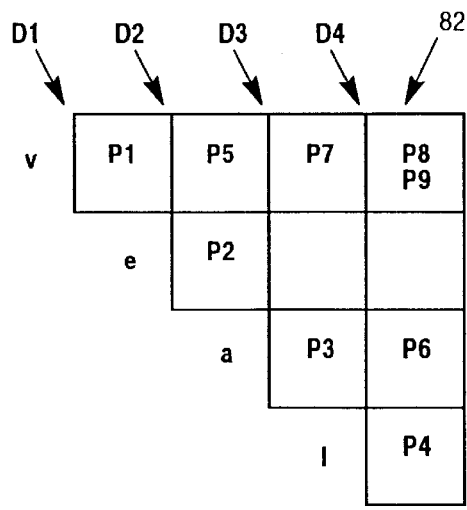

FIGS. 4a–c provide graphic illustrations of possible successive dyadic morphologic inductive analyses of the word "veal". The analysis space 82 for the four letter word "veal" has four diagonal rows of boxes D1, D2, D3, D4 which form four rows R1, R2, R3, R4. The diagonal rows D1, D2, D3, D4 represent progressively higher levels of the dyadic morphologic analysis space 82.

FIG. 4a illustrates a first inductive analysis, prior to any abductions, where predicates P1, P2, P3 and P4 appear in the longest diagonal row D1 with all of the other boxes in the analysis space being blank. The blanks occur since no abductive processing has occurred and consequently the only predicates in the knowledge base 72 are elemental predicates including P1, P2, P3 and P4. After retrieving the elemental predicates and finding no other predicates having acts corresponding to any ordered pair of predicates in the first diagonal row D1, the induction continues from the analysis space 82 with probability statistics gathering, storing and processing 86 and operational statistics gathering and storing 84 as explained in more detail below.

Through a first round of abduction processing, predicates such as P5 and P6 as identified in FIG. 4d may be created having acts A51 and A61 which correspond to the ordered pairs of elemental predicates P1, P2 and P3, P4, respectively. Since induction does not create predicates, all of the predicates stored in the knowledge base 72 at the time of the first abduction processing are elemental predicates. Consequently, all new predicates created during the first abduction processing only have acts representing ordered pairs of elemental predicates.

FIG. 4b represents a possible complete inductive analysis space 82 after a first round of abductive processing. The analysis space includes predicate P5 in the second box of the first horizontal row R1 since act A51, which corresponds to the ordered predicate pair P1, P2, is contained in the class of acts defined by P5. The analysis space also includes the predicate P6 in the second box of the third horizontal row R3, since act A61, which corresponds to the ordered predicate pair P3, P4, is contained in the class of acts defined by predicate P6. The analysis space 82 represented by FIG. 4b reflects that no predicate was formed by the abductive process having an act which corresponds to the ordered predicate pair P2, P3 since the second box in the second row R2 of the analysis space 82 is blank. Also no predicates appear in the higher level diagonal rows D3, D4 since predicates which represent an analysis of more than two letters have not yet been created.

In a second round of abductive processing predicates P7, P8 and P9 as identified in FIG. 4d may be added to the knowledge base 72. Subsequently the analysis space for the word "veal" could include the predicates as represented in FIG. 4c. Note that two predicates are contained in the fourth box of the first row R1, i.e. the highest level diagonal row D4, which each contain an act which represents a complete analysis word "veal", namely acts A81 and A91. A81 and A91 represent the entire word "veal" and, as explained in detail above, thought signs are created for those two acts. Since the third box of the second row R2 in the analysis space 82 illustrated in FIG. 4c is blank, no predicate in the then current knowledge space 72 contains an act having case predicate P2 and result predicate P6.

In conjunction with the completion of an analysis space 82, the most probable analysis of the entire first order set and the constituent parts, both predicates and acts, of that analysis are identified as successful. Designations of being successful are gathered and utilized by the probability processing submodule 86 to update the probability and goodness of predicates and acts as discussed in detail below.

Where one or more predicates are identified with the nth box of the first row, i.e. the nth or highest level diagonal row, of an analysis space 82 as illustrated in FIG. 4c, such predicates represent analyses of the entire first order set. A "success" analysis of the entire first order set is determined by multiplying together the probability value of each constituent act represented by such predicates in the analysis space 82. The acts in the set of constituent acts which have the highest probability product are all identified as successful. Additionally, the corresponding predicates for which each constituent act is a class member are also all identified as successful. With respect to the analysis space and knowledge space represented in FIG. 4c and d, both predicate P8 and P9 represent analyses of the entire word "veal". P8 corresponds to the constituent set of acts {A81,A51,A1,A2, A61,A3,A4} and corresponding set of predicates {P8, P5, P1, P2, P6, P3, P4}. Accordingly, P8 has a constituent act probability product equal to 0.27 i.e. 1*0.3*1*1*0.9*1*1. P9 corresponds to the constituent set of acts {A91,A71,A51, A1,A2,A3,A4} and corresponding set of predicates {P9, P7, P5, P1, P2, P3, P4}. Accordingly, P9 has a constituent act probability product equal to 0.06 i.e. 0.1*0.2*0.3*1*1*1*1. Since 0.27 is greater than 0.06, P8 is identified as successful along with constituent acts A81, A51, A1, A2, A61, A3, A4 and corresponding predicates P5, P1, P2, P6, P3, P4.

Where no predicate is identified with the nth box of the first row, i.e. highest level diagonal, of an analysis space 82 as illustrated in FIGS. 4a and 4b, success of a group of two or more predicates which collectively represent an analysis of the entire first order set is identified is determined. In identifying such groups, only the groups with the most predicates in the highest diagonal row of boxes are considered.

For the analysis space represented in FIG. 4a, the only group of two or more predicates which collectively represent an analysis of the entire word "veal" is [P1, P2, P3, P4]. Thus in the analysis space for FIG. 4a constituent acts A1, A2, A3, A4 and corresponding predicates P1, P2, P3, P4 are all identified as successful.

In the case represented by FIG. 4b, groups of two or more predicates which collectively represent an analysis of the entire word "veal" include [P5, P3, P4], [P1, P2, P6] and [P5, P6]. However only the group [P5, P6] is considered since it contains two predicates in the second diagonal row D2. Thus both P5 and P6 are identified as successful as well as constituent acts A51, A1, A2, A61, A3, A4 and predicates P1, P2, P3, P4 for the analysis space represented in FIG. 4b.

If for FIG. 4b, act A61 corresponded to ordered elemental predicate pair P2/P3 instead of P3/P4, P6 would occupy the second box of the second row instead of the second box of the third row in the analysis space represented in FIG. 4b. In that case, groups of two or more predicates which collectively represent an analysis of the entire word "veal" would include [P5, P3, P4] and [P1, P6, P4], both having the same number of highest diagonal box predicates. The constituent act probability product of [P5, P3, P4] equals 0.3 and the constituent act probability product of [P1, P6, P4] equals 0.9 so that the predicates P1, P6, P4 and their constituent acts A1, A61, A2, A3, A4 and predicates P2, P3 would be successful based on that hypothesis.

The success determination process is also utilized to limit the number of predicates identified in any specific box of the analysis space as it is being completed. If the analysis space contains more than a preferred three possible predicates for a box based on the previously identified predicates in boxes of lower order, i.e. longer diagonal rows, only the three most successful predicates are used to fill the box.

In addition to collecting data identifying successful predicates and acts for a completed analysis space 82, the probability processing submodule 86 gathers data relating to the use of each predicate and formative act corresponding to the predicates as used in the analysis space. Statistics regarding the use of predicates and their constituent acts and predicates in attempting to fill an analysis space box are included in the usage statistics gathered by the probability processing submodule 86. As explained below, analysis space cell records are created which include data relating to predicates which are eligible to fill a box, but are not one of the top three choices.

After the completion of each analysis space and a success determination for the most probable set of constituent acts and corresponding predicates which provide a complete analysis of the first order set being analyzed, the induction module updates the probability statistics for the current predicate and act cords then contained in the knowledge space. To update probability and goodness for both acts and predicates two general processes are used: exponential aging and normalization.

In exponential aging, a new estimate for the value of a variable is weighted against the previous value of the variable. Equation 1 is the general formula for exponential aging.

$$\text{Value New} = (1-WF)(\text{Value old}) - (WF)(\text{Estimated Value}) \quad \text{Equation 1}$$

Value new replaces the existing value, i.e. value old, stored in the knowledge base. The estimated value is the value that the newly collected data indicates that the variable value should be. WF is a weighting factor. The weighting factor determines how much weight the newly estimated variable value is given and is preferably set between 0.01 and 0.0001. A high WF value gives higher weight to the new estimate.

In the preferred embodiment, the weighting factor is selected based on the relative size of the training corpus. For a relatively large corpus, a preferred value for WF is 0.001. For a relatively small corpus, a preferred value for WF is 0.01.

In normalization, groups of updated variable values are forced to sum to one. Equation 2 is the general formula for normalization.

$$\text{Normalized Value} = \frac{\text{Calculated Value}}{\sum \text{ all Calculated Values within the group}} \qquad \text{Equation 2}$$

In applying exponential aging to update a particular act's probability, the stored value of the particular act's probability is retrieved along with the counts for each act within the particular act's class. Using these counts, a new estimate for the act's probability is derived using Equation 3.

$$\text{Act's Estimated Probability} = \frac{\text{Number of times the Act was used successfully}}{\text{Number of times any act within the Act's class was used successfully}} \qquad \text{Equation 3}$$

Along with the weighting factor and stored value for the act's probability, exponential aging is used to update the act's probability. The exponential aging factor as applied to updating an act's probability is given by Equation 4.

$$\text{Act's Probability new} = (1-WF)\text{Act's Probability old} - WF(\text{Act's Estimated Probability}) \qquad \text{Equation 4}$$

After all the probabilities for each act within a class have been updated, the probabilities for each act are normalized. In normalization, the sum of all the probabilities for acts within a class are forced equal one as per Equation 5.

$$\text{Act's Normalized Prob.} = \frac{\text{Act's Probability New}}{\sum \text{ all Acts' Probability New within the Act's class}} \qquad \text{Equation 5}$$

Subsequently, the normalized updated act's probability is used to replace the existing value of the act's probability stored in the knowledge base.

Similarly, predicates' probability values are updated using exponential aging. The predicates' probability values are updated using the stored value from the knowledge base along with the counts for the number of times the predicates were used in successful inductions. These counts are used in Equation 6 to estimate a value for a particular predicate's probability.

$$\text{Predicate's Estimated Probability} = \frac{\text{Number of times the Predicate was used successfully}}{\text{Number of times any Predicate at all was used successfully}} \qquad \text{Equation 6}$$

Using the estimated probability, the stored probability is exponentially aged using Equation 7. Subsequently, the updated predicate's probability is stored in the knowledge base.

$$\text{Predicate's Probability new} = (1-WF)\text{Predicate's Probability old} - WF(\text{Predicate's Estimated Probability}) \qquad \text{Equation 7}$$

Goodness is also updated using exponential aging. To update the goodness for an act, two counts are used: the number of times the act was used and the number of times the act was used in a successful analysis. Using these counts, an estimate for the act's goodness is calculated using Equation 8.

$$\text{Act's Estimated Goodness} = \frac{\text{Number of times the act was induced in successful inductions}}{\text{Number of times the act was induced at all}} \qquad \text{Equation 8}$$

Equation 9 is used to determine the updated value of the goodness using exponential aging, the stored act's goodness (act's goodness old) and the estimated act's goodness.

$$\text{Act's Goodness new} = (1-WF)\text{Act's Goodness old} - WF(\text{Act's Estimated Goodness}) \qquad \text{Equation 9}$$

Unlike updating an act's probability, goodness is not normalized. The result obtained from Equation 9 is stored in the knowledge base as the act's updated goodness.

Predicates' goodness values are similarly updated. For a particular predicate, the counts for the number of times a predicate was induced and the number of times the predicate was used in a successful induction are gathered. An estimate of the predicate's goodness is generated using these counts in Equation 10.

$$\text{Predicate's Estimated Goodness} = \frac{\text{Number of times the Predicate was used in successful inductions}}{\text{Number of times the Predicate was used at all}} \qquad \text{Equation 10}$$

Equation 11 is used to determine the updated value of the goodness which is stored in the knowledge base.

$$\text{Predicate's Goodness new} = (1-WF)\text{Predicate's Goodness old} - WF(\text{Predicate's Estimated Goodness}) \qquad \text{Equation 11}$$

Figure 5:
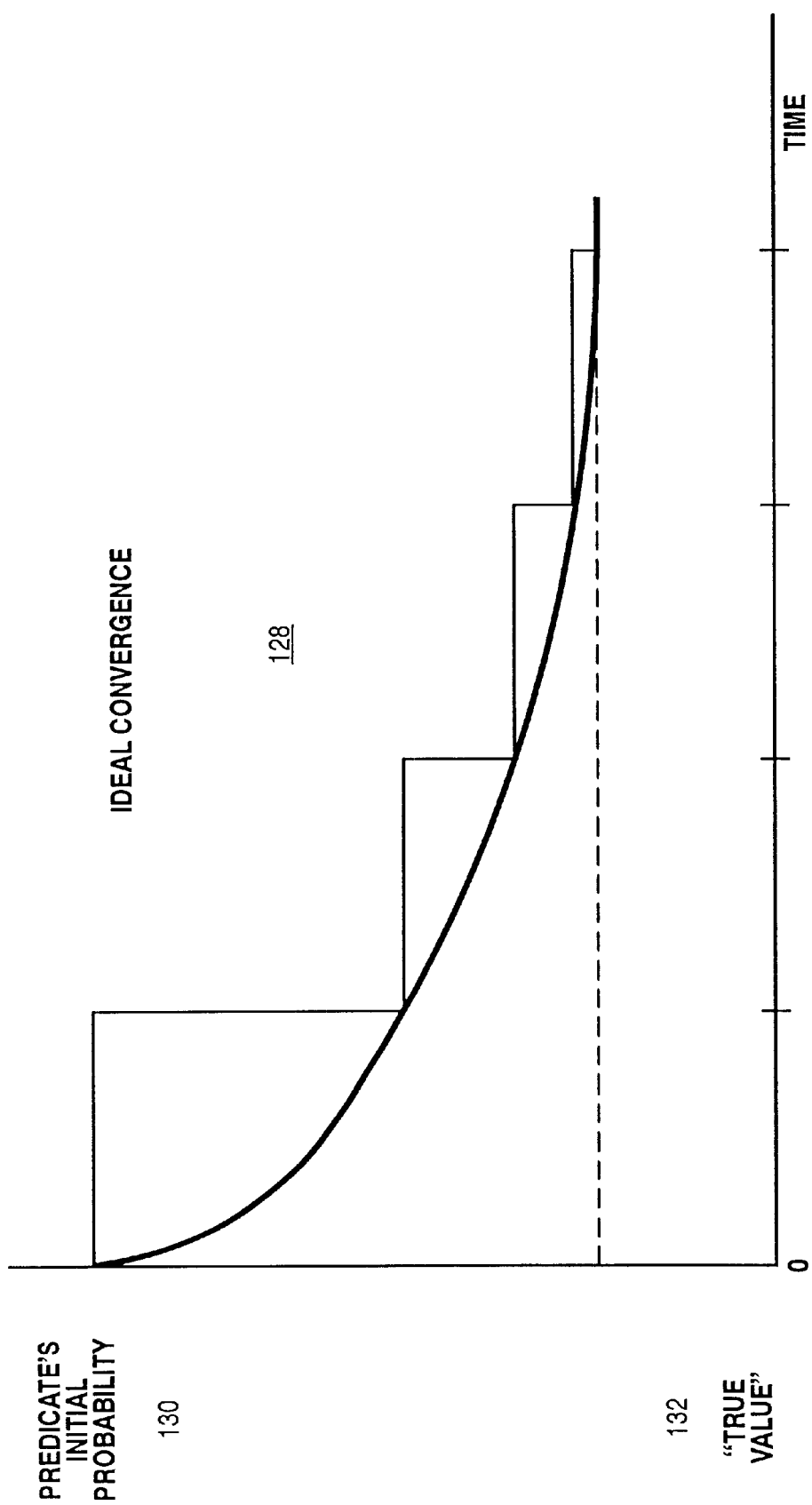
FIG. 5 is a graphic illustration of predicate probability convergence.

Convergence is used to determine the stability of a predicate's probability. FIG. 5 is a graph of an ideal convergence. When a predicate is first created, it is initially assigned a value. Over time, the probability will tend to gravitate toward a "true value". The "true value" reflects the predicate's usage in the entire corpus. If the probability is gravitating towards its "true value" as shown in FIG. 5, it is stable and useful in future analyses. If it is not, the predicate is changing its probability and the current probability is not an accurate indicator of the predicate's future probability. Accordingly, the predicate is not as useful in future analyses.

To calculate the convergence, the fluctuation of the predicate's probability over time is used. As shown in FIG. 5, for an ideal convergence, as time progresses the change or fluctuation in the predicate's probability decreases. Convergence is updated every time the predicate's probability is updated. The fluctuation is calculated using the predicate's previously stored probability (predicate's old probability) and the predicate's newly determined updated probability by Equation 12.

$$\text{FluctuationNew} = |\text{Predicate's New Probability} - \text{Predicate's Old Probability}| \qquad \text{Equation 12}$$

The value for the new fluctuation is compared to the previously stored fluctuation. If the new fluctuation is less than the previous fluctuation, the predicate's probability is assumed to be gravitating toward its "true value." In this situation the convergence is updated using Equation 13.

New Convergence=(1−WF)Old Convergence+WF     Equation 13

If the old fluctuation is greater than the new fluctuation, the predicate's value is assumed to not be gravitating towards its "true value." In this situation, the convergence is updated using Equation 14.

New Convergence=(1−WF)Old Convergence     Equation 14

Preferably the same value for WF is used for updating convergence as is used for updating the predicate's probability. As a result, if the fluctuation is increasing over time the convergence will decrease indicating less stability. Conversely, if the fluctuation is decreasing over time, the convergence will increase indicating greater stability.

Probability statistics for all predicates and acts in the knowledge space may be updated as specified above after each analysis space or only after a specified number of analysis spaces, for example after each 1000 spaces. In either case, the updated probability, goodness and convergence are calculated as specified above. When the statistics are collected over a longer period of time, the estimates for these variables is more accurate. As a result, the weighting factor can be increased to give additional weight to the longer collected statistics. However, waiting to update the statistics requires more memory for temporarily storing the statistics used for updating the probability, goodness and convergence pending an update.

Also, waiting can effect success determinations. In a preferred embodiment, probability statistic updating is performed after each analysis space for all predicates and acts used in conjunction with that analysis space's processing and a flag (f) maintained for each act and predicate which represents the number of analysis spaces which have occurred since the last statistic updating. The general aging formula which is then used is given in Equation 15.

Value New=(1−f*WF)(Value old)−(WF)(Estimated Value)     Equation 15

This is an approximation of a more accurate calculation given by Equation 16.

Value New=(1−WF)$^f$(Value old)−(WF)(Estimated Value)     Equation 16

After a selected number of analysis space analyses, preferably 32, or in advance of an abductive elimination, statistics for all of the predicates and acts within the knowledge space are updated using (f*WF) for WF in Equations 4, 7, 9, 11, 13, 14, 15 and 16 and 0 as the estimated value.

Also in conjunction with the completion of an analysis space 82, three types of operational statistics (opp stats) are collected, namely predecessor/successor (P/S) statistics; co-occurrence (C/C) statistics and case/antecedent (C/A) statistics.

A P/S statistic is generated for each pair of predicates which provide a valid analysis of a subset of sequential elemental predicates which is a "surprise." Each P/S statistic record includes an identification of a predecessor predicate, a successor predicate and a count of the number of its occurrences. A "surprise" is represented by a blank box in the analysis space in the ith diagonal row for the box representing an analysis of a select set of i sequential elemental predicates, where all boxes in higher levels, i.e. shorter, diagonal rows which include an analysis of the selected set of i elemental predicates are also blank. For example with respect to the analysis space as represented in FIG. 4a, P1 is validly paired with P2, P2 with P3, and P3 with P4 to explain the two sequential elemental predicate subsets (P1, P2) (P2, P3) (P3, P4) for which predicates analyzing such subsets would be identified in the second diagonal row D2. Since all boxes in diagonal row D2 are blank, and all boxes in higher order diagonal rows D3, D4 are blank, the pairs P1/P2, P2/P3 and P3/P4 are all surprises. Accordingly, a P/S statistic for P1/P2 would be generated or if it already existing be incremented by 1; a P/S statistic for P2/P3 would be generated or if existing be incremented by 1 and a P/S statistic for P3/P4 would be generated or incremented by 1. With respect to three and four sequential elemental predicate subsets (P1, P2, P3), (P2, P3, P4) and (P1, P2, P3, P4), no additional P/S statistics are generated, since no existing pair of predicates represent those sets.

In creating P/S statistics for the subsequent analysis space illustrated in FIG. 4b, even though P1 is validly paired with P2, no P/S statistic for P1/P2 is generated because predicate P5 represents the sequential subset (P1, P2) of elemental predicates. An opp stat is generated for the pairing of P2 with P3 since the second box in diagonal row D2 is blank as well as all of the boxes in diagonal rows D3 and D4. Thus, P2/P3 is a surprise since no predicate in the analysis space illustrated in FIG. 4b includes a representation of the sequential elemental predicate subset (P2, P3).

With respect to three sequential elemental predicate subsets (P1, P2, P3) and (P2, P3, P4), P5 is validly paired with P3 and P2 is validly paired P6. Both these pairings are surprises since the boxes in diagonal rows D3 and D4 are blank. Accordingly, a P/S statistic for P5/P3 would be generated or incremented by 1 and a P/S statistic for P2/P6 would be generated or incremented by 1 for the analysis space of FIG. 4b.

In FIG. 4b, P5 is validly paired with P6 to represent the four sequential elemental predicate set (P1, P2, P3, P4). Since the single box in the fourth diagonal row D4 is blank, P5/P6 is a surprise. Accordingly, a P/S statistic for P5/P6 would also be generated or incremented by 1.

With respect to the analysis illustrated in FIG. 4c, no P/S statistic would be generated. Although there is no predicate identified for the second box in the second diagonal row D2, valid pairing P2/P3 is not a surprise, since P7, as well as P8 and P9, includes an analysis of elemental predicate subset (P2, P3). Also even though there is no predicate identified for the second box in the third diagonal row D3, valid pair P2/P6 is also not a surprise, since P8 and P9 both include an analysis which incorporate all of the elements of elemental predicate subset (P2, P3, P4).

In general in an analysis space of an n letter word, for positive integers i, j where j+i≦n, all predicates in the ith row in the jth box are validly paired with each predicate in each box of the (j+i)th row in the consideration of P/S statistic generation. With respect to the example represented by FIG. 4c, valid pairs include P7/P4 which corresponds to a predicate in the (n−1)th box of the first horizontal row in association with a predicate in the single box of the nth horizontal row. Where multiple predicates appear in analysis space boxes, corresponding multiple valid pairs are considered. Note that P7 is not validly paired with P6 since the elemental predicate P3 would be represented twice in such a pairing.

Co-occurrence or C/C statistics are generated to reflect the co-occurrence of two predicates in the same box of an analysis space. Based on the completed analysis space as represented in FIG. 4c, a single co-occurrence or C/C statistic would be generated, namely representing the co-occurrence of P8 with P9. Alternatively, the P8/P9 co-occurrence statistic would be incremented by 1 if it had previously been created. Each C/C statistic record includes a first co-occurring predicate, a second co-occurring predicate and a count of its co-occurrences, where the identification of the first predicate is lower or equal to the second predicate. Hence, a C/C statistic for P8/P9/count is created, but not for P9/P8/count.

If an additional predicate, for example P10, had also been contained in the fourth box of the first horizontal row R1 of the analysis space 82, C/C statistics for co-occurrence pairs P8/P9, P8/P10, and P9/P10 would all be created or incremented respectively. In the preferred embodiment, only three predicates are permitted to co-occur in a single analysis space box. If such a parameter is increased, additional C/C statistics would be generated for all possible pairings of predicates in a common box.

C/A statistics are gathered with respect to the non-elemental consequent and antecedent acts within the set of constituent acts for each successful predicate. Each C/A statistic record includes an identification of a non-elemental consequent act, an antecedent act, an indication whether the antecedent act is a case or result of the consequent act, and a count of the number of its occurrences. For the analysis space as represented in FIG. 4c, P8 was identified as successful along with constituent acts A81, A51, A1, A2, A61, A3, A4. Highest level act A81 is identified as case antecedent to act A51 of predicate PS which act is identified as a corresponding consequent. Highest level act A81 is also identified as result antecedent to act A61 of predicate P6 which act is identified as a corresponding consequent. Thus C/A statistics for A51/ A81/case and A61/A81/result are generated or incremented by 1 if they had been previously created.

C/A statistics are preferably not collected where the consequent acts are elemental acts. Even though A51 is case antecedent to consequent elemental act A1 and result antecedent to consequent elemental act A2. C/A statistics for A1/A51/case and A2/A51/result are not generated.

Until cleared by an abduction, P/S, C/C and C/A opp stats are accumulated for each successive processing of an inductive analysis space of sequential first order sets. After a predetermined number of P/S, C/C or C/A statistics is reached or exceeded following the conclusion of an analysis space, a respective abduction 62 is initiated. Preferably a specific type of abduction processing is triggered when a corresponding type of opp stat exceeds 10,000.

If the P/S statistics limit is reached, abductive generalization is commenced. If the C/C statistic limit is reached abductive identification is commenced. If the C/A statistic limit is reached abductive distinction is commenced. Abductive elimination is preferably commenced after each processing of probability statistics of the entire set of predicates and acts in the knowledge space. Each type of abduction will also be triggered if the end of the training corpus is reached, if it was not previously performed by that time.

To create entirely new predicates for use in induction, generalization is used. The generalization process 64 is described in conjunction with FIGS. 6a and 6b. Initially, the gathered P/S counts are analyzed for all the sequential predicate pairs. Only the pairs with a P/S count greater than a certain threshold ranging from 1 to 10, preferably 5, are selected for generalization, Step 136. The selected predicates are divided into two groups: the predecessor predicate group P1 to Pm and the successor group P'1 to P'n. A given predicate may be present in both groups. For instance, the predicate representing the letter "l" in "follows" is both the predecessor and successor in the corresponding P/S predicate pair for "ll".

The two groups of predicates are used to form two property matrixes, Step 138. One matrix, the P/S property matrix, compares the predecessor predicates (listed vertically) with the successor predicates (listed horizontally) and conversely, the other matrix, the S/P property matrix, compares the successor predicates (listed horizontally) with the predecessor predicates (listed vertically).

The P/S counts for each P/S predicate pair are used to determine the value of the elements within the matrix. A given random element within the matrixes is referred to as aij for the P/S property matrix and bij for the S/Pproperty matrix. The value for aij and bij are based on Equations 17 and 18.

$$a_{ij} = \frac{P/S \text{ count for } Pi \text{ predecessor}/P'j \text{ successor}}{\text{the total } P/S \text{ count for all the selected } P/S \text{ pairs}} \quad \text{Equation 17}$$

$$b_{ij} = \frac{P/S \text{ count for } P'i \text{ sucessor}/Pj \text{ predeessor}}{\text{the total } P/S \text{ count for all the selected } P/S \text{ pairs}} \quad \text{Equation 18}$$

After creating the two property matrixes, the matrixes are converted into two connection matrixes, Step 140. The P/S property matrix is converted into a predecessor connection matrix and the S/P property matrix is converted into a successor connection matrix. The connection matrixes are used to compare the similarities between each predecessor in the predecessor connection matrix and each successor in the successor connection matrix. Each element within the predecessor connection matrix represents the similarity between a Pi predecessor predicate and a Pj predecessor predicate. This value is represented by a'ij. Similarly, for the successor connection matrix, the similarities between successor predicates is determined by b'ij for P'i and P'j. To determine the similarity between predecessor predicates in the P/S property matrix, each of the elements in the predicate's row is viewed as a magnitude in one dimension of n-dimensional space. As a result, these magnitudes result in a vector in n-dimensional space. To calculate the similarities between the predicates, the projection of one of the vector's predicates onto the other is measured. This measurement, a'ij, is the cosine between the two vectors. In the S/P property matrix, similar measurements, b'ij, are taken to determine the similarity between successor predicates.

Equations 19 and 20 are used to determine the values of each a'ij and b'ij for the connection matrixes based on the aij and bij values of the property matrixes.

$$a'_{ij} = \frac{\sum_{l=1}^{m}(a_{il} \times a_{jl})}{\sqrt{\sum_{l=1}^{m} a_{il}^2} \times \sqrt{\sum_{l=1}^{m} a_{jl}^2}} \quad \text{Equation 19}$$

$$b'_{ij} = \frac{\sum_{l=1}^{n}(b_{il} \times b_{jl})}{\sqrt{\sum_{l=1}^{n} b_{il}^2} \times \sqrt{\sum_{l=1}^{n} b_{jl}^2}} \quad \text{Equation 20}$$

In Step 142, clumping is performed and is explained in conjunction with FIGS. 6c–6f. FIG. 6c is an example of a connection matrix. With respect to generalization, the numbers outside of the matrix represent predicates. For instance, 46 would represent predicate P46.

Since clumping is performed in the same manner for the predecessor connection matrix as for the successor connection matrix, the process will be explained generically for brevity. The same process is performed for both the predecessor and the successor connection matrix.

As is shown in FIG. 6c, the values within the connection matrix are symmetric around the main diagonal. The main diagonal is bolded in the figure. To save processing time, clumping is performed on only half of the matrix. If the entire matrix was used, twice the number of clump pairs would be created. Later in the clumping process, these clump pairs would be deleted as being repetitive and add no value to the analysis.

FIG. 6d depicts the connection matrix of FIG. 6c with the lower half below the diagonal blacked out. Predicate pairs with a corresponding element in the matrix exceeding a certain threshold are selected for further analysis. The threshold is set so that a specific portion of the elements above and not including the main diagonal will exceed the threshold. The preferred portion ranges from 40% to 90%, but is preferably set at 50%, of the elements above the main diagonal. Accordingly, the threshold is preferably set at the median value of the elements above the main diagonal so that one half of those elements are selected for further analysis.

Additionally, certain elements along the main diagonal of the matrix will also be selected. During the selection process, all the values within a row of the connection matrix are checked to see if they exceed the threshold. If all values, other than the value for the element along the main diagonal, fail to meet the threshold, the diagonal element is selected. For example in FIG. 6d, if the threshold was 0.6, the predicate pair of (46,46) would not be selected, because predicate pairs (46,10) and (46,39) exceed the threshold. By contrast, in the row for predicate 68 only the main diagonal box value exceeds the threshold, so that the predicate pair (68,68) would be selected. Note that in this example the threshold value of 0.6 is not the preferred value for a generalization connection matrix threshold, but is used for illustrative purposes only.

Using the example threshold of 0.6 for FIG. 6d, the selected predicate pairs are shown in FIG. 6e under the column marked "Clump Pairs". The predicate pairs are listed in the sequence of their selection starting at the upper left hand corner of the matrix of FIG. 6d and proceeding to the right for each successive row to the lower right hand corner. For each row, the selection algorithm initially selects a predicate pair of a predicate paired with itself, but discards that pair if a subsequent pair is selected in that predicate row. For simplicity, when a predicate pair is paired with itself, it is shown in the table of FIG. 6e singularly —i.e. (68) and not (68,68).

In the preferred embodiment, the selected pairs of predicates are stored in a link list. The link list stores the predicate pairs which were selected by row and also the predicate pairs which were selected by column. For instance, for row 46, pairs (46,10) and (46,39) would be stored and for column 39, pairs (46,39) and (10,39) would be stored. In the most preferred embodiment, the link lists are stored in a hash table where both the row and column number are hashed. The use of a link list reduces processing time.

Each selected pair defines an initial clump. Additional predicates are identified for potential addition to the clumps. In identifying additional predicates, the following process is used. For each clump pair selected from the connection matrix, the sequential list of selected clump pairs is examined to determine whether any other predicates are paired with either predicate of the predicate pair in a subsequently listed pair. For example, for first clump (46,10) there are three subsequent pairs which contain either 46 or 10 namely, (46,39), (10,39) and (10,53), so 39 and 53 are candidates for clumping with 46 and 10. For clump pair (31,42) subsequent pairs (31,74) and (42,74) meet the criteria so predicate 74 is identified as an additional clump candidate for clump (31, 42). The results of this process for all the clump pairs are shown in FIG. 6e in the column titled "Candidates for Addition To Clumps".

Among the candidates to be potentially added to the clumps, "Successful Candidates" are determined. A candidate is successful, if matching the candidate with each predicate in the clump results in a predicate pair which was a selected clump pair. If this occurs, the predicate is added to the clump. Once a predicate is added to a clump, subsequent potential candidates must qualify as successful with respect to all prior successful predicates in addition to the predicates of the original clump pair. Thus, if an item x is being evaluated for inclusion into a clump, item x is added to the clump, only if for each item y already in the clump, either (x,y) or (y,x) is in the table. For example, predicate 39 is added to the (46,10) clump because (46,39) and (10,39) are in the selected list of clump pairs. Predicate 53 is not subsequently added to the (46,10,39) clump, because neither (46,53) nor (53,46) exists even though (10,53) and (39,53) exist in the list of clump pairs. When trying to add an item to a clump, the row and column hash lists are used. The clumps resulting from the addition of "Successful Candidates" are shown in FIG. 6e under the column marked "Processed Clumps".

The Processed Clumps are analyzed to determine if the predicates within the processed clumps are the same as predicates in another clump (duplicates) or if the predicates within one clump are a sub-set of another clump. If any processed clump is a duplicate or a sub-set of another processed clump, it is rejected. For example, predicate clump (46,10,39) is accepted, because it is not a sub-set of another clump and it is the first occurrence in the table of the three predicates. Processed clump (46,39,10) is rejected because it is a duplicate of (46,10,39). Clump (39,53) is rejected because it is a sub-set of the clump (10,39,53). The Processed Clumps not rejected are shown in FIG. 6e in the column titled "Accepted Clumps".

The Accepted Clumps are analyzed in sequence to determine whether they should be combined. In the analysis, two clumps will be combined if the number of common predicates between the two clumps divided by the number of predicates in the smaller clump is greater than a threshold. The preferred range for the threshold is between 0.5 and 1 and is most preferably set at 0.7. This threshold is called the "similarity". For example, accepted clump (46,10,39) has two elements 10 and 39 in common with accepted clump (10,39,53). Since two elements are in common and there are three elements in the smaller clump, which is either of the two clumps, the similarity of the two clumps would be ⅔ or 0.667. If the threshold was set as 0.6 as in FIG. 6e, these two clumps would be combined as clump (46,10,39,53). By contrast, accepted clump (60,24,41) has only one element 60 in common with clump (60,74). Since there is only one element in common between the two clumps and there are two elements in the smaller clump, the value for the similarity would be 0.5 and the two clumps would not be considered similar. The resulting clumps are used in the subsequent steps in generalization are shown in FIG. 6e in the column titled "After Similarity Combining". As stated previously, the process will be repeated for both the predecessor and successor connection matrix.

One advantage of the clumping process is that it can be readily implemented on a computer using multiple processors. This is highly advantageous because the matrices may be analyzing more than a thousand predicates. To facilitate multi-processing, after each clump pair is selected, it is assigned a number. For example in FIG. 6f, clump pair (46,10) is assigned the number 1, clump pair (46,39) is assigned the number 2 and so on. Each processor also has an assigned number. The main processor has the number 0 and the other processors are subsequently numbered 1, 2 . . . N−1. Each clump pair is then assigned to a processor for analysis. For each clump pair, the assigned processor number is determined by Equation 21.

Processor Number=(Clump Pair Number)MODULO N  Equation 21

For example, if N was three, clump pair number 1 would be assigned to processor 1; 2 to 2; 3 to 0;4 to 1; etc. Since each "Clump Pair" can be analyzed independent of the other clump pairs to determine "Processed Clump", processing for all the Clump Pairs to determine "Processed Clumps" can be accelerated up to N fold.

Figure 6B:
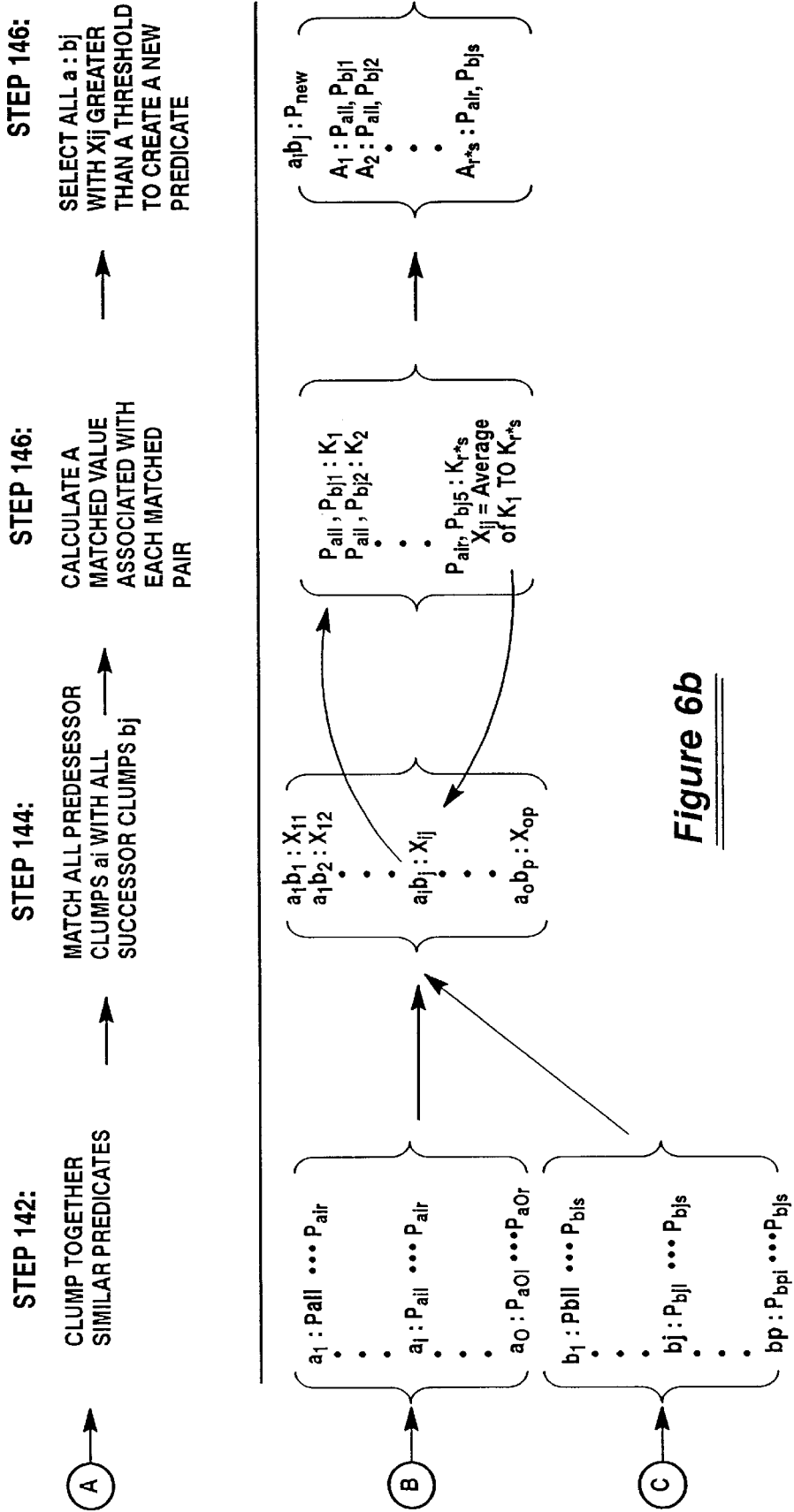

After the clumping process, the clumps are shown in FIG. 6b as a1 to ao for the predecessor predicates and b1 to bp for the successor predicates. Each ai and bj clump is broken down into its constituent predicates. For each ai and bi of clumps, these predicates are listed in FIG. 6b as Pai1 . . . Pair and Pbj1 . . . Pbjs, respectively.

Each identified a1–ao clump will be matched with each b1–bp clump as shown in FIG. 6b, Step 144. For each matched pair of clumps, a matched value is determined. The matched value is derived by adding the corresponding values from the property matrixes for all the predicates comprising the matched pair, Step 146. For instance as shown in FIG. 6b, Step 146, a given clump ai may have r constituent predicates Pai1 . . . Pair and a given clump bj may have s constituent predicates Pbj1 . . . Pbjs. In this case, r*s combinations for ai and bj result: (Pai1, Pbj1);(Pai1, Pbj2); . . . (Pai1, Pbj2); (Pai2, Pbj1); . . . (Pair, Pbj1); (Pair, Pbj2); . . . (Pair, Pbjs). Using the values from the original property matrixes corresponding to each of the combinations, values for K1 to Kr*s, corresponding to (Pai1, Pbj1).to (Pair, Pbjs), are obtained for each of the combinations. These values, K1 to Kr*s, are averaged resulting in the matched value Xij. The resulting matched values are compared to a threshold, Step 148. The threshold is set at the average value of the elements in the property matrixes. If the matched value is less than the threshold, the corresponding matched pair of clumps will be discarded. Out of the remaining matched pairs of clumps, up to a specified number of matched pairs with the highest match values will be selected to form new predicates, Pnew. Preferably, the specified number is 40, but may include all clump pairs meeting the threshold or be in a preferred range of 10 to 200.

New predicates are created as follows. As illustrated for ai bj, each identified matched pair has a corresponding set of predicate pairs, (Pai1, Pbj1) . . . (Pair, Pbjs). An act is created for each of these predecessor/successor pairs to form a class of acts for the new predicate, Pnew. For instance, Pai1 is the case and Pbj1 is the result in the first new act and Pair is the case and Pbjs is the result in the r*s new act of the new class. The new predicates are used in future inductions 60 and abductions 62. The new predicates are assigned an initial probability, goodness and convergence. Additionally, the new acts within each new predicate's class will have their probability and goodness values initialized.

Preferably, the goodness for both new predicates and acts is initially set at 0.5 and the convergence for the new predicate is initially set to 0.5. The unnormalized probability for each new act is determined by Equation 22.

New Act's Probability=new act's case predicate's probability×new act's result predicate's probability  Equation 22

Subsequently, the acts' probability values are normalized by dividing each act's probability by the sum of all the acts' probability values within the respective predicate's class. A new predicate's probability is set as the lesser of (the sum of all of the unnormalized acts' probability values in its class divided by two) or one.

During induction, multiple predicates may be used to represent the same combination of elementary predicates and may be used to fill the same "box" of the inductive analysis space. Some common occurring predicates may provide little useful distinction between each other. For instance, the suffix "tion" may be created in several ways, ((ti)(on)), (t(i(on)) or (ti)o)n). These different variations may provide little analytical value. The important concept is the "tion" grouping. By contrast, there may be several analyses for the word "payday", ((pa)((yd)(ay))) or ((p(ay))(d(ay))). In the second analysis, the compound word "payday" is broken up into its constituent words. The second analysis would likely be more valuable during semiotic processing. As a result, the dyadic morphologic module uses identification to determine which of these common occurring predicates to combine.

Figure 7:
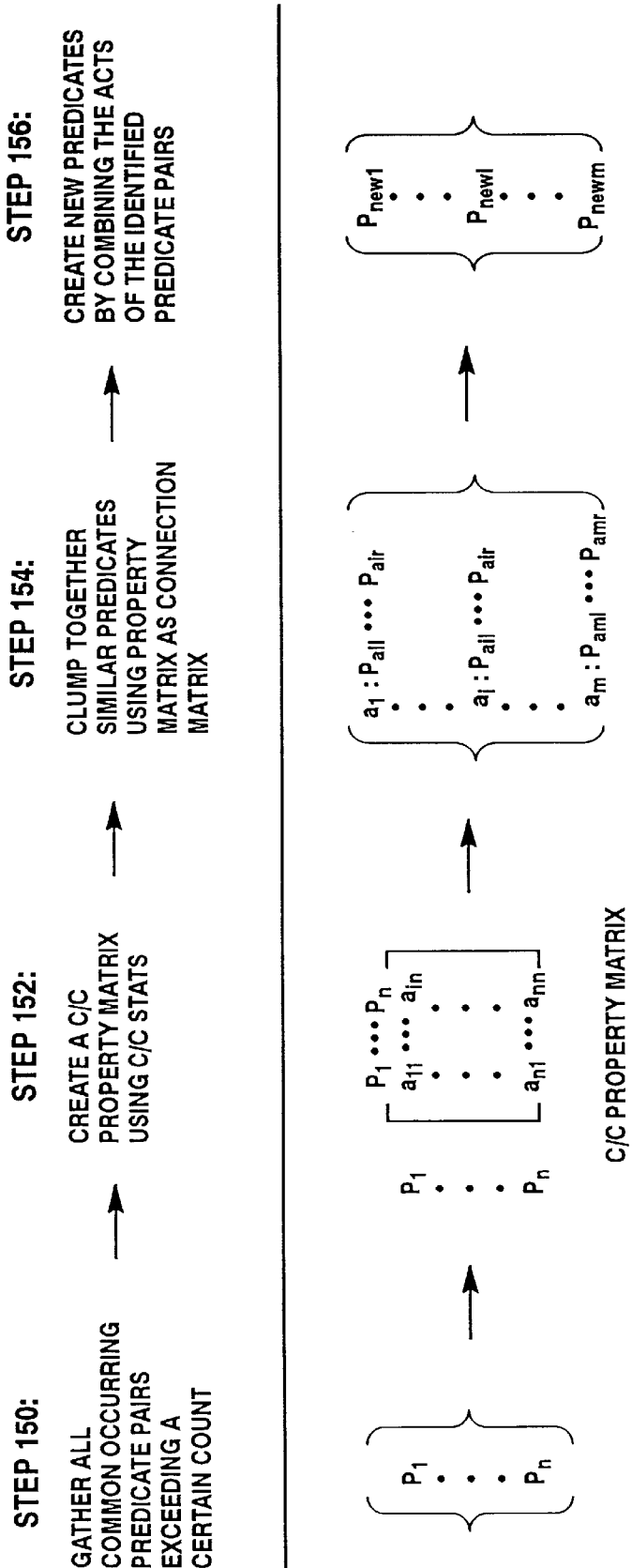
FIG. 7 is an illustrated flow diagram of abductive identification.

Identification is explained in conjunction with FIG. 7. All the common occurring predicate pairs exceeding a certain C/C count threshold will be selected for analysis. The C/C count threshold is preferably in the range of 1 to 10 and is preferably set at 5. A C/C property matrix is constructed as shown in FIG. 7, Step 152. Each selected predicate P1 to Pn is listed both vertically and horizontally outside of the matrix as shown. To develop the property matrix, the C/C counts and the general counts for the number of times each selected predicate occurred are used. The elements inside the co-occurrence property matrix are derived for a given element aij using Equation 23.

$$aij = \frac{\text{the number of times } Pi \text{ co-occured with } Pj}{\begin{array}{c}\text{the number of times } Pi \text{ occured} + \\ \text{the number of times } Pj \text{ occurs} - \\ \text{the number of times } Pi, Pj \text{ co-occured}\end{array}}$$  Equation 23

Accordingly, aij is always less than or equal to 1. Although the co-occurrence property matrix could be converted into a connection matrix as is done in generalization, in the preferred embodiment the property matrix is used as the connection matrix directly.

In Step 154, clumping is performed and as explained above in conjunction with FIGS. 6c–6f. Clumping for identification is similar to the clumping for generalization. Predicate pairs with a corresponding value aij in the matrix exceeding a certain threshold are selected for further analysis. The threshold for identification clumping is preferably set in a range of 0.5 to 0.9. The preferred threshold value is 0.8.

Elements along the main diagonal are discarded only if another value in the row exceeds the threshold. Otherwise, the element is kept. The selected predicated pairs are shown in FIG. 6e under the column marked "Clump Pairs". For each clump pair, additional predicates are identified for potential addition to the clump of predicates as is done during generalization clumping. The result of this process for all the clump pairs is shown in FIG. 6e in the column titled "Candidates for Addition To Clumps".

Out of the candidates to be potentially added to the clumps, successful candidates are determined in the same manner as generalization clumping. Likewise, the Processed Clumps are analyzed to see if the predicates within the processed clumps are the same as predicates in another clump (duplicates) or if the predicates within one processed clump are a sub-set of another processed clump as is done during generalization. The Processed Clumps not rejected are shown in FIG. 6e in the column titled "Accepted Clumps".

The Accepted Clumps are analyzed to see whether they should be combined. In the analysis, two clumps are combined if the number of common predicates between the two clumps divided by the number of predicates in the smaller clump is greater than a threshold. The resulting clumps are used in the subsequent steps in identification and are shown in FIG. 6e in the column titled "After Similarity Combining".

In FIG. 7, the clumps are listed as al to am, each clump of predicates Pai1 ... Pair being identified as clump ai. In Step 156, new predicates Pnewi are formed by combining the acts of the identified predicates Pai1 ... Pair for each clump ai. For instance, if clump ai had only two predicates (Pai, Pai2) and the predicate class for Pai1 contained A1, A2, A3 and for Pai2 contained acts A4, A5, the new predicate Pnewi is created along with new acts for its class having the same case and result predicates as acts A1, A2, A3, A4, A5. The acts of the new predicate Pnewi's class are new acts, A1new, A2new, A3new, A4new, A5new. Identification does not eliminate the existing predicates and acts.

After the new predicates and acts are created, their probability statistics are initialized. The goodness for both the new predicate and each new act in its class is set to 0.5. The convergence for the new predicate is set to 0.5. The probability for the new predicate is set to the highest probability value among the predicates from which it was formed. For clump ai above having two predicates the greater of the probability value between Pai1 and Pai2. The initial probability for each new act is the normalized probability of its corresponding old act in the new class, i.e. probability of A1new corresponds to normalized probability of old act A1, and is given by Equation 24.

$$\text{New Act Probability} = \frac{\text{Old Act's Probability}}{\sum \text{ all old Acts' Probabilities within the new predicate's class}} \quad \text{Equation 24}$$

Figure 8A:
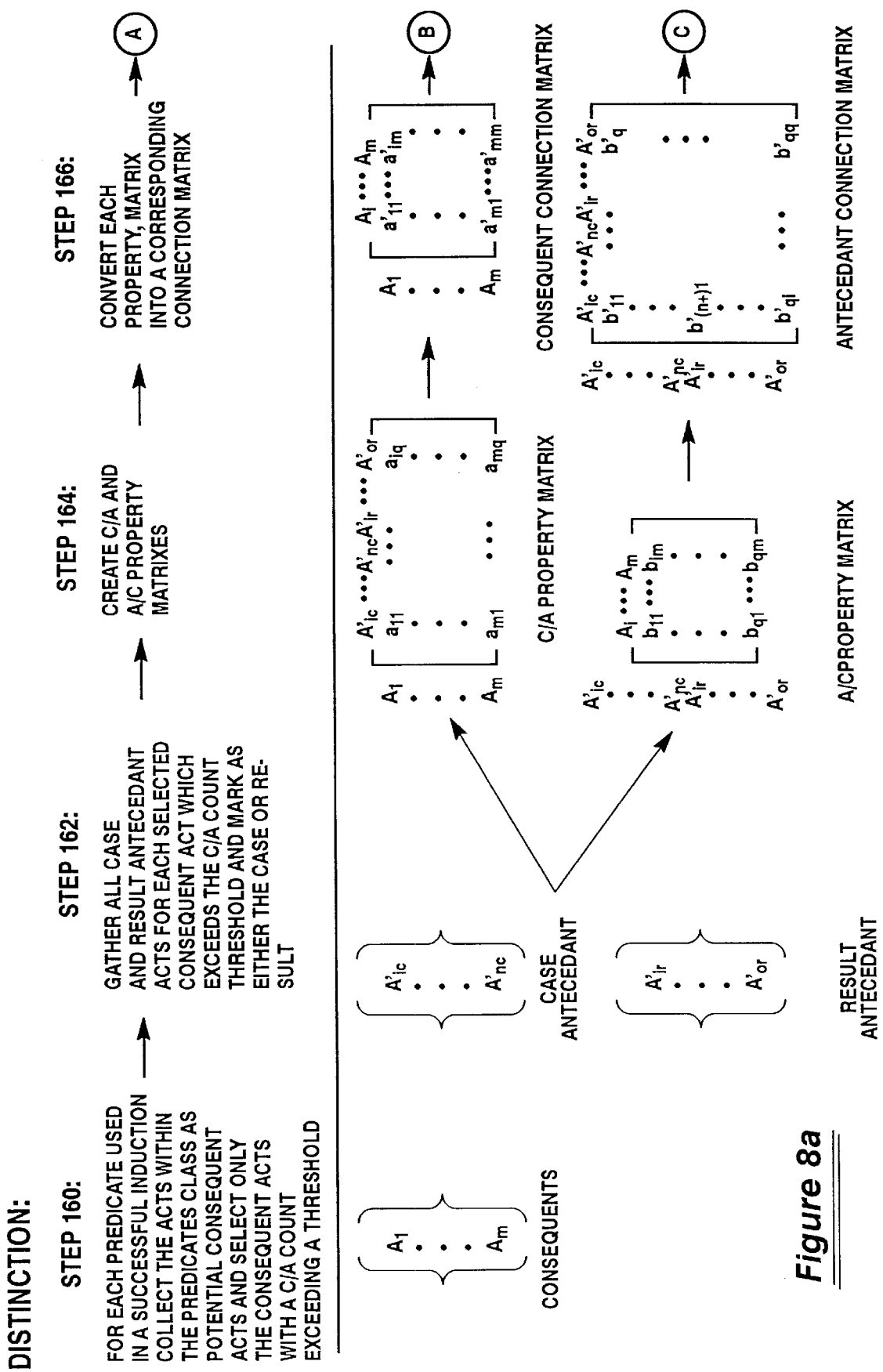

Distinction is explained in conjunction with FIGS. 8a and 8b. Each predicate identified as successful during induction which has at least two acts in its class is selected for potential distinction, Step 160. Thereafter the following steps are performed for each successful predicate to determine whether a new predicate with fewer acts should be created.

First, all the acts in the successful predicate's class are identified as potential consequent acts for the analysis. For each consequent act, all of the acts which are either the case antecedent or the result antecedent are identified in the C/A statistics. Identified consequent and antecedent acts with a C/A count greater than a certain threshold ranging from 1 to 10, preferably 5, are selected for further analysis. Step 162. Since an act in the case antecedent group may also be in the result antecedent group, each act is given a flag, a "c" or an "r", to indicate whether it is the case or result antecedent, respectively.

Subsequently, two property matrixes are formed, Step 164. A C/A property matrix with the consequents listed vertically and antecedents listed horizontally and an A/C property matrix with antecedents listed vertically and consequents listed horizontally. To determine the value of elements within the matrixes, C/A opp stats and the counts for usage of acts in successful inductions are used. Each element aij and bij in the respective matrixes are derived using Equations 25 and 26.

$$a_{ij} = \frac{\text{the number of times act } Aj \text{ was a consequent to the act in the } j\text{th column in a sucessful induction}}{\text{the number of times all acts within the class were used in sucessful induction}} \quad \text{Equation 25}$$

$$b_{ij} = \frac{\text{the number of times the act in the } i\text{th row was an antecedant to act } Aj \text{ in a sucessful induction}}{\text{the number of times all acts within the class were used in sucessful induction}} \quad \text{Equation 26}$$

After creating the C/A and A/C property matrixes, the two matrixes are converted into corresponding connection matrixes, Step 166, using the same Equations 19 and 20 as is used for conversion of the generalization property matrixes to connection matrixes. The C/A property matrix is converted into a consequent connection matrix and the A/C property matrix is converted into an antecedent connection matrix. The value of the elements within these matrixes represent the similarity between the corresponding acts listed outside of the matrix.

In Step 168, clumping is performed and as is explained in conjunction with FIGS. 6c–6f. Clumping for distinction is similar to the clumping for generalization except instead of predicate clumps, act clumps are formed and the numbers on the outside of the example matrix illustrated in FIGS. 6c–6d are taken to represent acts instead of predicates. The process is performed for both the consequent and antecedent connection matrixes. Act pairs with a corresponding connection matrix element which exceeds a certain threshold are selected for further analysis. The threshold for distinction clumping is preferably set in a range of 0.2 to 0.8. The preferred value is 0.3.

Elements along the main diagonal are discarded only if another value in the row exceeds the threshold. Otherwise, the element is kept. The selected act pairs for the example matrix are shown in FIG. 6e under the column marked "Clump Pairs". For each clump pair, additional acts are identified for potential addition to the clump of acts as was done for predicates during generalization clumping. The results of this process for all the clump pairs are shown in FIG. 6e in the column titled "Candidates for Addition To Clumps".

Out of the candidates to be potentially added to the clumps, successful candidates are determined in the same manner as generalization clumping. Likewise, the Processed Clumps are analyzed to see if the acts within the processed clumps are the same as acts in another processed clump (duplicates) or if the acts within one clump are a sub-set of another processed clump as was done during generalization. The Processed Clumps not rejected are shown in FIG. 6e in the column titled "Accepted Clumps".

Similarly, the Accepted Clumps are analyzed to see whether they should be combined. In the analysis, two clumps will be combined if the number of common acts between the two clumps divided by the number of acts in the smaller clump is greater than a threshold. The resulting clumps will be used in the subsequent steps in distinction and are shown in FIG. 6e in the column titled "After Similarity Combining". The resulting clumps are shown in FIG. 8b as clumps a1 to ao for the consequent connection matrix and as clumps b1 to bp for the antecedent connection matrix.

The clumps are broken down into their corresponding acts. For instance, a clump ai contains acts Aai1 . . . Aair and clump bk contains acts Abk1 . . . Abks. Each consequent clump is matched with each antecedent clump as shown in FIG. 8b as (a1, b1); (a1, b2); . . . (ai, bk); . . . (ao, bp). For each pairing a quality check is performed.

In the quality check, each act Aai1 to Aair in the consequent clump ai, for example, is matched with each act Abi1 to Abps in the antecedent clump bk as illustrated in Step 169. Using the values from the property matrixes for each matched act pair, each pair value is checked to see if it exceeds a certain threshold. For matched clump pair (ai, bk), the element values for each of the act pairs (Aai1, Abk1); (Aai1, Abk2); . . . (Aair, Abks) would be checked in the C/A property matrix, where Aai1 . . . Aair correspond to individual consequent acts A1 to Am and Abk1 . . . Abks correspond to individual antecedent acts A'1c to A'nc or A'1r to A'or. In the preferred embodiment, the threshold is set at the median value of all of the C/A property matrix values above the main diagonal. If all act pairs corresponding to a particular matched consequent/antecedent clump pair exceed the threshold, the clump pair is used to create a new predicate as illustrated in Step 170.

For each new predicate, Pnewi, created from a qualifying clump pair (ai, bk), new acts corresponding to each act, Aai1 . . . Aair, in the qualified consequent clump, ai, become a class associated with the new predicate Pnewi. Note that each act Aai1 . . . Aair is an act in the class of acts A1 to Am of the successful predicate with respect to which distinction is being performed. Additionally, new antecedent acts having Pnewi as the case or result, respectively, corresponding to all antecedent acts which have the predicate from which Pnewi was formed as case or result. Such acts are added to the predicate's class that contained the corresponding old antecedent act. For example, for an original predicate P, from which Pnewi is formed, and an original act A100 having P as case and P' as result in predicate P100, a new act A'100 is created having Pnewi as case and P' as result in the class of acts for predicate P100. Each such new act A'100 is initialized with a goodness value of 0.5 and a probability equaling the probability value of its corresponding act A100, and the probability values of all acts in the class of predicate P100 are then normalized.

The new predicate Pnewi is assigned a goodness of 0.5. The new predicate's probability is initializes to equal the sum of all the probability values of the old acts which correspond to the new acts multiplied by the probability of the original successful predicate. The goodness and probability of the original predicate and its acts are not changed. The acts for the new predicate Pnewi have their goodness set to 0.5. However, each new act in the predicate Pnewi receives a normalized probability associated with the probability of its corresponding old act in accordance with Equation 24 above. As noted above, the distinction abduction process is performed with respect to each successful predicate having at least two acts in its class.

During processing, certain acts and predicates become recognized as having little statistical importance. By systematically deleting such acts and predicates, the storage capacity needed for the knowledge space can be controlled. Elimination is the process used to delete act and predicate records. The use of elimination is preferred in order to limit the amount of storage capacity required for the knowledge space, but is not required.

In elimination 70, acts are selected based on the act's goodness or probability. If either the act's goodness or probability is below a threshold, it is eliminated. The goodness threshold is set in a preferred range of 0.0001 to 0.2 and is preferably set at 0.001 and the probability threshold is set in a preferred range of $1.0*10^{-30}$ to $1.0*10^{-3}$ and is preferably set at $1.0*10^{-3}$.

An alternate method of elimination is based on memory requirements. When the memory in use exceeds a certain threshold, a predetermined number of acts with the lowest goodness are eliminated. This permits the recapture of memory resources when necessary. A combination of the two methods may be employed where the goodness and/or probability threshold is raised when the memory threshold is reached.

Eliminating an act has repercussions throughout the rest of the knowledge base 72. After acts are eliminated, the probability of acts within any predicate class which had included an eliminated act are renormalized so that the total probability values of the remaining acts sum to one. Additionally, any class which has all of its acts eliminated will be barren. In this case, the predicate corresponding to the barren class will also be eliminated. After such predicates are eliminated, all acts for which the eliminated predicate was either a case or a result are also eliminated. The AsCase and AsResult pointers in the predicate records are used to identify such acts. Thereafter, the normalization of remaining acts' probability and/or the further elimination of predicates continues until all repercussions of the original act elimination are accounted.

Dyadic morphologic processing continues for multiple evaluations of a training corpus with each cycle of inductions and abductions improving the reliability of the knowledge space data. After each cycle of generalization, identification or distinction abductions, the corresponding P/S, C/C and C/A opp stats are cleared. When it is determined that no more P/S surprises exist or after a predetermined number of successive morphologic analyses of the entire training corpus, a final morphologic analysis of the training corpus is conducted.

During the final morphologic analysis, the thought sign generator 88 of the inductive submodule 60 is activated to generate thought signs as described above and no abductions are performed. As noted above, during training, thought signs will be generated and selected for further use if their corresponding predicate meets the desired convergence threshold.

In performance mode, thought signs are selected on a scoring basis with respect to the highest level successful predicate in each analysis space of first order sets of query data. A denotation of the set of constituent acts of the highest successful predicate is compared with existing thought signs. If there is an exact match, the existing thought sign is identified both as a token and as the thought sign to be passed to the dyadic taxemic module for further processing. If the denotation is not an exact match, that denotation is compared against all existing thought signs using a comparison of the acts in the denotation versus the denotation of the thought sign. For each existing thought sign, a score is calculated using Equation 27.

$$\text{score}=((\text{hits}/(\text{hits}+\text{misses}+\text{extras}))+\text{SamePositionCount}/(\text{SmallListLength}+\text{LargeListLength})) \quad \text{Equation 27}$$

where hits is the number of acts common to the denotation, misses is the number of acts in the smaller denotation that are not in the larger denotation and extras is the number of acts in the larger denotation that are not in the smaller denotation, SamePositionCount is the number of acts in the same position in each denotation, SmallListLength is the number of acts in the smaller denotation and LargeListLength is the number of acts in the larger denotation.

When all scores have been calculated, the highest score is compared with a threshold. The preferred value of the threshold is 0.38. A range of 0.33 through 0.80 is acceptable. If the highest score meets or exceeds the threshold, the thought sign used in generating that score is selected as the thought sign for the particular first order set of query data being analyzed.

If in performance mode no thought sign has a corresponding score which meets or exceeds the score threshold, the denotation for the highest level successful predicate for the query data first order set is added to the knowledge space as a thought sign which is used for further processing by the dyadic taxemic module 56 and the PDM 58.

Dyadic taxemic processing is preferably commenced with respect to the sequential second order sets which constitute the training corpus based on the thought signs created by the morphologic module. With reference to FIG. 9, the relationship between the induction process 60$a$, abduction process 62$a$ and knowledge base 72$a$ is represented in the context of the dyadic taxemic module 54 of the gnome 10. Both the induction process 60$a$ and abduction process 62$a$ utilize and modify the data in the dyadic taxemic knowledge base 72$a$.

The knowledge base 72$a$ of the dyadic taxemic module 54 preferably includes two of the three types of related data records used by the morphologic knowledge base 72, namely, predicates and acts. In the dyadic taxemic module 54 thought signs are preferably not created, but a tree form of the most statistically significant set of constituent acts of a predicate is created for each second order set which is subsequently used for initializing triadic taxemic processing.

Each dyadic taxemic predicate is associated with one or more dyadic taxemic acts which are collectively called a "class" of acts of the respective predicate. Preferably each predicate contains a pointer to each act in the class of acts of the particular predicate. Each act represents an ordered pair of two predicates, the first predicate being referred to as the "case" and the second predicate referred to as the "result." Although two different acts may have the same case and result predicates, each act is uniquely identified with a single predicate class. Preferably, the acts contain pointers to the predicate in which it is a class member, its case predicate and its result predicate. Additionally, each predicate also preferably contains a pointer to each act in which it is used as a case and to each act in which it is used as a result. Each predicate record also contains pointers to P/S and C/C operational statistics in which they are used.

Dyadic taxemic elemental acts correspond to the thought sign or signs identified by the morphologic module 52 for each first order set which in turn represent elements of the second order sets analyzed by the taxemic modules 54, 56. Elemental acts do not have either a corresponding case or result predicate. For convenience, elemental act case and result pointers point to 0 or a null set. Each elemental act forms the entire class for a corresponding elemental predicate. Elemental predicates are utilized by induction to initiate an inductive analysis of a second order set.

The predicates and acts are each identified with two types of statistical data relating to their occurrence called probability and goodness. The probability of acts are preferably normalized with respect to all acts within the same class so that the sum of all of the probability values of the individual acts within each class of acts equals one. Predicates are also identified with a statistic called convergence and a related statistic called fluctuation which is an indicator of the stability of the predicate's probability. Dyadic taxemic predicates also include a statistic called entropy.

Predicate data records also preferably contain other information useful in debugging the gnome. This information includes "type" and "iteration" of creation, i.e. how and when the predicate was created.

Dyadic taxemic predicates and acts are created during dyadic taxemic training. Initially, each time a new element, i.e. first order set, of a second order set is passed to the dyadic taxemic module 54, one or more elemental predicates and corresponding acts are created corresponding to the morphologic thought signs for that second order set element. The probability of each elemental dyadic taxemic predicate when formed is initially set to 0.5 and the probability of each dyadic taxemic elemental act when formed is initially set to 1 since it is in a single act class. The goodness of both the elemental acts and the elemental predicates are initially set at 0.5. The convergence of each elemental predicate is initialized to a selectable parameter having a value slightly less than 1, preferably 0.999. The predicate's type of creation is noted as "sensing", and its iteration is assigned a number corresponding to the number of dyadic taxemic inductive analyses which have been conducted prior to its creation.

FIGS. 10$a$–$b$ represents a possible association of taxemic elemental acts with two representative second order sets of a training corpus, namely the sentences: "Do you have veal?" and "What salad do you have?" The second order set elements are the words of each sentence, each of which are associated with one or more thought signs for which individual elemental dyadic taxemic acts are created. For example the word "veal" is associated with the thought signs ((ve)(al)) and (((ve)a)l) for which individual elemental dyadic taxemic acts A41 and A42, respectively, were created.

After elemental predicates and acts are defined in the dyadic taxemic knowledge base 72$a$ for all elements of a second order set, the dyadic taxemic module initiates an induction. The induction process 60$a$ is comprised of four primary components, analysis space processing 82$a$, operational statistics gathering and storing 84$a$, probability statistics gathering, storing and processing 86$a$, and tree form generation 88$a$.

The analysis space 82$a$ processing attempts to determine statistically most significant sequences of second order set elements, i.e. words in the preferred embodiment, by analyzing ordered pair relationship between predicates corresponding to each elemental predicate and sequential elemental predicate subset of each second order set. The analysis space 82$a$ systematically identifies predicates which contain acts corresponding to the sequence of elemental predicates or subsets of sequential elemental predicates corresponding to each second order set. Preferably, only the three most significant predicates for each sequence which are identified are kept at each level of inductive analysis processing for further processing at higher levels.

For a sentence having n words, the analysis space examines all possible combinations of acts which analyze two-word thought sign sequential subsets within the n word sentence, of acts which analyze three word thought sign sequential subsets within the n word sentence and so on so that it analyzes entire n-word sequences of word thought signs in the n word sentence and all subsequences. Multiple sequences at the nth level exist, because for any given word multiple thought signs may exist for dyadic taxemic evaluation.

The dyadic taxemic analytical process can be represented by rows of diagonally aligned boxes wherein the elemental predicates for each word thought sign of an n word sentence are placed in a diagonal of n boxes. An analysis of two-word thought sign sequential subsets is performed in a diagonal of n−1 boxes, a next adjacent diagonal of n−2 boxes represents the analysis of sequential three-word thought sign subsets and so forth such that a single box corresponding to an nth diagonal row represents an analysis of an entire sequence of n elemental predicates corresponding to the sentence being analyzed.

As represented in FIG. 11a, an analysis space 82a for the four word sentence: "Do you have veal?" has four diagonal rows of boxes D1, D2, D3, D4 representing four levels of analysis which form four rows R1, R2, R3, R4. As represented in FIG. 11b, an analysis space 82a for the five word sentence: "What salad do you have?" has five diagonal rows of boxes D1, D2, D3, D4, D5 representing five levels of analysis which form five rows R1, R2, R3, R4, R5.

The predicates identified and retrieved for use in a particular box of the analysis space 82a represent an analysis associated with a sequence of elemental predicates, commencing with a predicate which is directly to the left of the particular analysis space box and ending with an elemental predicate which is directly below the particular box. For example, the first box in the third diagonal row of an analysis space is associated with a sequence of a first three sequentially related elemental predicates; the second box in the third diagonal row horizontal row is associated with a second, third and fourth elemental predicate sequence of the sentence being analyzed.

In any dyadic taxemic inductive analysis undertaken before any dyadic taxemic abductive processing, the only predicates in the knowledge base 72a are the elemental predicates and corresponding elemental acts. Accordingly, there are no predicates which explain any of the boxes in the analysis space except for the first diagonal row of elemental predicates which correspond to the thought signs of words of the sentence being analyzed. Since up to six thought signs may have been created for a given word, up to six elemental dyadic taxemic predicates may occupy any given first diagonal box of a dyadic taxemic inductive analysis space.

FIG. 12 illustrates portions of pertinent predicate and corresponding act records in the dyadic taxemic knowledge space 72a after several rounds of abductions, for a sample representation of all of the dyadic taxemic predicates associated with the second order set sentences: "Do you have veal?" and "What salad do you have?" For predicates (P) in FIG. 12, a sample probability (p) is listed. Acts (A) are listed next to the predicate (P) in which the Act (A) is a class member and the act's case predicate (CP), result predicate (RP), and normalized class probability (p) are identified.

In an inductive analysis, prior to any abductions, only elemental predicates P11, P21, P22, P31, P41 and P42 would appear in the analysis space 82a represented in FIG. 11a along longest diagonal D1 with all of the other boxes in the analysis space being blank. After retrieving the elemental predicates and finding no other predicates having acts corresponding to any ordered pair of predicates in the first diagonal D1, the induction continues from the analysis space 82a with probability statistics gathering, storing and processing 86a and operational statistics gathering and storing 84a as explained in more detail below.

Similarly, in a dyadic taxemic inductive analysis, prior to any abductions, only elemental predicates P51, P61, P62, P63, P11, P21, P22 and P31 would appear in the dyadic taxemic analysis space 82a represented in FIG. 11b along the longest diagonal D1 with all of the higher level boxes in diagonal rows D2–D5 of the analysis space being blank. After retrieving the elemental predicates and finding no other predicates having acts corresponding to any ordered pair of predicates in the first diagonal D1, the induction continues from the analysis space 82a with probability statistics gathering, storing and processing 86a and operational statistics gathering and storing 84a as explained in more detail below.

Following a first round of dyadic taxemic abduction processing, predicates such as P70 through P76 identified FIG. 12a may be created having acts which correspond to the ordered pairs of elemental predicates. Since dyadic taxemic induction does not create predicates, all of the predicates stored in the knowledge base 72a at the time of the first dyadic taxemic abduction processing are elemental predicates. Consequently, all new dyadic taxemic predicates created during the first abduction processing only have acts representing ordered pairs of elemental predicates.

In subsequent rounds of abductive processing predicates, P80 through P102, as identified in FIG. 12a, may be added to the knowledge base 72a. Subsequently the analysis spaces for the sentences: "Do you have veal?" and "What salad do you have?" could include the predicates as represented in FIGS. 11a and 11b, respectively.

In the example illustrated in FIG. 11b, only the preferred maximum of three dyadic taxemic predicates are contained in the fourth box of the first row R1 even though there are four predicates which each are associated with a set of constituent acts which represents an analysis of the phrase: "What salad do you have?". P93 is associated with constituent act set {A931, A762, A51, A63, A701, A11, A21} which has a constituent act probability product equal to 0.12 i.e. (0.8*0.3*1*1*0.5*1*1); P94 is associated with constituent act set {A942, A751, A51, A61, A701, A11, A21} which has a constituent act probability product equal to 0.25 i.e. (0.5*1*1*1*0.5*1*1); P95 is associated with constituent act set {A952, A741, A51, A62, A711, A11, A22} which has a constituent act probability product equal to 0.15 i.e. (0.3*0.5*1*1*1*1*1); and P96 is associated with constituent act set {A962, A762, A51, A63, A711, A11, A22} which has a constituent act probability product equal to 0.06 i.e. (0.2*0.3*1*1*1*1). P93, P94 and P95 are selected for the analysis space since they have the highest constituent act probability product.

Dyadic taxemic predicate P102 is associated with a set of constituent acts {A120, A962, A762, A51, A63, A711, A11, A22, A31} which represents an analysis of the entire sentence "What salad do you have?". P102 is subsequently not included in the fifth box of the first row R1 of FIG. 11b, since its act A120 is based upon predicate P9 6 which was not included in the fourth box of the first row R1. P102 is not included even though predicate P96 by virtue of act A963 is identified in the fourth box of the second row R2 of the analysis space 82a in FIG. 11b.

In conjunction with the completion of a dyadic taxemic analysis space, the most probable analysis of an entire second order set and its constituent parts, both predicates and acts, of that analysis are identified as successful. Designations of being successful are gathered and utilized by the probability processing submodule 86a to update probability and goodness parameters of dyadic taxemic predicates and acts.

Where one or more predicates are identified with the nth box of the first row, i.e. the nth level diagonal box, of an analysis space 82a as illustrated in FIGS. 11a and 11b, such predicates represent analyses of the entire second order set. The "success" of an analysis of the entire second order set is determined by multiplying together the probability value of each constituent act represented by such predicates in the analysis space 82a. The set of constituent acts which have the highest probability product and the corresponding predicates of which each act is a class member are all identified as successful. With respect to the analysis space represented in FIG. 11a, predicates P90, P91 and P92 each represent analyses of the entire sentence: "Do you have veal?" P90 is associated with constituent act set {A902, A801, A711, A11, A22, A31, A41} which has a constituent act probability product equal to 0.42 i.e. (0.7*0.6*1*1*1*1); P91 is associated with constituent act set {A911, A701, A11, A21, A721, A31, A41} which has a constituent act probability product equal to 0.06 i.e. (0.3*0.5*1*1*0.4*1*1); and P92 is associated with constituent act set {A921, A711, A11, A22, A732, A31, A42} which has a constituent act probability product equal to 0.40 i.e. (0.5*1*1*1*0.8*1*1). Since 0.42 is the greatest constituent act probability product, P90 is identified as successful along with constituent acts A902, A801, A711, A11, A22, A31, A41 and corresponding predicates P80, P71, P11, P22, P31, P41.

P90 is also associated with a second constituent act set {A902, A800, A701, A11, A22, A31, A41} which represents the entire sentence: "Do you have veal?" However, that act has a lower constituent act probability product equal to 0.1 i.e. (0.5*0.4*0.5*1*1*1*1). Accordingly, that second constituent act set is not identified as successful.

With respect to the analysis space represented in FIG. 11b, predicate P100 and P101 each represent analyses of the entire sentence: "What salad do you have?" P100 is associated with constituent act set {A100, A751, A51, A62, A801, A711, A11, A22, A31} which has a constituent act probability product equal to 0.30 i.e. (0.5*1*1*1*0.6*1*1*1*1); P101 is associated with constituent act set {A111, A51, A963, A61, A801, A711, A1, A22, A31 } which has a constituent act probability product equal to 0.096 i.e. (0.4*1*0.4*1*0.06*1*1*1*1). Since 0.30 is the greatest constituent act probability product, P100 is identified as successful along with constituent acts A100, A751, A51, A62, A801, A711, A11, A22, A31 and corresponding predicates P75, P51, P62, P80, P71, P11, P22, P31.

Where no dyadic taxemic predicate is identified with the nth box of the first row, i.e. the nth level diagonal box, of an analysis space 82a, the success of a group of two or more predicates which collectively represent an analysis of the entire second order is determined. In identifying such groups, only the groups with the most predicates in the highest diagonal row of boxes which has any predicates are considered.

In addition to collecting data identifying successful dyadic taxemic predicates and acts for a completed analysis space 82a, the dyadic taxemic probability processing submodule 86a gathers data relating to the use of each predicate and formative act corresponding to the predicates as used in the analysis space 82a. The success determination process of calculating the constituent act probability product is also utilized to limit the number of predicates identified in any specific box of the analysis space as it is being completed as discussed above with respect to the fourth box of the first row R1 of FIG. 11b.

If the knowledge space contains more than the preferred three possible predicates for a box of a particular diagonal row based on the previously identified predicates in boxes of lower order, i.e. longer, diagonal rows, only the three predicates having the highest constituent act probability product are used to fill the box. Statistics regarding the use of predicates and their constituent acts and predicates in attempting to fill the box are also gathered by the probability processing submodule 86a. As discussed above with respect to the fifth box of the first row R1 of FIG. 11b, in further completing higher level diagonal boxes, predicates are only sought which have acts corresponding to ordered pairs of predicates previously assigned to boxes of lower level diagonal rows.

After the completion of each dyadic taxemic analysis space 82a and a success determination for the most probable set of constituent acts and corresponding predicates which provide a complete analysis of the second order set being analyzed, the dyadic taxemic induction module 60a updates the probability, statistic of the current predicate and act records then contained in the dyadic taxemic knowledge space 72a.

The procedure for updating probability, goodness and convergence values in the dyadic taxemic module 54 are the same as in the dyadic morphologic module 52. To update a dyadic taxemic act's probability, the stored value of the act's probability is retrieved along with the counts for each act within the respective act's class. Using these counts, a new is estimate for the act's probability is derived using Equation 3 above.

Subsequently, Equation 4 above is used to exponentially age the dyadic taxemic act's probability using the stored value of the act's probability and the estimated value of the act's probability from Equation 3 to determine an aged probability for the act. The act's aged probability is then normalized with all the other acts within the same class using Equation 5 above.

Dyadic taxemic predicate probability values are also updated using exponential aging. Using the counts for the number of times the predicates were used in successful inductions, Equation 6 above is used to estimate the value of the predicate's probability. Using the estimated probability, the stored probability is exponentially aged using Equation 7 above. The resultant aged probability is stored in the knowledge base to update the predicate's probability.

To update the goodness for a dyadic taxemic act, two counts are used: the number of times the act was used and the number of times the act was used in a successful analysis. Using these counts, an estimate for the act's goodness is calculated using Equation 8 above. To exponentially age an act's goodness, Equation 9 above is used with the stored value for the act's goodness and the estimated value from Equation 8. The result is used to update the act's goodness by storing the result in the knowledge base 72a.

Dyadic taxemic predicate goodness values are similarly updated. For a particular predicate, the counts for the number of times the predicate was induced and the number of times the predicate was used in a successful induction are gathered. The number of times the predicate was induced includes the times it was identified even if it was not used to fill a box in the analysis space, such as the case of P96 which was not used in the fourth box of the first row R1 in FIG. 11b as discussed above. An estimate of the predicate's goodness is generated using these counts in Equation 10 above. To exponentially age the goodness, the stored value along with the estimated value are used in Equation 11 above. The result is subsequently stored in the knowledge base 72a as the updated predicate's goodness.

Dyadic taxemic predicate convergence statistics are updated at the same time predicate probability values are updated. For each dyadic taxemic predicate, a fluctuation is calculated using the predicate's previously stored probability and the predicate's newly determined updated probability in Equation 12 above. The value for the new fluctuation is compared to a previously stored fluctuation or 0 if no other value had been stored. If the new fluctuation is less than the previous fluctuation, the predicate's probability is assumed to be gravitating towards its "true" value. In this situation the convergence is updated using Equation 13 above. If the old fluctuation is greater than the new fluctuation, the predicate's probability value is assumed to not be gravitating towards its "true" value. In this situation, the convergence is updated using Equation 14 above.

As in the dyadic morphologic module, a flag (f) is preferably maintained which tracks the number of dyadic taxemic analysis spaces occurring since the last update of probability type statistics, so that (f*WF) per Equation 15 is used for updating statistics and all predicates and act statistics are updated after every 32 analysis spaces in advance of abductive elimination.

Also in conjunction with the completion of a dyadic taxemic analysis space, three types of operational statistics (opp stats) are collected, namely predecessor/successor (P/S) statistics; co-occurrence (C/C) statistics and case/antecedent (C/A) statistics.

A dyadic taxemic P/S statistic is generated for each pair of dyadic taxemic predicates which provide a valid analysis of a subset of sequential elemental predicates which is a "surprise." A "surprise" is represented by a blank box in the dyadic taxemic analysis space in the ith diagonal row for the box representing an analysis of a select set of i sequential elemental predicates, where all boxes in higher levels, i.e. shorter diagonal rows, which include an analysis of the selected set of i elemental predicates are also blank. This is the same process as explained above with respect to the generation of dyadic morphologic P/S statistics.

With respect to the analysis illustrated in FIGS. 11a and 11b, no dyadic taxemic P/S statistic would be generated. Although there is no predicate identified for several of the boxes, predicates are contained in the nth level box of each analysis space so that an analysis of a sequence of elemental predicates representing the entire second order set sentence is contained in multiple predicates in each example; P90, P91, P92 in the example of FIG. 11a and P100, P101 in the example of FIG. 11b.

In general in a dyadic taxemic analysis space of an n word sentence, for positive integers i and j where j+i≦n, all predicates in the ith row in the jth box are validly paired with each predicate in each box of the (j+i)th row in the consideration of P/S statistic generation. Where multiple predicates appear in analysis space boxes, corresponding multiple valid pairs are considered.

Co-occurrence or C/C statistics are generated to reflect the co-occurrence of two dyadic taxemic predicates in the same higher level box of an analysis space. Dyadic taxemic C/C statistics are not generated for elemental predicates. Based on the completed analysis space as represented in FIG. 11a, co-occurrence or C/C statistics would be generated representing the co-occurrence of P70 with P71, P72 with P73, P90 with P91, P90 with P92, and P91 with P92. Alternatively,-each respective co-occurrence statistic would be incremented by 1 if it had previously been created. In the preferred embodiment, only three dyadic taxemic predicates are permitted to co-occur in a single analysis space box of level 2 or greater. If such a parameter is increased, additional C/C statistics would be generated for all possible pairings of predicates in a common box.

Dyadic taxemic C/A statistics are gathered with respect to the non-elemental consequent and antecedent acts within the set of constituent acts for each successful dyadic taxemic predicate. For the analysis space as represented in FIG. 11a, P90 was identified as successful along with constituent acts A902, A801, A711, A11, A22, A31, A41. Highest level act A902 is identified as case antecedent to act A801 of predicate P80 which act is identified as a corresponding consequent. Highest level act A902 is also identified as result antecedent to act A41 of predicate P41 which act is identified as a corresponding consequent. Thus dyadic taxemic C/A statistics for A801/A902/case and A41/A902/result are generated or incremented by 1 if they had been previously created.

Dyadic taxemic act A801 is likewise identified as case antecedent to consequent act A711 and is result antecedent to consequent act A31. However, since act A31 is an elemental act, a C/A statistic for A711/A801/case is generated or incremented by 1, but not for A31/A801/result.

Until cleared by a dyadic taxemic abduction, P/S C/C and C/A dyadic taxemic opp stats are accumulated for each successive processing of an inductive analysis space of sequential first order sets. After a predetermined number of P/S, C/C or C/A statistics is reached or exceeded following the conclusion of an analysis space, a respective dyadic taxemic abduction 62a is initiated. Preferably a specific type of abduction processing is triggered when the corresponding type of opp stat exceeds 10,000.

If the P/S statistics limit is reached, abductive generalization is commenced. If the C/C statistic limit is reached, abductive identification is commenced. If the C/A statistic limit is reached, abductive distinction is commenced. Those three types of abductions will also be triggered if the end of the training corpus is reached. Abductive elimination is preferably commenced after each processing of probabilities of the entire set of predicates and acts in the knowledge space.

Dyadic taxemic abductive generalization processes dyadic taxemic predicates, acts and associated P/S counts using the same process as dyadic morphologic abductive generalization uses in processing dyadic morphologic predicates, acts and associated P/S counts as explained above in conjunction with FIGS. 6a and 6b. As with dyadic morphologic generalization, dyadic taxemic generalization creates new dyadic taxemic predicates and acts.

Dyadic taxemic abductive identification processes dyadic taxemic predicates, acts and associated C/C statistics using the same process as dyadic morphologic abductive identification uses with dyadic morphologic predicates, acts and associated C/C statistics as explained above in conjunction with FIG. 7.

Dyadic taxemic distinction processes dyadic taxemic predicates, acts and associated C/A statistics using the same process as dyadic morphologic distinction uses in processing dyadic morphologic predicates, acts and associated C/A statistics as explained above in conjunction with FIGS. 8a and 8b.

Dyadic taxemic elimination preferably uses the same process to eliminate dyadic taxemic acts and predicates as dyadic morphologic elimination uses to eliminate dyadic morphologic acts and predicates. In each case of dyadic taxemic abduction, it is preferred, but not required, to use the same threshold values as used in the dyadic morphologic abductions.

Dyadic taxemic processing continues for multiple evaluations of the training corpus with each cycle of inductions and abductions improving the reliability of the knowledge space data. After each cycle of generalization, identification or distinction abductions, the corresponding P/S, C/C opp stats are cleared for the next round of inductions. When it is determined that no more P/S surprises exist or after a predetermined number of successive dyadic taxemic analyses of the entire training corpus, a final dyadic taxemic analysis of the training corpus is conducted. During the final dyadic taxemic analysis in training mode and during performance mode, entropy values are determined, a tree form of the successful constituent act set is identified with each second order set by tree form generation submodule 88*a*, and no abductions are performed.

Entropy is a measure of the randomness in choosing between acts within a predicates class. A dyadic taxemic predicate's entropy is calculated using the probability of the act's within the predicate's class. The predicate's entropy is determined by Equation 28.

Pred's Entropy=ΣFor all Acts in the Class, the negation of Act's Prob. times the natural log of Act's Prob.   Equation 28

For example, two dyadic taxemic predicates may exist: P1 having two acts A1 and A2 within its class and P2 having two acts A3 and A4 in its class. If the probabilities associated with the acts are A1=0.99, A2=0.01, A3=0.5 and A4=0.5, the entropy of P1=0.056, i.e. (−0.99 in (0.99)−0.01 in (0.01)) and the entropy of P2=0.693, i.e. (−0.5 in (0.5)−0.5 1n (0.5)). The act's probabilities infer that when P1 is induced, it is most likely as a result of act A1 being induced. By contrast, when P2 is induced, it is equally likely that A3 or A4 resulted in the inducement of P2. Since it is easier to determine which act most likely induced P1, P1 is considered less random than P2. P1 having a lower entropy value than P2, reflects this fact.

A dyadic taxemic tree form is represented by lowest level terminal nodes, each representing a successive word of a sentence, i.e. element of a second order set. Higher level nodes represent ordered pairs of lower level nodes of either the same or different level. A single highest level node represents an analysis of an entire sentence. For a sentence having n words, 2n−1 nodes are contained in any tree form which represents a complete analysis of the entire n word sentence being analyzed.

A tree form representing the constituent act set {A902, A801, A711, A11, A22, A31, A41} of successful dyadic taxemic predicate P90 with respect to the analysis space of FIG. 11*a* is illustrated in FIG. 13*a*. A tree form representing the constituent act set {A100, A751, A51, A62, A801, A711, A11, A22, A31} of successful dyadic taxemic predicate P100 with respect to the analysis space of FIG. 11*b* is illustrated in FIG. 13*b*. Triadic taxemic processing proceeds based on the tree form representations created by the dyadic taxemic module 54.

With reference to FIG. 14, the relationship between the triadic taxemic induction process 60*b*, triadic taxemic abduction process 62*b* and triadic taxemic knowledge base 72*b* is represented in the context of the triadic taxemic module 56 of the gnome 10. Both the induction process 60*b* and abduction process 62*b* utilize and modify the data in the knowledge base 72*b*.

The knowledge base 72*b* of the triadic taxemic module 56 preferably includes predicate and act data records similar to those used by the morphologic knowledge base 72. Each triadic taxemic predicate is associated with one or more triadic taxemic acts which are collectively called a "class" of acts of the respective predicate. Preferably each triadic taxemic predicate contains a pointer to each act in the class of acts of the particular predicate. Additionally, each triadic taxemic predicate contains a pointer to the entropy of a corresponding dyadic taxemic predicate. Each triadic taxemic act represents an ordered pair of two predicates, the first predicate being referred to as the "case" and the second predicate referred to as the "result."

A case predicate of a triadic taxemic act represents an analysis of a set of elemental predicates for nodes of a connected subtree of nodes which in turn is connected by a single downward directed leg of the tree form to a subtree having connected nodes represented by elemental predicates for which the triadic taxemic act's result predicate is a representation. Inherent in the structure of subtrees is the existence of a highest level node represented by any subtree and associated predicate. The highest level node elemental predicate in a case predicate for a given triadic taxemic act is always higher than the highest level node elemental predicate of the set of elemental predicates represented by the result predicate. Furthermore, the tree leg which connects the elemental case predicate subtree to the elemental result predicate subtree will connect to the highest level node elemental predicate of the set of elemental predicates represented by the result predicate. The connecting leg between the case and result predicates will extend from the case predicate to the result predicate in either a left or right direction. Accordingly, each non-elemental triadic taxemic act also has a direction value, preferably 1 for leftness and 0 for rightness, associated with leftness or rightness of its result predicate relative to its case predicate.

Although two different acts may have the same case predicate, result predicate and direction value, each act is uniquely identified with a single predicate class. Preferably, the triadic taxemic acts contain pointers to the predicate in which it is a class member, its case predicate and its result predicate. Additionally, each triadic taxemic predicate also preferably contains a pointer to each act in which it is used as a case and to each act in which it is used as a result. Each predicate record also contains pointers to P/S and C/C operational statistics in which they are used.

Elemental triadic taxemic acts correspond to the dyadic taxemic acts contained in the tree forms identified by the dyadic taxemic module for each second order set. FIGS. 15*a* and 15*b* illustrate the identification of elemental triadic taxemic acts for the second order set sentences: "Do you have veal?" and "What salad do you have?" Each elemental triadic taxemic act corresponds to a representation of a subset of sequential second order set elements. For example, triadic taxemic elemental act A2 represents "Do you have" and triadic taxemic elemental act A9 represents "What salad." Elemental triadic taxemic acts do not have either a corresponding case or result predicate or leftness or rightness direction value. For convenience, elemental act case and result pointers point to 0 or a null set and a direction value is not given.

Each triadic taxemic elemental act forms the entire class for a corresponding triadic taxemic elemental predicate. Elemental predicates are utilized by induction 60*b* to initiate a triadic taxemic inductive analysis of a second order set. As illustrated in FIGS. 16*a,b*, the triadic taxemic predicates maintain the same tree structure represented by the dyadic taxemic act tree forms shown in FIGS. 13*a, b*. Each triadic taxemic predicate contains a pointer to the entropy of a corresponding dyadic taxemic predicate. The entropy pointer of an elemental triadic taxemic act points to the entropy value of the dyadic taxemic predicate having the class which contains the dyadic taxemic act which corresponds to the same tree structure mode as the elemental triadic taxemic predicate. For example, the entropy pointer for triadic taxemic elemental predicate P2 points to the entropy of dyadic taxemic predicate P80, since P2 is located at the same tree mode position in FIG. 16a as act A801 is in FIG. 13a, A801 being an act within the class of dyadic taxemic predicate P80 as reflected in FIG. 12. Note that for any tree, triadic elemental predicate P2 is always at the same node location as act A801 is in the corresponding dyadic tree form, compare FIGS. 13b and 16b.

The triadic taxemic predicates and acts are each identified with two types of statistical data relating to their occurrence in inductive analysis called probability and goodness. The probability of acts are normalized with respect to all acts within the same class so that the sum of all of the probability values of the individual acts within each class of acts equals one. Triadic taxemic predicates are also identified with a statistic called convergence and a related statistic called fluctuation which is an indicator of the stability of the predicate's probability.

Triadic taxemic predicate data records also preferably contain other information useful in debugging the gnome. This information includes "type" and "iteration" of creation, i.e. how and when the predicate was created.

Preferably all triadic taxemic predicates and triadic taxemic acts are created during training. Initially, each time a new tree form of a second order set is passed from the dyadic taxemic module 54 to the triadic taxemic module 56, an elemental predicate and corresponding act are created corresponding to each dyadic taxemic act in the tree form for the corresponding second order set. Since all tree forms of n element second order sets have 2n−1 nodes, N elemental triadic predicates are required for each triadic set analysis where N=2n−1. The probability of each elemental predicate when formed is initially set to 0.5 and the probability of each elemental act when formed is initially set to 1 since it is in a single act class. The goodness of both the elemental acts and the elemental predicates are initially set at 0.5. The convergence of each elemental predicate is initialized to a selectable parameter having a value slightly less than 1, preferably 0.999. For each elemental predicate, its type of creation is noted as "sensing", and its iteration is assigned a number corresponding to the number of triadic taxemic inductive analyses which have been conducted prior to its creation.

After elemental predicates and acts are defined in the triadic taxemic knowledge base 72b for all N nodes corresponding to the dyadic taxemic tree form representing an n element second order set, the triadic taxemic module initiates an induction. The triadic taxemic induction process 60b is comprised of four primary components, analysis space processing 82b, operational statistics gathering and storing 84b, probability statistics gathering, storing and processing 86b, and percept generation 88b.

The triadic taxemic inductive analysis processing is analogous to the dyadic taxemic analysis except that instead of conducting an analysis of a linear sequence of sequential elemental predicates, the triadic analysis conducts an analysis on subtree related elemental predicates where each successive level of analysis entails the examination of subtrees of a successively greater number of nodes and associated elemental predicates. FIGS. 17a–h illustrate each of the eight possible subtrees of four nodes of the seven node tree illustrated in FIG. 16a for fourth level triadic taxemic inductive analysis.

The first level of the triadic taxemic analysis space 82b corresponds to a collection of first level boxes L1a–L1N, corresponding to each of the N nodes of the tree form which represents the dyadic taxemic analysis of an n word sentence. The collection of N single node subtree first level boxes is analogous to the first diagonal row D1 of n boxes in the dyadic taxemic analysis space 82a. The second level of the triadic taxemic analysis space consists of a collection of second level boxes L2a–L2(N−1) corresponding to all two node subtrees of elemental predicates of the triadic taxemic elemental predicate tree. The collection of such two node subtree spaces in the triadic taxemic analysis space 82b is analogous to the second diagonal row D2 of n−1 boxes in the dyadic taxemic space 82a. The third level of triadic taxemic analysis involves the identification of predicates contained in the knowledge space 73b for third level subtree boxes which correspond to all three node subtrees of elemental predicates. The third level boxes of the triadic taxemic analysis space 82b roughly corresponds to the third diagonal row D3 of boxes of a dyadic taxemic analysis space 82a. Triadic taxemic analysis continues such that each collection of next higher triadic taxemic level boxes up to N levels are examined. For the Nth level of analysis, the N level box constitutes a single box LN representing the entire tree of N nodes which is analogous to the single box in the nth diagonal row of dyadic taxemic analysis space 82a of an n word sentence.

For any given tree of N elemental predicate nodes, there is a fixed number of ith level boxes, representing the analysis of i node subtrees in the ith level of triadic taxemic analysis, which number is readily ascertainable by those of ordinary skill in the art for any specific positive integers i and N. The number of second level boxes in the triadic taxemic analysis space 82b of an N node tree is always N−1. The number of (N−1)th level boxes in the analysis space 82b of an N node tree is always n, the number of lowest level node predicates which corresponds to the number of words in the second order set sentence being analyzed.

Figure 18A:
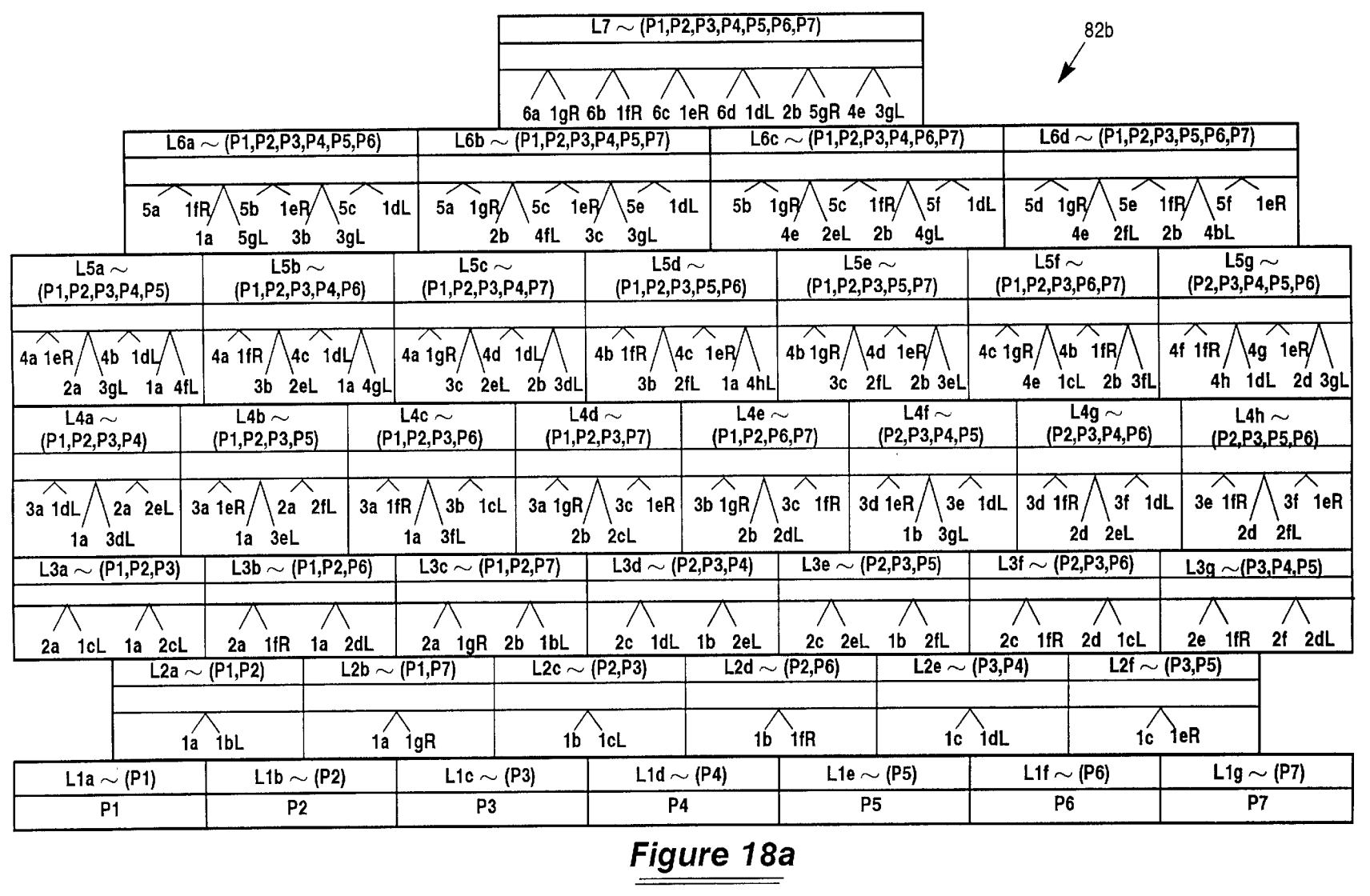
Figure 18B:
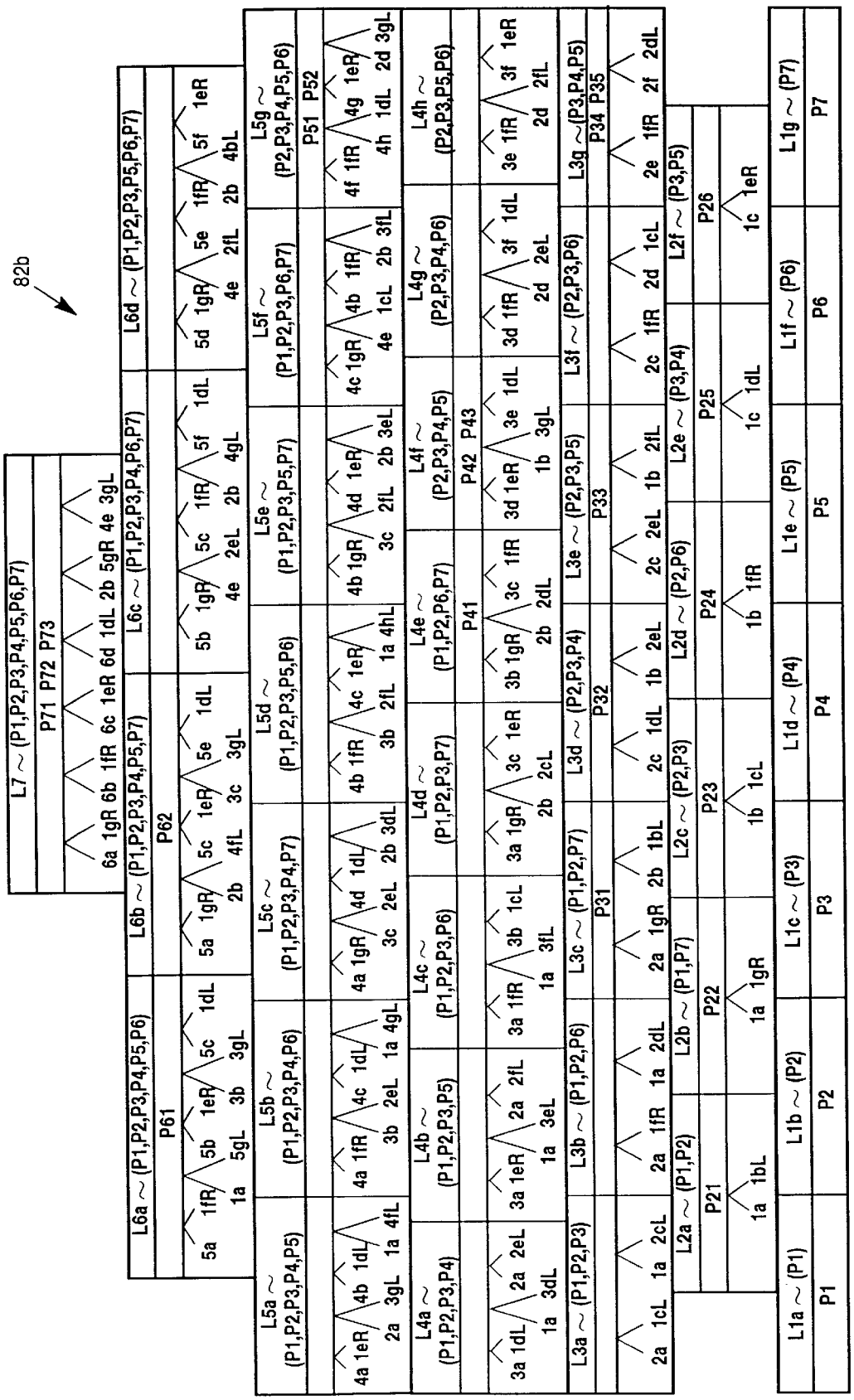

FIG. 18a represents the triadic taxemic analysis space 82b with the initial assignment of the elemental triadic taxemic predicates shown in FIG. 16a for the sentence "Do you have veal?" In FIGS. 18a and 18b, the first level of the analysis space 82b is represented by boxes L1a–L1g which correspond to "N" single node subtrees (P1)–(P7). The second level of the triadic taxemic analysis space 82b is represented by six boxes L2a–L2f, each box for predicates representing an analysis of the six two-node subtrees of connected elemental predicates. Box L2a for subtree (P1, P2), box L2b for representations of subtree (P1, P7), box L2c for representations of subtree (P2, P3), box L2d for representations of subtree (P2, P6), box L2e for representations of subtree (P3, P4), and box L2f for representations of subtree (P3, P5).

The third level of the triadic taxemic analysis space 82b for the elemental predicate tree of FIG. 16a is represented by seven boxes L3a–L3g, each box for predicates representing the seven three-node subtrees of connected elemental predicates. Box L3a for representations of subtree (P1, P2, P3), box L3b for representations of subtree (P1, P2, P6), box L3c for representations of subtree (P1, P2, P7), box L3d for representations of subtree (P2, P3, P4), box L3e for representations of subtree (P2, P3, P5), box L3f for representations of subtree (P2, P3, P6), and box L3g for representations of subtree (P3, P4, P5).

The fourth level of triadic taxemic analysis space 82b is represented by eight boxes L4a–L3h, each box for predicates representing the eight four-node subtrees of connected elemental predicates shown in FIGS. 17a–h. Box L4a for representations of subtree (P1, P2, P3, P4), box L4b for representations of subtree (P1, P2, P3, P5), box L4c for representations of subtree (P1, P2, P3, P6), box L4d for representations of subtree (P1, P2, P3, P7), box L4e for representations of subtree (P1, P2, P6, P7), box L4f for representations of subtree (P2, P3, P4, P5), box L4g for representations of subtree (P2, P3, P4, P6), and L4h for representations of subtree (P2, P3, P5, P6).

The fifth level of the triadic taxemric analysis space 82b is represented by seven boxes L5a–L5g, each box space for predicates representing the seven five-node subtrees of connected elemental predicates. Box L5a for representations of subtree (P1, P2, P3, P4, P5), box L5b for representations of subtree (P1, P2, P3, P4, P6), box L5c for representations of subtree (P1, P2, P3, P4, P7), box L5d for representations of subtree (P1, P2, P3, P5, L5e for representations of subtree (P1, P2, P3, PS, P7), box L5f for representations of subtree (P1, P2, P3, P6, P7), and box L5g for representations of subtree (P2, P3, P6).

The sixth level of the triadic taxemic analysis space 82b is represented by four boxes L6a–L6d, each box for predicates representing the four six-node subtrees of connected elemental predicates. Box L6a for representations of subtree (P1, P2, P3, P4, P5, P6), box L6b for representations of subtree (P1, P2, P3, P4, P5, P7), box L6c for representations of subtree (P1, P2, P3, P4, P6, P7), and box L6d for representations of subtree (P1, P2, P3, P5, P6, P7).

The seventh and highest level of the triadic taxemic analysis 82b for the seven node tree form of FIG. 16a is represented by the single box L7, for predicates representing the entire tree.

The triadic taxemic analysis space 82b processing attempts to determine statistically most significant sequences of second order sets by analyzing ordered pair relationships between triadic taxemic predicates corresponding to elemental predicates and subtree connected sets of elemental predicates. The analysis space 82b systematically identifies predicates for each ith level analysis box which contain acts corresponding to ordered pairs of mutually exclusive predicates which combine to define an analysis all i elemental predicates for the subtree which the particular ith level box represents.

For second level boxes and above, predicates for each ith level box are systematically searched for in the knowledge space 72b which have acts corresponding to valid ordered pairs of predicates occupying lower level boxes. Such acts are readily locatable through reference to the asCase and asResult pointers maintained in the predicate records of knowledge space 72b.

FIGS. 18a and 18b includes a representation of the predicate types of possible valid order predicate pairs for the second through seventh level boxes with respect to the seven node tree of FIG. 16b. For convenience, predicates occupying the xth i level box, i.e. Lix, are referred to as type ix predicates. For example, the box representing fourth level box L4a in FIG. 18a may be filled with any existing predicate having an act with a case predicate of the type 3a, i.e. already occupying box L3a, and a result predicate of the type 1d with a leftness direction; type 1x predicates corresponding to a specific elemental predicate. Predicates having acts with case type 2a predicates and result type 2e predicates with leftness direction and predicates having acts with case type 1a predicates and result type 3d predicates with leftness direction are also valid candidates for box L4a.

In the first round of the triadic taxemic inductive analysis, before any abductive processing, the only predicates in the knowledge base 72b are the elemental predicates and corresponding elemental acts. Accordingly, there are no predicates which explain any of the higher level boxes in the analysis space 82b. Only the first level boxes are filled, each with an elemental predicate.

As illustrated in FIG. 18a, in a first inductive analysis, prior to any abductions, only elemental predicates P1–P7 appear in first level boxes L1a in the analysis space 82b represented by the seven levels of boxes L1a–g, all of the other higher level boxes in the analysis space are blank. After retrieving the elemental predicates and finding no other predicates having acts corresponding to any valid ordered pair of predicates, the induction continues from the analysis space 82b with probability statistics gathering, storing and processing 86b and operational statistics gathering and storing 84b as explained in more detail below.

FIG. 19 illustrates portions of pertinent predicate and corresponding act records in the triadic taxemic knowledge space 72b after several rounds of abductions, including a possible sample of all of the elemental predicates associated with the second order set sentence: "Do you have veal?" For predicates (P) in FIG. 19, a sample probability (p) is listed. Acts(A) are listed next to the predicate (P) in which the Act (A) is a class member and the act's case predicate (CP), result predicate (RP), direction (d) and normalized class probability (p) are identified.

Following a first round of triadic taxemic abduction processing, predicates such as P21 through P26 identified FIG. 19 may be created having acts which correspond to the ordered pairs of elemental predicates as defined by the tree structure of FIG. 16a. Since induction does not create predicates, all of the predicates stored in the knowledge base 72b at the time of the first abduction processing are elemental predicates. Consequently, all new predicates created during the first abduction processing only have acts representing ordered pairs of elemental predicates.

In subsequent rounds of abductive processing predicates P31 through P73 as identified in FIG. 19 may be added to the knowledge base 72b. Subsequently the triadic taxemic analysis space 82b for the sentence: "Do you have veal?" would include the predicates in the respective analysis space boxes as illustrated in FIGS. 18b.

In conjunction with the completion of a triadic taxemic analysis space 82b, the most probable analysis of an entire tree form of elemental predicates of a second order set and its constituent parts, both predicates and acts, of that analysis are identified as successful. Designations of being successful are gathered and utilized by the probability processing submodule 86b to update probability statistics of predicates and acts as discussed in detail below.

Where one or more predicates are identified with the N level box of an analysis space 82b, such predicates represent analyses of the entire tree form of a corresponding second order set. Each predicate placed in the N level box will have a constituent set of 2N−1 acts which each analyzes subtrees that progressively nest upon the N node tree structure. The most probable analysis of the entire tree form of the second order set is determined by multiplying together the probability value of each constituent act represented by such predicates in the analysis space 82b. The set of constituent acts which have the highest probability product and their corresponding predicates are all identified as successful.

Figure 20A:
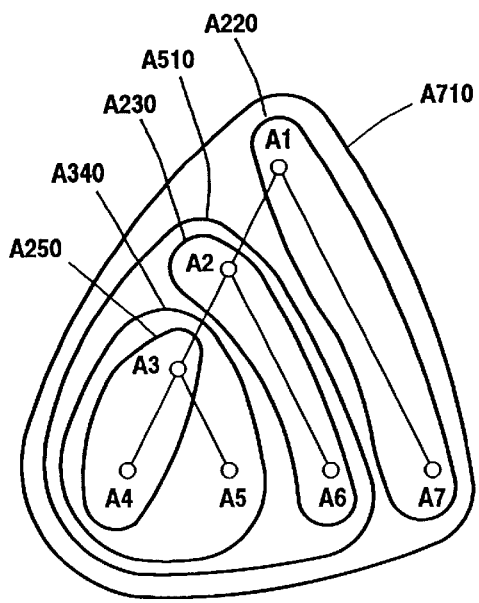
FIGS. 20a, 20b and 20c are graphic illustrations of the nesting of triadic taxemic acts within sets of constituent acts of the predicates occupying the highest level box L7 of the triadic taxemic analysis space illustrated in FIG. 18b.
Figure 20B:
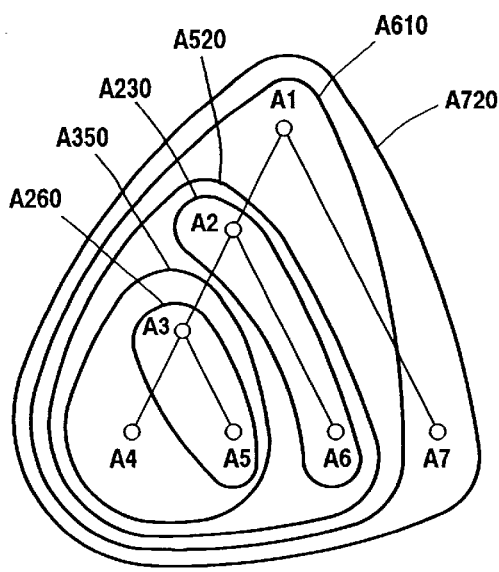
Figure 20C:
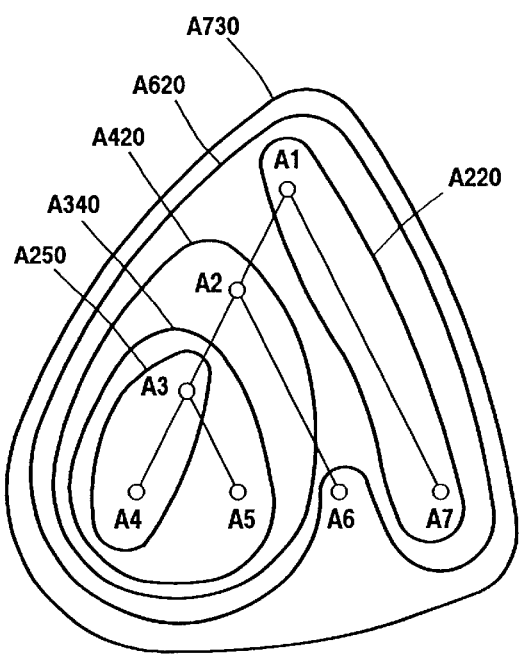

With respect to the analysis space 82b illustrated in FIG. 18b, as completed with the predicates identified in FIG. 19, predicates P71, P72 and P73 each represent analyses of the entire tree form for the sentence: "Do you have veal?" P71 is associated with constituent act set {A710, A220, A1, A7, A510, A230, A2, A6, A340, A250, A3, A4, A5} which has a constituent act probability product equal to 0.0224 i.e. (0.5*0.7*1*1*0.8*0.4*1*1*0.5*0.4*1*1*1); P72 is associated with constituent act set {A720, A610, A7, A1, A520, A230, A2, A6, A350, A260, A3, A4, A5} which has a constituent act probability product equal to 0.00192 i.e. (0.5*0.2*1*1*0.4*0.4*1*1*0.6*0.2*1*1*1); and P73 is associated with constituent act set {A730, A620, A6, A220, A1, A7, A420, A2, A340, A250, A3, A4, A5} which has a constituent act probability product equal to 0.0021 i.e. (0.5*0.1*1*0.7*1*1*0.3*1*0.5*0.4*1*1*1). The respective sets of nested constituent acts of predicates P70, P71 and P72 are illustrated in FIGS. 20a–c. Since 0.0224 is the greatest constituent act probability product, P71 is identified as successful along with constituent acts {A710, A220, A1, A7, A510, A230, A2, A6, A340, A250, A3, A4, A5} and corresponding predicates P71, P22, P1, P7, P51, P23, P2, P6, P34, P25, P3, P4, P5.

Where no predicate is identified with the N level space of an analysis space 82b, the success of a group of two or more predicates which collectively represent an analysis of the entire tree form of a second order set is determined.

In addition to collecting data identifying successful predicates and acts for a completed analysis space 82b, the probability processing submodule 86b gathers data relating to the use of each predicate and formative act corresponding to the predicates as used in the analysis space. The success determination process of determining the constituent act probability product is also utilized to limit the number of predicates included in any specific level box of the analysis space as it is being completed.

If the knowledge space 72b contains more than a preferred three possible predicates for a box of a particular level based on the previously identified predicates in lower level boxes, only the three most successful predicates are used to fill the box. Statistics regarding the use of predicates and their constituent acts and predicates in attempting to fill the level boxes are also gathered by the probability processing submodule 86b.

In operation, both dyadic and triadic analysis space processing preferably proceeds by evaluating the elemental predicates of the first and second set elements being evaluated and determining whether there exists any predicates which contain acts which make the predicates eligible for the analysis space box for the analysis of the first two set elements. Next, the third first level-box with elemental predicate(s) corresponding to the third set element is considered and any second-level box is filled which is an analysis of the third set element paired with either of the first two elements; followed by the consideration of the third-level box which is an analysis of the first three elements. Thereafter the fourth first-level elemental box is considered and the second-level boxes containing the fourth first-level elemental predicate box contents and the contents of any of the other of the first three first-level boxes is considered, followed by the completion of any third level box of the analysis of the fourth elemental predicate box contents with the contents of any two of the other of the first three first-level elemental predicate boxes, followed by the consideration of the fourth-level box which represents an analysis of the contents of the first four first-level elemental predicate boxes. The process continues considering the next first-level elemental predicate box, the second-level, third-level, fourth-level boxes etc. which are to contain an analysis of that next elemental predicate box with the preceding predicates previously analyzed.

In the dyadic example of FIG. 11b, the analysis space boxes are considered in the following order D1/R1, D1/R2, D2/R1, D1/R3, D2/R2, D3/R1, D1/R4, D2/R3, D3/R2, D4/R1, D1/R5, D2/R4, D3/R3, D4/R2, D5/R1 where the boxes are identified diagonal/horizontal row numbers.

In the triadic example of FIG. 18b, the analysis space boxes are considered in the following order:

L1a→L1b→L2a∆L1c→L2c→L3a→L1d→L2e→L3d→L4a→L1e→L2f→L3e→L3g→L4b→L4f→L5a→L1f→L2d→L3b→L3f→Lc→L4g→L4h→L5b→L5d→L5g→L6a→L1g→L→2b→L3c→L4d→L4e→L5c→L5e→L5f→L6b→L6c→L6d→L7, where the bold highlighting indicates a non-elemental filled box in FIG. 18b.

An alternative method to complete an analysis space is to complete each level of analysis space boxes prior to proceeding to the next level. However, both processes will achieve the same result. In both cases, only predicates which validly fill the prior analysis space boxes which have been evaluated are utilized in attempting to fill a subsequently considered analysis space box.

When it is determined that an analysis space box should be filled with a particular predicate, an analysis space record is created called a cell which contains an identification of the analysis space box level and the elemental predicate boxes which are covered by the box's analysis, a pointer to each selected predicate eligible to fill the box, a pointer to each act in the eligible predicates which makes the predicate eligible for use in the analysis space box, and a number ranking the eligible predicate in its degree of success as compared to other eligible predicates.

For example, with respect to the analysis spaces illustrated in FIG. 11b with predicate and act records of FIG. 12a, sample cell records are provided in FIG. 12b. With respect to the analysis spaces illustrated in FIG. 18b with predicate and act records of FIG. 19a, sample cell records are provided in FIG. 19b. In both examples the cells are listed in order of completion. In the example relating to the FIG. 18b analysis space, the cell records for the first level boxes are omitted.

The contents of the cell records are used to gather the operational statistics. The cell record structure also facilitates the probability statistics' updating based on the use and success of predicates and acts in the particular analysis space.

After the completion of each triadic taxemic analysis space 82b and a success determination for the most probable set of constituent acts and corresponding predicates which provide a complete analysis of the tree form for the second order set being analyzed, the triadic taxemic induction module updates the probability statistics of the current predicate and act records then contained in the knowledge space 72b.

The procedure for updating the probabilities, goodness and convergence values in the triadic taxemic module are the same as the dyadic morphologic module. To update a triadic taxemic act's probability, the stored value of the act's probability is retrieved along with the counts for each act within the respective act's class. Using these counts, an estimate for the act's probability is derived using Equation 3.

Subsequently, Equation 4 is used to exponentially age the act's probability based on the stored value of the act's probability (probability old) and the act's estimated probability derived from Equation 3. The act's aged probability (probability new) is then normalized with all the other acts within the same class using Equation 5 and the result value stored as the act's updated probability.

Triadic taxemic predicate probability values are also updated using exponential aging. Using the counts for the number of times the triadic taxemic predicates were used in successful triadic taxemic inductions, Equation 6 is used to derive an estimate of a predicate's probability. Using the estimated probability, the stored probability (probability old) of a predicate is exponentially aged using Equation 7. The aged probability (probability new) is stored in the knowledge base to update the predicate's probability.

To update the goodness for a triadic taxemic act, two counts are used: the number of times an act was used and the number of times the act was used in a successful analysis. Using these counts, an estimate for the act's goodness is calculated using Equation 8. To exponentially age the goodness of an act, Equation 9 is used with the stored value for the act's goodness (goodness old) along with the estimated value. The result (goodness new) is stored in the knowledge base to update the act's goodness.

Triadic taxemic predicate goodness values are similarly updated. For a particular predicate, the counts for the number of times the predicate was induced and the number of times the predicate was used in a successful induction are gathered. An estimate of the predicate's goodness is generated using these counts in Equation 10. To exponentially age the goodness of a predicate, the stored value (goodness old) along with the estimated goodness value are used in Equation 11. The result (goodness new) is subsequently stored in the knowledge base as the updated goodness for the predicate.

Triadic taxemic predicate convergence is updated at the same time as a predicate's probability is updated. For each predicate, a fluctuation is calculated using the predicate's previously stored "old" probability and the predicate's newly determined updated probability with Equation 12. The value for the new fluctuation is compared to the previously stored fluctuation or 0 if no value was previously stored. If the new fluctuation is less than the previous fluctuation, the predicate's probability is assumed to be gravitating towards its "true value." In this situation the convergence is updated using Equation 13. If the old fluctuation is greater than the new fluctuation, the predicate's value is assumed to not be gravitating towards its "true value." In this situation, the convergence is updated using Equation 14.

As in the dyadic morphologic module, a flag (f) is preferably maintained which tracks the number of triadic taxemic analysis spaces occurring since the last update of probability type statistics, so that (f*WF) per Equation 15 is used for updating statistics and all predicates and act statistics are updated after every 32 analysis spaces in advance of abductive elimination.

Also in conjunction with the completion of a triadic taxemic analysis space, three types of operational statistics (opp stats) are collected, namely predecessor/successor (P/S) statistics; co-occurrence (C/C) statistics and case/antecedent (C/A) statistics.

A P/S statistic is generated for each pair of mutually exclusive predicates which collectively provide a valid analysis of any one of the higher level boxes of the analysis space 82b which is a "surprise." A "surprise" is represented by a blank in the specific higher level box for which the existing predicates form a valid ordered pair, where all higher level boxes which include an analysis of the subtree associated with the specific box are also blank. For example, the predicates P41 in box L4e and P3 in box L1C are a valid pair for box L5f which is blank in FIG. 18b. An analysis of the subtree (P1, P2, P3, P6, P7) corresponding to box L5f is contained within the analyses of higher level boxes L6c, L6d and L7. If all three boxes were empty at the conclusion of the N level analysis, a P/S statistic would have been generated for P41/P3. However, no P/S statistic is generated for P41/P3 in the example of FIG. 18b since box L7 contains predicates.

In fact, with respect to the analysis represented by the use of the predicates identified in FIG. 18b for the tree form of FIG. 16a, no P/S statistics would be generated at all. Although there is no predicate identified for seventeen of the third, fourth, fifth and sixth level boxes, predicates are contained in the Nth level space L7 which represent an analysis of the entire tree form of the second order set and, accordingly, are inclusive of the subtrees associated with each empty box.

Co-occurrence or C/C statistics are generated to reflect the co-occurrence of two predicates in the same box of an analysis space. Based on the analysis space 82b illustrated in FIG. 18b as completed with the predicates in FIG. 19, co-occurrence or C/C statistics would be generated representing the co-occurrence of P34 with P35 in third level box L3g, P42 with P43, in box L4f, P51 with P52 in box L5g, and P71 with P72, P71 with P73, and I P72 with P73 in box L7. Alternatively, each respective co-occurrence statistic would be incremented by 1 if it had previously been created. In the preferred embodiment, only three predicates are permitted to co-occur in a single analysis space box. If such a parameter is increased, additional C/C statistics would be generated for all possible pairings of predicates in a common box.

C/A statistics are gathered with respect to the non-elemental consequent and antecedent acts within the set of constituent acts for each successful predicate. For the analysis space as completed with the predicates in FIG. 19, P71 was identified as successful along with its thirteen constituent acts A710, A220, A1, A7, A510, A230, A2,A6,A340, A250,A3,A4,A5. Highest level act A710 is identified as case antecedent to act A220 of predicate P22 which act is identified as a corresponding consequent. Highest level act A710 is also identified as result antecedent to act A510 of predicate P51 which act is identified as a corresponding consequent. Thus C/A statistics for A220/A710/case and A510/A710/result are generated or incremented by 1 if they had been previously created.

Act A510 is likewise identified as case antecedent to consequent act A230 and as result antecedent to consequent act A340. Act A340 is likewise identified as case antecedent to consequent act A250 and is result antecedent to consequent act A5. Since act A5 is an elemental act, C/A statistics for A230/A510/case, A340/A510/result and A250/A340/case are generated or incremented by 1, but no C/A statistic is generated for A5/A340/result.

During training mode, until cleared by an abduction, triadic taxemic P/S, C/C and C/A opp stats are accumulated for each successive processing of inductive analysis spaces of second order sets. After a predetermined number of P/S, C/C or C/A statistics is reached or exceeded following the conclusion of a triadic taxemic analysis space 82b, a respective abduction 62b is initiated. Preferably a specific type of abduction processing is triggered when any one type of opp stat exceeds 10,000.

If the triadic taxemic P/S statistics limit is reached, triadic taxemic abductive generalization is commenced. If the C/C statistic limit is reached, abductive identification is commenced. If the C/A statistic limit is reached, abductive distinction is commenced. Those three types of abductions will also be triggered if the end of the training corpus is reached. Triadic taxemic abductive elimination is preferably commenced after each processing of probability statistics of the entire set of predicates and acts in the knowledge space 72b.

Abductive generalization in the triadic taxemic module is similar to but slightly different than the other two modules. Abductive generalization in the triadic taxemic module 56 uses the same initial Step 136 to 148 process to create new triadic taxemic acts and predicates from P/S statistics as the dyadic morphologic module 52 uses to create new dyadic morphologic predicates and acts as explained in conjunction with FIGS. 6a and 6b. However, following Step 148, when new triadic taxemic predicates are created from acts having matched pairs with the highest values, two acts are created for each predecessor/successor pair, one with leftness and one with rightness. For example, for matched pair (Pai, Pbj), a triadic taxemic act having a case predicate Pai and a result predicate Pbj with a direction left and a triadic taxemic act having a case predicate Pai and result predicate Pbj having a right direction are both created. The new predicates have both the newly created left and right direction acts corresponding to the respective matched pairs. The new predicates are assigned an initial probability, goodness and convergence. Additionally, the new acts within each new predicate's class have their probabilities and goodnesses initialized.

The goodness for both new triadic taxemic predicates and acts created by triadic taxemic generalization is initially set at 0.5. The convergence for the new triadic taxemic predicate is set to 0.5. The unnormalized probability for each act is determined by Equation 22. Subsequently, the acts' probabilities are normalized by dividing each act's probability by the sum of all the acts' probabilities within its predicate class. The predicate's probability is determined as the lesser of (the sum of all unnormalized act probabilities in its class divided by two) or 1. If the determined probability comes out greater than one, it is set at one.

Triadic taxemic abductive identification processes triadic taxemic predicates, acts and associated C/C statistics using the same process as dyadic morphologic abductive identification uses with dyadic morphologic predicates, acts and associated C/C statistics as explained above in conjunction with FIG. 7.

Triadic taxemic abductive distinction processes triadic taxemic predicates, acts and associated C/A statistics using the same process as dyadic morphologic distinction uses in processing dyadic morphologic predicates, acts and associated C/A statistics as explained above in conjunction with FIGS. 8a and 8b.

Triadic taxemic abductive elimination preferably uses the same process to eliminate triadic taxemic acts and predicates as dyadic morphologic elimination uses to eliminate dyadic morphologic acts and predicates. In each case of triadic taxemic abduction, it is preferred, but not required, to use the same threshold values as used in the dyadic morphologic abductions.

Triadic taxemic processing continues for multiple evaluations of the training corpus with each cycle of inductions and abductions improving the reliability of the triadic taxemic knowledge space data 72b. After each cycle of generalization, identification or distinction abductions, the corresponding P/S, C/C and C/A opp stats are cleared. When it is determined that no more P/S surprises exist or after a predetermined number of successive triadic taxemic analyses of the entire training corpus, a final triadic taxemic analysis of the training corpus is conducted. During the final triadic taxemic analysis, one or more percepts based on "successful" predicates are identified with each second order set and no abductions are performed. In performance mode, the triadic taxemic module operates in the same manner as the final training triadic taxemic analysis.

Percepts are selected from the constituent acts of the highest level successful predicate or predicates which together mutually exclusively cover the entire tree form. To determine the triadic taxemic percepts, dyadic taxemic predicate entropy values are used. As discussed above, each elemental predicate in a triadic taxemic analysis space has a pointer to the entropy of a corresponding predicate in the dyadic taxemic module's knowledge space 72a. For the tree of FIG. 16a, the corresponding triadic to dyadic predicates are P1 to P90, P2 to P80, P3 to P71, P4 to P11, P5 to P22, P6 to P31 and P7 to P41.

Using the corresponding predicate's entropy, the percepts are created based on the elemental nodes having the highest entropy. Where the highest level node does not have the highest entropy, it is necessary to break up the set of constituent acts of the most successful triadic taxemic predicates at higher entropy nodes. For instance, for there to be only one percept for a given triadic analysis space, the entropy associated with the highest node triadic elemental predicate must be higher than all other nodes. For the example of FIG. 16a, if the entropy associated with P1's corresponding dyadic predicate P90 is greater than the entropy of all other corresponding dyadic predicates, P80, P71, P11, P22, P31 and P41, then a single percept associated with Act 710 is created and identified as a token. As seen in FIG. 20a, act A710 is an analysis of all of the nodes of the predicate tree of FIG. 16a for the set of constituent acts of the most successful triadic predicate P71.

If in the example of FIGS. 16a and 20a, elemental predicate P3 had the highest corresponding entropy, A340 would be selected as a percept since it represents an analysis of the node corresponding to P3 and all related lower nodes, i.e. P4 and P5. Since nodes corresponding to P1, P2, P6 and P7 are not represented by act A340, the process continues until percepts are identified which collectively, but mutually, exclusively, cover all nodes. Thus, if of the four remaining nodes corresponding to P1, P2, P6 and P7 the corresponding entropy of P71>P1>P2>P6, acts A7, A1 and A230 are selected as percepts. However, if of the four remaining nodes corresponding entropy of P6>P1>P27>P7, acts A6, A220 and A2 are selected as percepts. The percepts are identified as tokens and sent to the pseudo deduction module for further analysis.

The pseudo-deduction module (PDM) 58 is a module that is used to select a particular response to a query, from among a plurality of stored responses. As discussed above, the dyadic morphologic module 52 and triadic taxemic module 56 generate tokens associated with training and query data. These tokens are passed to the PDM 58. In training mode, a stock answer or response category is associated with each specific second order set of training data, also referred to as training queries. The PDM 58 correlates the training tokens generated from a training query with the associated response category. Once the entire corpus of training queries and corresponding response categories have been input and processed by the autognome 10 in training mode, the PDM 58 is able to perform a statistical analysis of the tokens generated from a set of query data to determine the "best" response from among the plurality of responses received during training. The procedure the PDM 58 uses, statistically analyzes the tokens and selects the best response.

Figure 21:
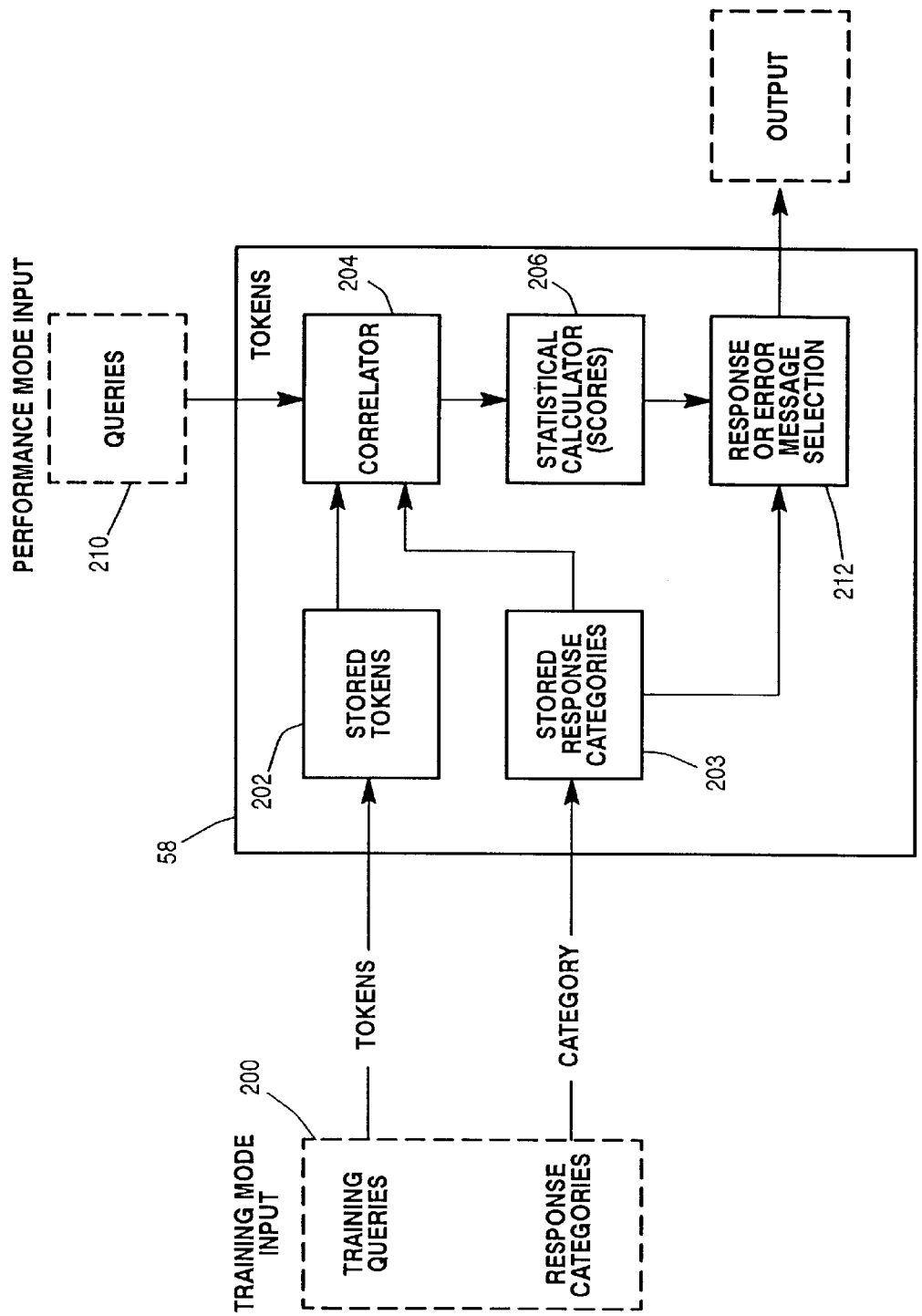

A block diagram of the PDM 58 is shown in FIG. 21. In training mode, the autognome generates tokens for each training query, i.e. second order set of the training data. The tokens are input to the PDM 58 along with the associated response category to each training query as indicated by broken line box 200 in FIG. 21. The tokens and associated response categories are stored within the PDM 58 in token and response category memories 202, 203. In the preferred embodiment, it is not the actual tokens that are passed and stored, but rather location address pointers where the tokens are stored in other memory storage within the autognome. The memory address pointers for tokens generated by the dyadic morphology module are pointers to thought signs;

and pointers for tokens generated by the triadic taxemic module are pointers to the percepts. For simplicity, the PDM 58 is explained below as if the actual tokens were passed to the PDM.

Once the training tokens and associated response categories are stored, a correlator 204 correlates each token generated from a training query with an associated response category. The correlator keeps track of each token and the number of response categories against queries that the token appeared in during training. The correlator also keeps track of the number of times a token appears against a particular response and overall occurrences of tokens related to the responses. A correlator token record 300 is illustrated in FIG. 22 and a correlator response statistic table 400 is illustrated in FIG. 23. This information is used by the statistical calculator 206 to generate "scores" for each token. The scores are used to select the "best" or most statistically likely response, or responses, from among the plurality of responses.

A preferred method for statistically calculating these scores is explained below with reference to FIGS. 22 and 23. In order to generate the scores, the PDM calculates token probabilities. Referring to FIG. 22, an example using a token for the word installation called token "installation" is explained in detail. In the example, there were 6 different responses for which token "installation" was generated from associated training queries, i.e. response numbers 1, 2, 7, 8, 9 and 10 as reflected in the first column 301. The number of times token "installation" appeared against each response is shown in the second column 302, i.e. 7 times for response 1, 1 time for response 2, etc.

Token probabilities are based upon the number of token occurrences against each response divided by the total number of occurrences of the token and are identified for the example in the third column 303 of FIG. 22. The total number of occurrences of the token in the training set is 15, which is derived by summing the number of occurrences for each response. For example, against response 1, token "installation" occurred 7 times. Since the total number of occurrences of token "installation" in the training set was 15, 7 divided by 15 equals 0.467.

FIG. 23 provides a table of the frequency of occurrence of example response categories 1–10. With respect to response category 1, the number of occurrences of token "installation" against response category 1, as listed in FIG. 22, was 7.

For testing, a testing set of queries are input into the autognome in performance mode. The test queries are preferably distinct from the training queries, since an identical or nearly identical set of tokens for the same query would result in both training and performance modes. However, some test queries may be the same as training queries to validate this fact. For each test query, tokens are generated and input to the PDM 58 as reflected by broken box 210 in FIG. 21. The PDM uses the stored data relating to token usage and response category correlations to estimate the most likely response based on the tokens generated for the test query. Since test queries have a known response, the accuracy of the PDM estimates may be determined. For example, a test query (which has been stripped of all punctuation and capitalization for simplicity) may read: "install new pc lan connection etc". Such cryptic queries are common in a technical help desk application. Tokens are generated by the autognome modules 52, 56 and passed to the PDM 58 for analysis. The first step in the PDM 58 is for the correlator 204 to determine which tokens were previously stored within the PDM 58. New tokens are generated by the dyadic morphologic module 52 in performance mode when closely corresponding existing thought signs for first order sets, i.e. words, cannot be identified. New tokens may also be sent from the triadic taxemic module 56 representing triadic taxemic acts not previously identified as percepts.

With respect to each token stored in the PDM that is not new, the statistical calculator 206 generates a score for each response as shown in FIG. 24. The scores are used to predict a response category and are obtained by summing the previously stored probability of each token as it relates to each response category. FIG. 24 illustrates the individual probabilities against each token for each response category, blanks are valued at 0 and reflect that the particular token had not appeared against the particular response category during training. In the example, response category 1 received the highest score of 1.324 and, accordingly, represents the most likely correct response category as determined by the gnome.

In the preferred embodiment, the PDM includes a response selection submodule 212 to determine whether there is sufficient confidence that the highest scoring response category is the "best" response category from among the possible response categories. This confidence can be obtained by determining the ratio between the highest score and the next highest score. In the example of FIG. 24, the ratio between the highest score (which was obtained for response category 1 as 1.324) and the next highest score (which was obtained for response category 5 as 1.095) is 1.209. Accordingly, if the "success ratio" was set at 1.5, the PDM selection submodule 212 would output an indication that the gnome was unable to determine a sufficiently reliable answer. Alternatively, a predetermined numeric threshold may be set which the highest score must exceed. Another factor that is used to select the output of a response to a query is the percentage of unknown tokens. The statistical calculator 206 may be used to calculate the percentage of the unknown tokens identified by the correlator 204 for a set of tokens for a particular query with respect to the total number of tokens generated for the query. If this percentage exceeds a certain threshold, a specific response category will not be provided for the query.

For test queries, a selected number of the highest response probabilities and the unknown token percentage may be output and compared with the known "correct" response. Whether the "correct" response corresponds to the response categories having the highest response probability, enables appropriate thresholds to be established for determining when a specific response is made in actual performance mode.

Figure 25:
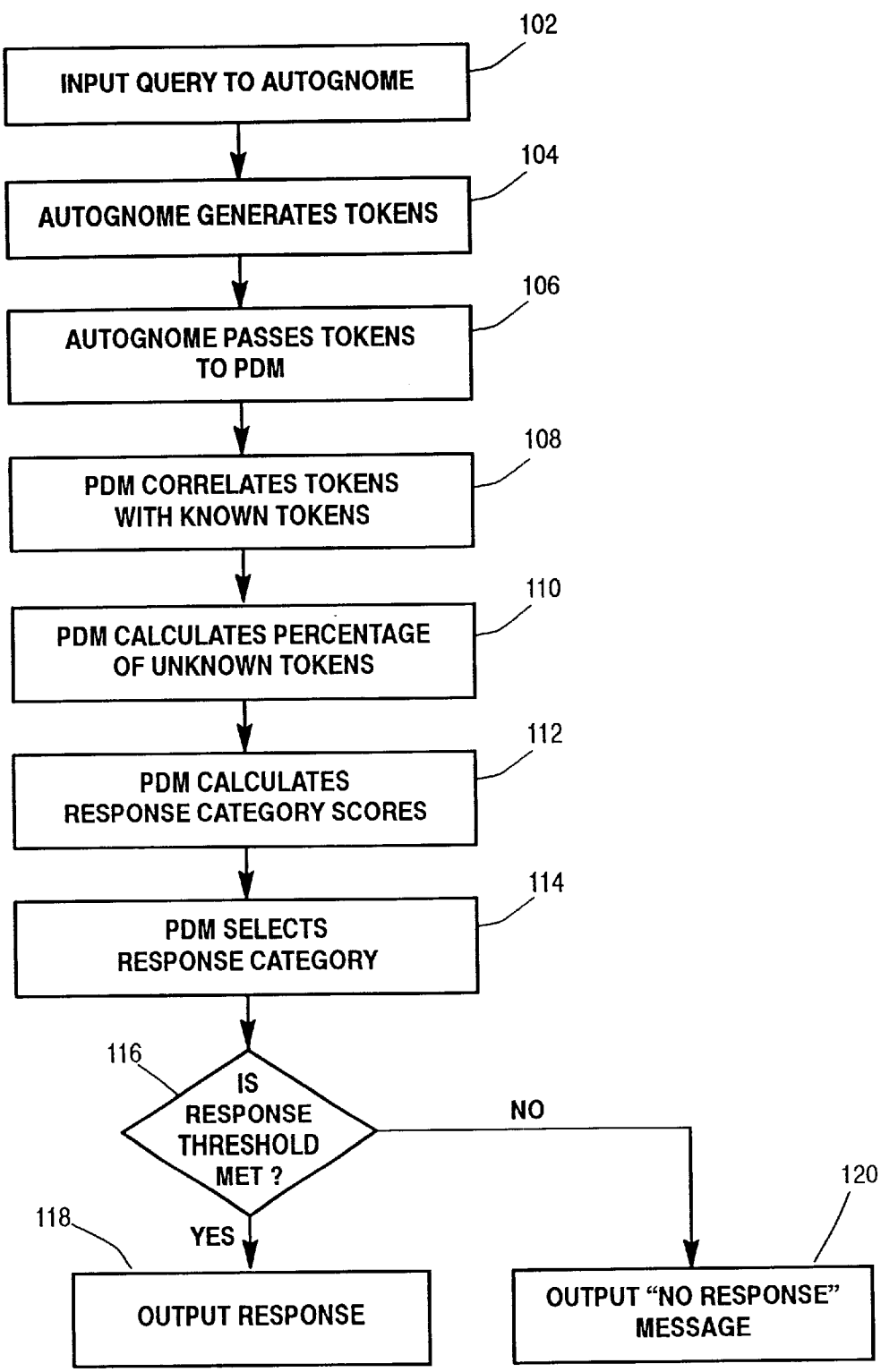

A preferred procedure which the PDM 58 uses in normal operation, after training, for receiving query data and generating a response is illustrated in FIG. 25. First, a query, i.e. query data, is input into the autognome, (Step 102). The autognome then generates tokens from the query data (Step 104). The autognome passes the tokens to the PDM (Step 106). The PDM correlates the generated tokens with the previously stored tokens (Step 108) and calculates a percentage of unknown tokens (Step 110). The PDM then calculates a score based on the known query tokens for each of a plurality of responses or response categories (Step 112) and selects the response category having the highest score (Step 114). If the response threshold is met (Step 116), a response corresponding to the category with the highest score is output (Step 118). If the response threshold is not met (Step 116), then a message is output that a response could not be determined (Step 120). The response threshold is preferably one or a combination of three preferred threshold tests: threshold score, threshold ratio between highest and next highest score and threshold unknown token percentage, as determined after testing a trained gnome. The "no response" message may be different, depending upon which of the three threshold tests is not met. The "response" may be in the form of a stock answer, routing or combination thereof which is mapped to the selected response category.

What is claimed is:

1. A semiotic processing module for a semiotic decision making system, wherein a training corpus of information in the form of sequential sets of elements is used to create a database which is thereafter used to make decisions relating to queries input in the same type of elements, comprising:

a knowledge base for storing data representations of analyses of sets of lineally-related elements;

said knowledge base data representations comprising predicate records and elemental and non-elemental act records wherein:

each predicate record is associated with a class of one or more act records such that each act record is associated with only one class of act records;

each elemental act record represents a set element of said predefined sets and defines a single act class of a corresponding elemental predicate record; and each non-elemental act record represents a sequence of a case predicate record followed by a result predicate record, such that all act records are recursively defined as representations of one or more sets of lineally-related elements and each predicate record represents analyses of the sets of lineally-related elements represented by each act record in the class of act records with which it is associated;

an input for receiving sets of lineally-related elements and storing a representation of each distinct element as an elemental act record in said knowledge base; and a processor associated with said knowledge base which recursively processes said knowledge base records by evaluating the relationship and frequency of occurrence of individual elements and sets of elements based upon the lineal relationship of those elements as received by said input to generate predicate records and non-elemental act records based thereon which are then stored in said knowledge base.

2. A semiotic processing module according to claim 1 wherein:

each predicate record contains a reference to each act record in the class of act records with which it is associated; and each non-elemental act record contains a reference to the predicate record associated with the class of acts with which it is associated, a reference to its case predicate record and a reference to its result predicate record.

3. A semiotic processing module according to claim 1 wherein the predicate and act records are stored at respective locations in a memory and wherein said references comprise the respective memory addresses of those locations.

4. A semiotic processing module according to claim 3 wherein each predicate record further contains the memory address of each act record for which it is a case predicate and the memory address of each act record for which it is a result predicate.

5. A semiotic processing module according to claim 3 wherein:

said knowledge base data representations further comprise opp stat records of a first type each stored at a respective memory location, wherein each opp stat record is associated with two predicate records and represents a relationship between the two predicate records.

6. A semiotic processing module according to claim 5, wherein:

each predicate record further contains the memory addresses of each opp stat record with which it is associated; and each opp stat record of said first type contains the memory addresses of each of the two predicate records with which it is associated.

7. A semiotic processing module according to claim 6 wherein said first type of opp stat records comprises records for P/S opp stats and C/C opp stats.

8. A semiotic processing module according to claim 3 wherein:

said knowledge base data representations further comprise opp stat records of a second type each stored at a respective location in said memory, wherein each opp stat record is associated with two act records and represents a relationship between the two act records.

9. A semiotic processing module according to claim 8, wherein:

each act record further contains the memory addresses of each opp stat record with which it is associated; and each opp stat record of said second type contains the memory addresses of each of the two act records with which it is associated.

10. A semiotic processing module according to claim 9 wherein said second type of opp stat records comprises records for C/A opp stats.

11. A semiotic processing module according to claim 3 wherein:

said knowledge base data representations further comprise thought sign records each stored at a respective location in said memory, each thought sign record being associated with a denotation of acts and containing the memory addresses of the act records for the acts in that denotation; and each act record containing a first list of memory addresses for each thought sign record in which its act is a first one of the acts in the denotation for that thought sign.

12. A semiotic processing module according to claim 11 wherein:

each act record further contains a second list of memory addresses for each thought sign record in which its act is any one of the acts of the denotation for that thought sign.

13. A dyadic semiotic processing module according to claim 1 wherein:

the lineal relationship of set elements is sequential; and each non-elemental act record represents a sequence of set elements which is a subset of a predefined set within a training corpus and which constitutes a sequence of set elements represented by its associated case predicate record directly followed by a sequence of set elements represented by its associated result predicate.

14. A triadic semiotic processing module according to claim 1 wherein:

the lineal relationship of set elements is such that each element represents a node of a multi-node tree form of said predefined sets having a single highest level node and a plurality n of lowest level nodes where each lowest level node is associated with a single higher level node and where each node which is not a lowest level node is associated with exactly two lower level nodes whereby the total number of nodes N is equal to 2n−1; and each non-elemental act record is associated with a case predicate record which represents a first subtree of set elements and a result predicate represents a second subtree of set elements having a highest level second subtree element which highest level second subtree element is directly lineally associated with a higher level first subtree element whereby said non-elemental act record represents a subtree of a tree form of a predefined set in a training corpus which includes all of the first and second subtree elements.

15. A triadic semiotic processing module according to claim 1 further comprising means for receiving tree form representations of set elements from a dyadic semiotic processing module such that the lowest level nodes of said tree forms represent individual sets of a training corpus which was processed by the dyadic semiotic processing module.

16. A triadic semiotic processing module for a semiotic decision making system, wherein a training corpus of information in the form of sequential sets of elements is used to create a database which is thereafter used to make decisions relating to queries input in the same type of elements, comprising:

a knowledge base for storing data representations of analyses of subsets of predefined sets of N lineally-related elements where each element represents a node of a multi-node tree form having a single highest level node and a plurality n of lowest level nodes where each lowest level node is associated with a single higher level node and where each node which is not a lowest level node is associated with left and right lower level nodes whereby the total number of nodes N is equal to 2n−1;

said knowledge base data representations comprising predicates and elemental and non-elemental acts wherein:

each predicate is associated with a class of one or more acts such that each act is associated with only one class of acts;

each elemental act represents a set element and defines a single act class of a corresponding elemental predicate; and each non-elemental act represents a sequence of a case predicate followed by a result predicate in either a left or right direction, such that all non-elemental acts are recursively defined as representations of one or more subsets of lineally-related elements of a predefined set and each predicate represents the subsets of lineally-related elements represented by each act within its associated class of acts where the result predicate of any given non-elemental act having a left direction represents a subset of elements having a highest node element which node element is the left lower node associated with one of the nodes represented by the case predicate of the given non-elemental act and where the result predicate of any given non-elemental act having a right direction represents a subset of elements having a highest node element which node element is the right lower node associated with one of the nodes represented by the case predicate of the given non-elemental acts;

an input for receiving for receiving tree form representations of set elements such that the lowest level nodes of said tree forms represent individual sets of a training corpus and storing a representation of each distinct tree form as an elemental act record in said knowledge base; and a processor associated with said knowledge base which recursively processes said knowledge base records by evaluating the relationship and frequency of occurrence of sets of elements based upon the lineal relationship of those sets of elements as received by said input to generate predicate records and non-elemental act records based thereon which are then stored in said knowledge base.

* * * * *